United States Patent [19]

Mutoh et al.

[11] 4,430,805
[45] Feb. 14, 1984

[54] RAIL TYPE UNIVERSAL PARALLEL RULER DEVICE

[75] Inventors: Hiroshi Mutoh; Masami Hikawa; Yoshinori Watanabe; Kouichi Yamazaki, all of Japan

[73] Assignee: Mutoh Industry, Ltd., Tokyo, Japan

[21] Appl. No.: 410,921

[22] Filed: Aug. 24, 1982

Related U.S. Application Data

[63] Continuation of Ser. No. 104,466, Dec. 17, 1979, abandoned.

[30] Foreign Application Priority Data

| Dec. 23, 1978 | [JP] | Japan | 53-16229 |
| Dec. 23, 1978 | [JP] | Japan | 53-162230 |
| Feb. 21, 1979 | [JP] | Japan | 54-20001 |
| Jul. 20, 1979 | [JP] | Japan | 54-91482 |

[51] Int. Cl.³ .................................... B43L 13/02
[52] U.S. Cl. ............................... 33/438; 33/DIG. 1; 33/1 M
[58] Field of Search ............... 308/10; 104/281–286; 33/1 M, 174 L, 403, 430, 438, 440, 442, DIG. 1

[56] References Cited

FOREIGN PATENT DOCUMENTS 1511445 4/1969 Fed. Rep. of Germany.
2107177 9/1972 Fed. Rep. of Germany.

OTHER PUBLICATIONS

Meyers Enzyklopadisches Lexikom, Band 15: Let--Meh, Bibliographisches Institut, 1975.

Primary Examiner—Harry N. Haroian
Attorney, Agent, or Firm—Wenderoth, Lind & Ponack

[57] ABSTRACT

A rail type universal parallel ruler device comprising a drawing board, a horizontal rail mounted on the drawing board, a horizontal cursor mounted shiftably on the horizontal rail, a vertical rail connected to the horizontal cursor, a vertical cursor mounted shiftably on the vertical rail, and a head connected to the vertical cursor, the improved rail type universal ruler device wherein a magnetic member is disposed on each of the cursors and rails for guiding the cursors and/or on a tail portion of the vertical rail and the side of drawing board for guiding the tail portion of the vertical rail, and magnetic force is caused to work between the magnetic members in a direction where the cursor is floated relative to the surface of rail and/or a direction where the tail portion of the vertical rail is floated relative to the surface of the drawing board side.

7 Claims, 80 Drawing Figures

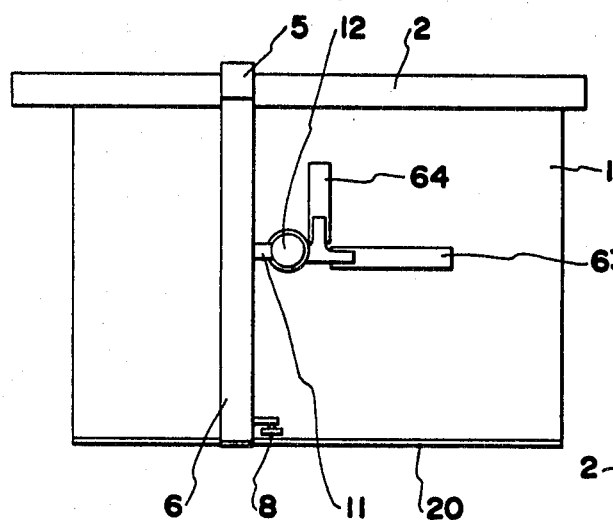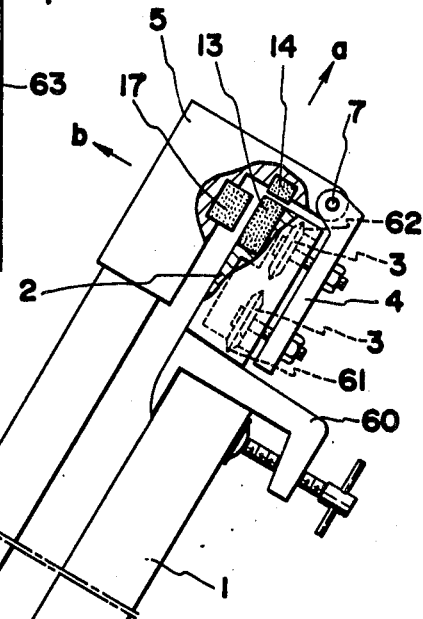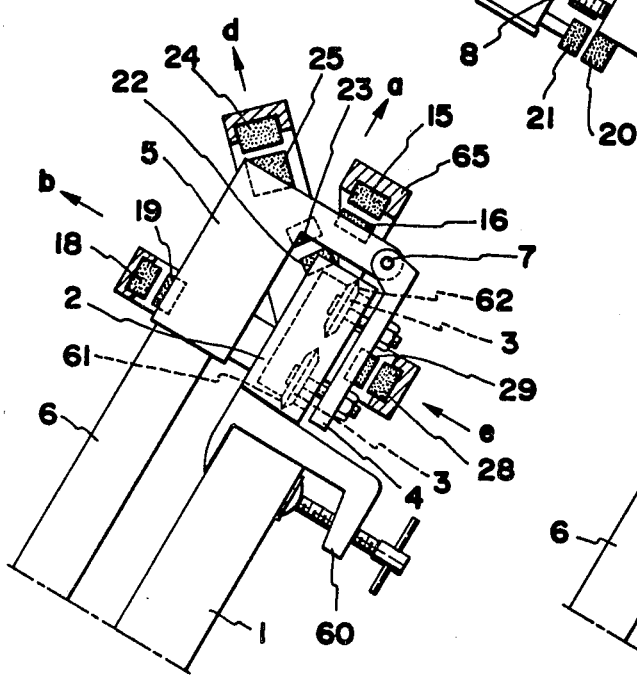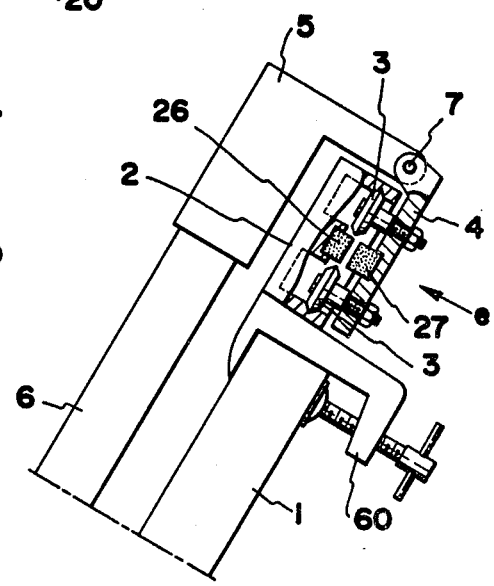

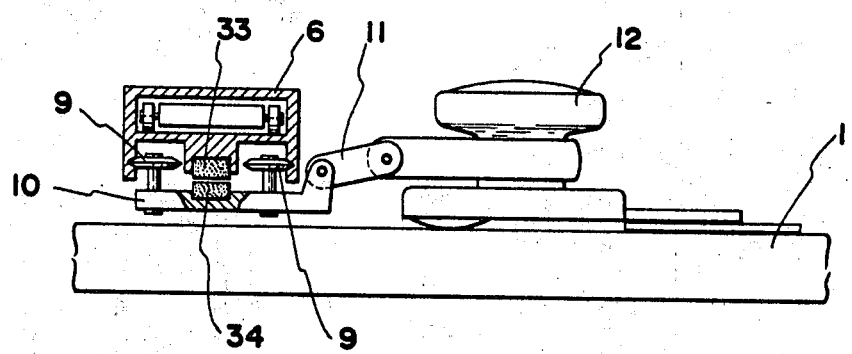
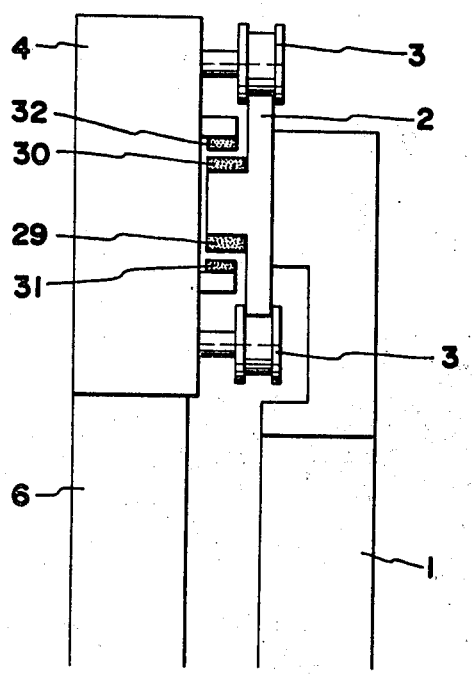
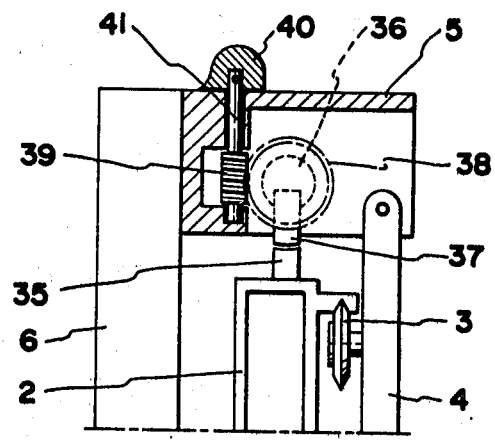
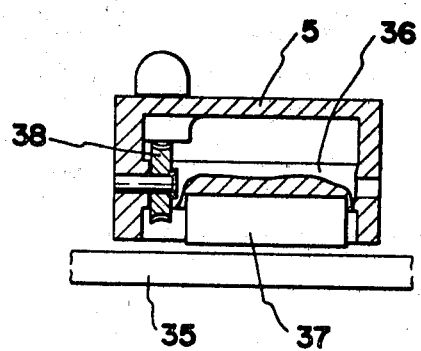

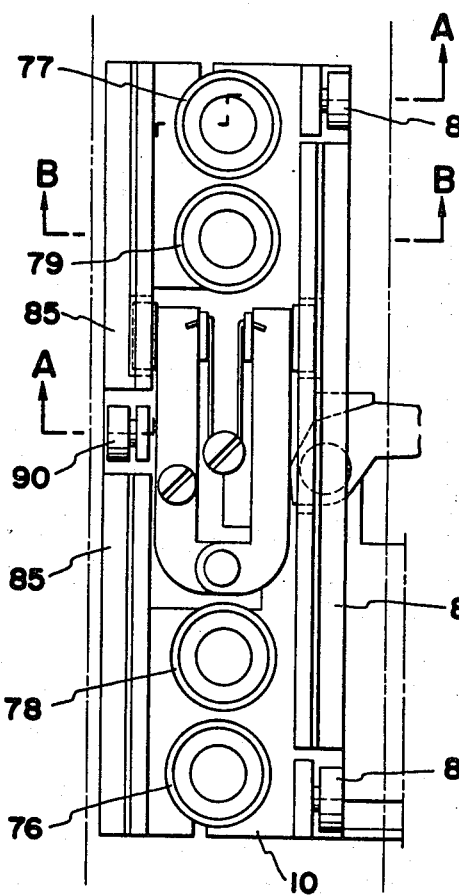
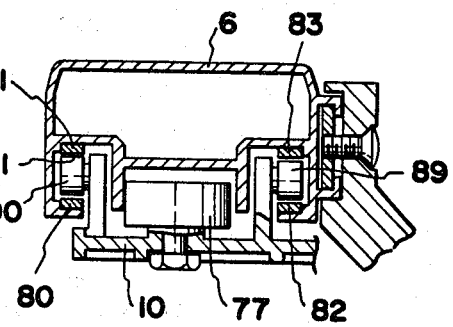
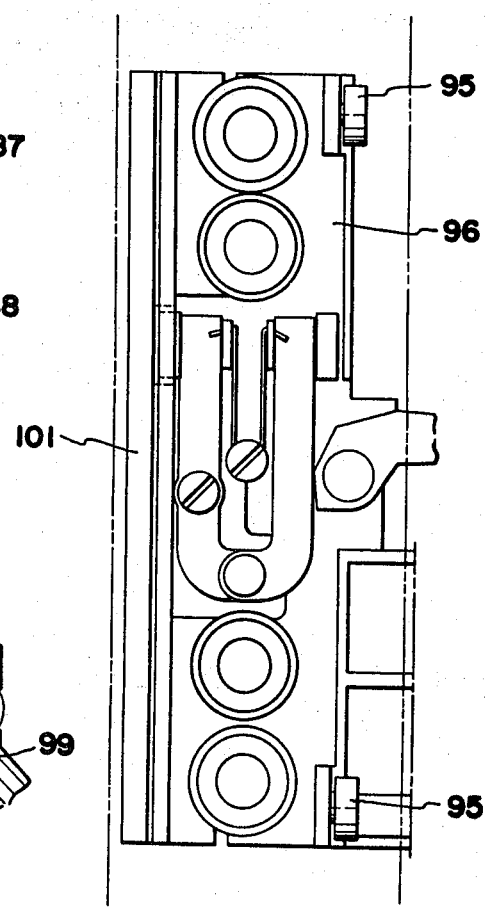
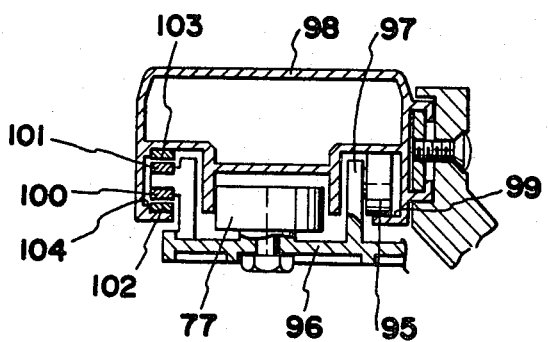

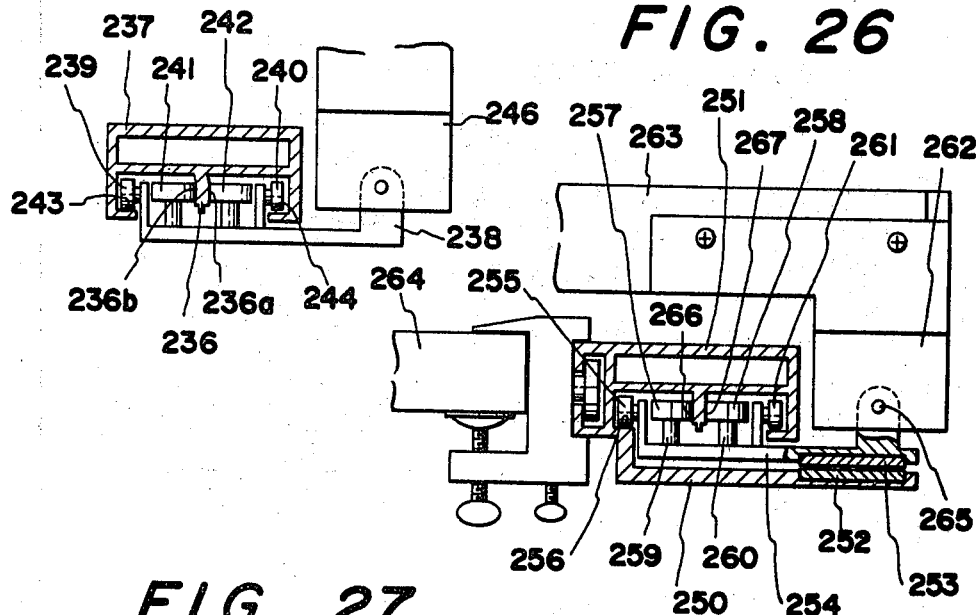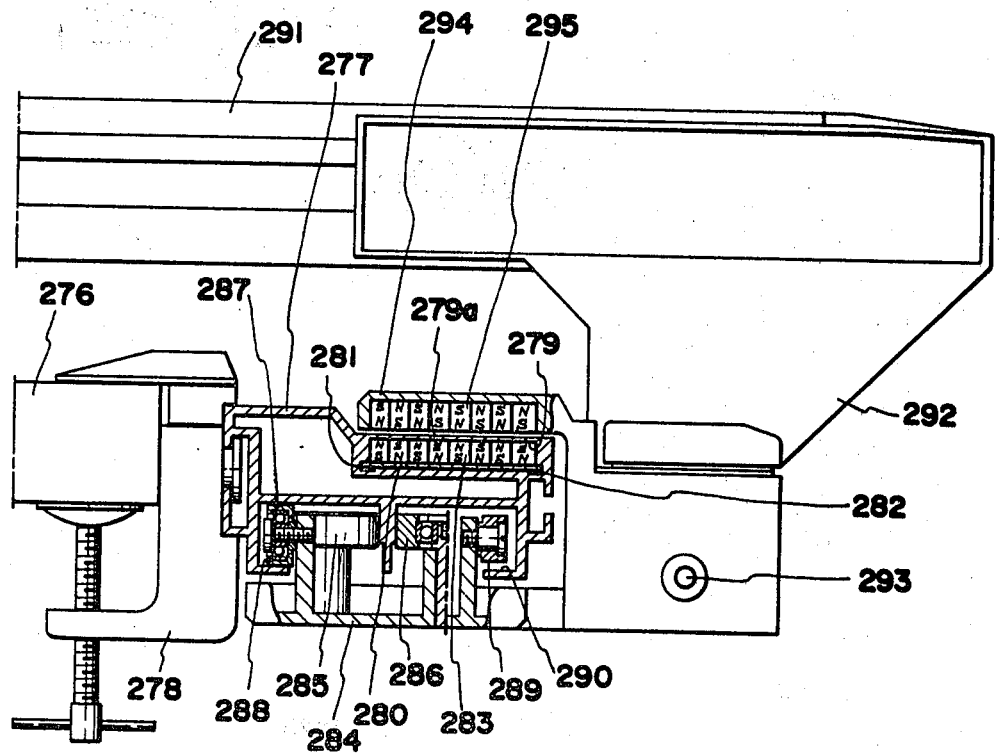

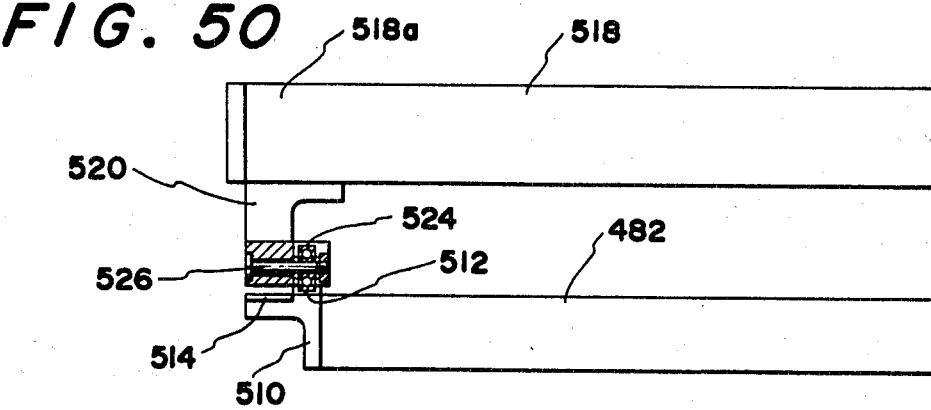
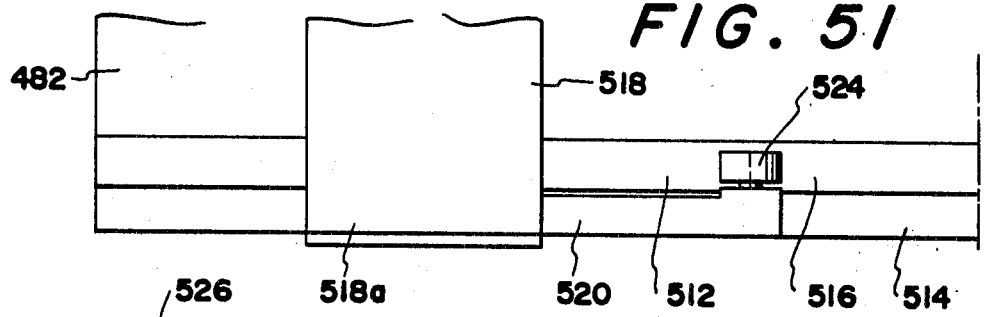
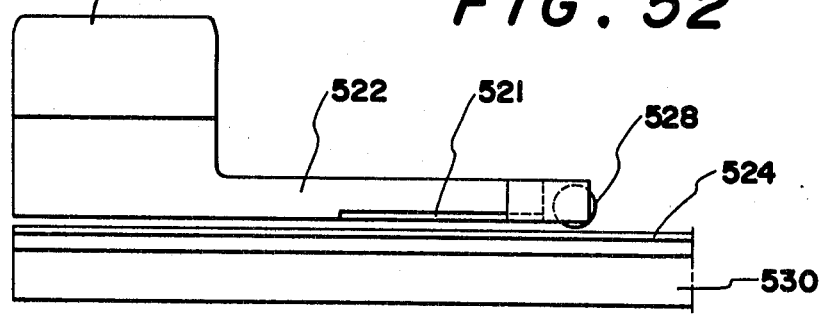
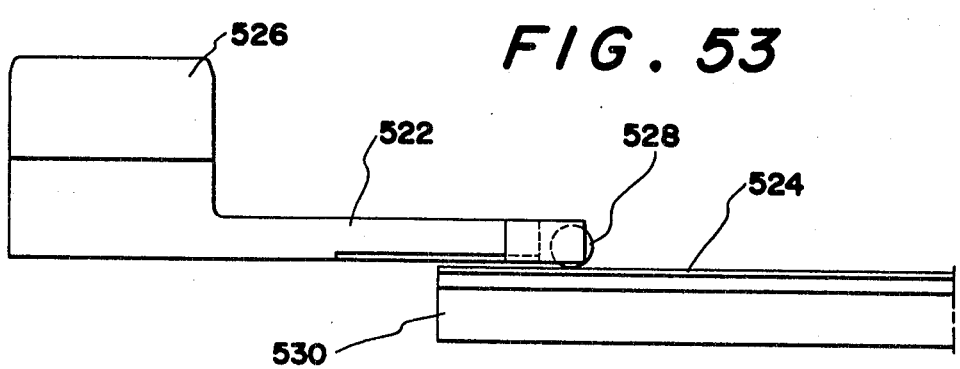

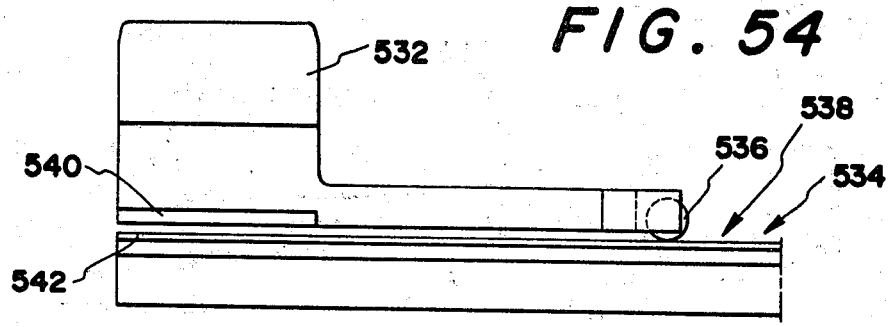
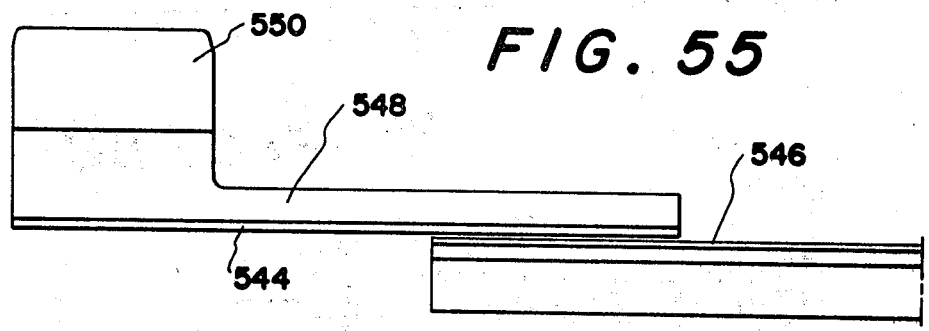
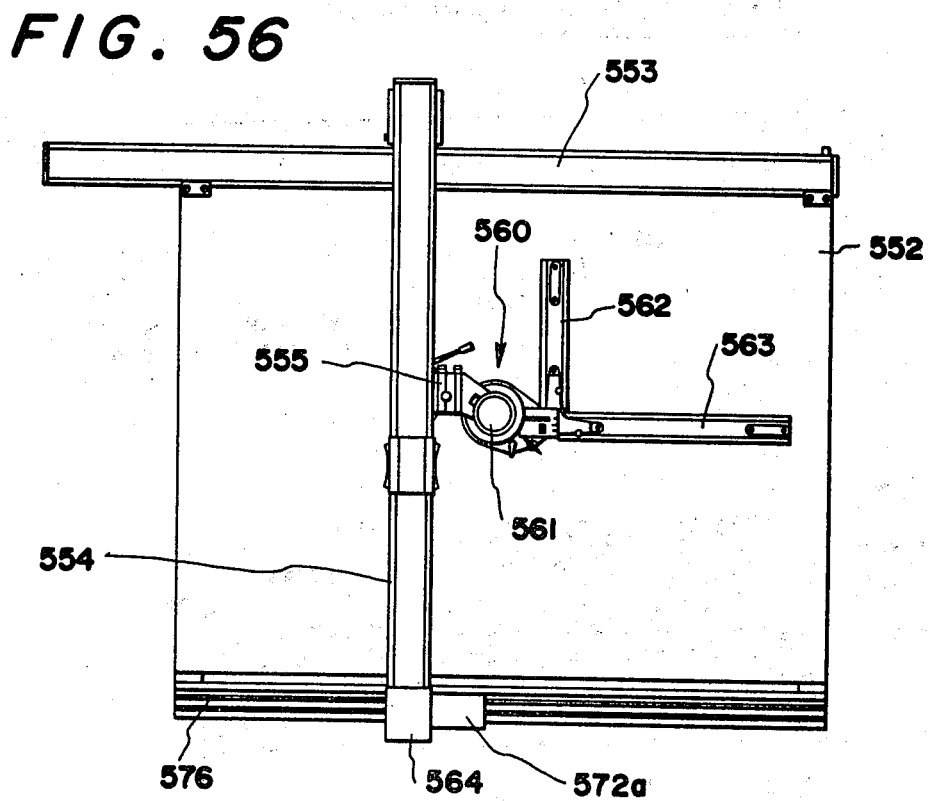

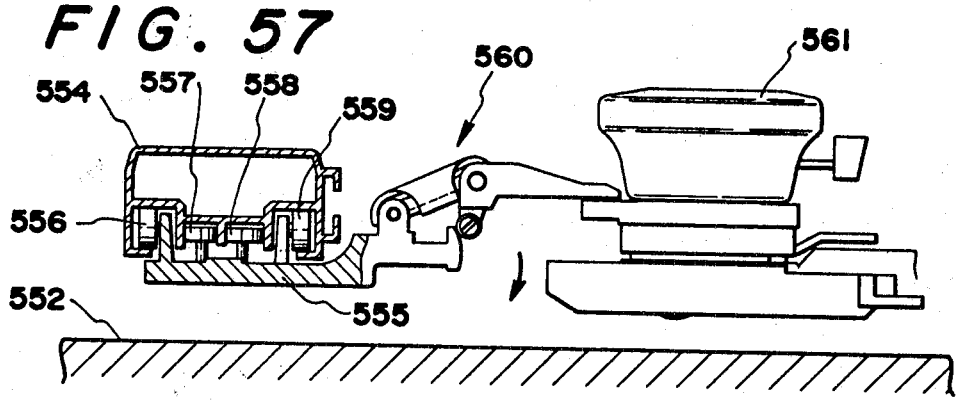
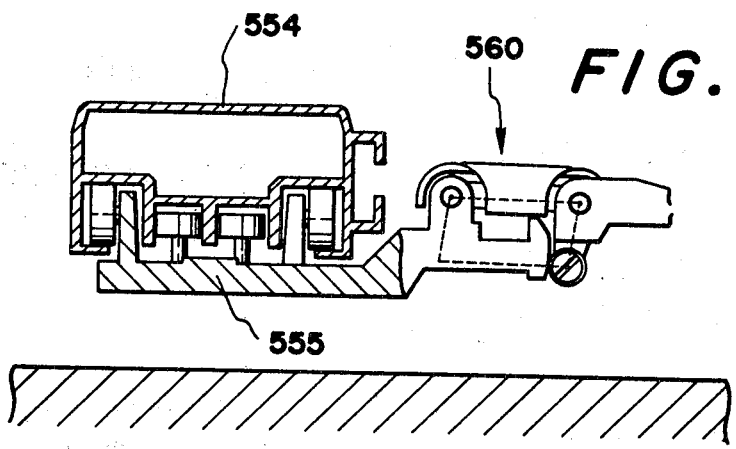
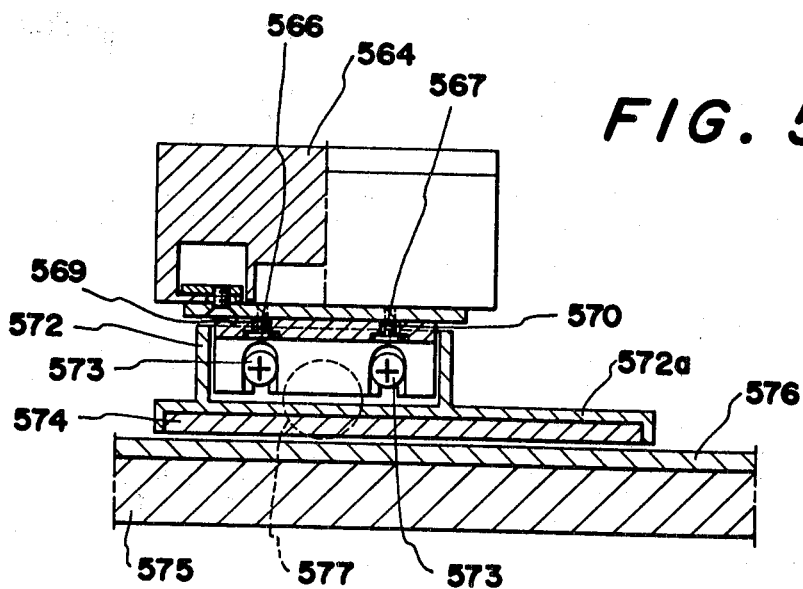

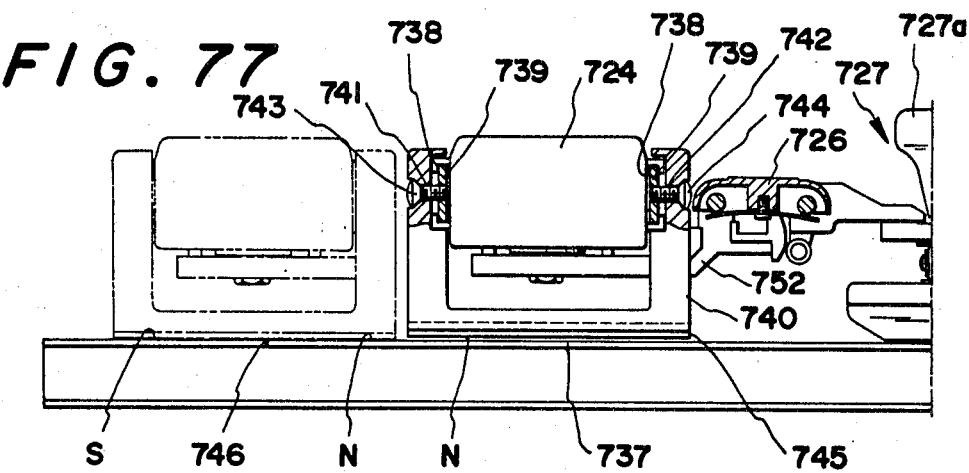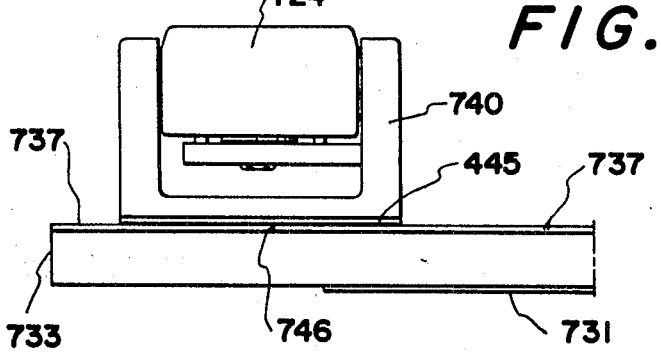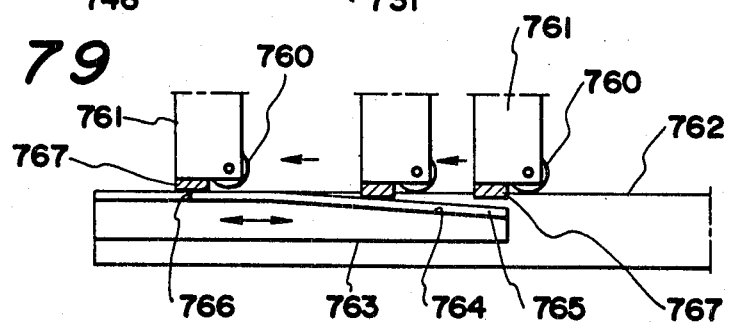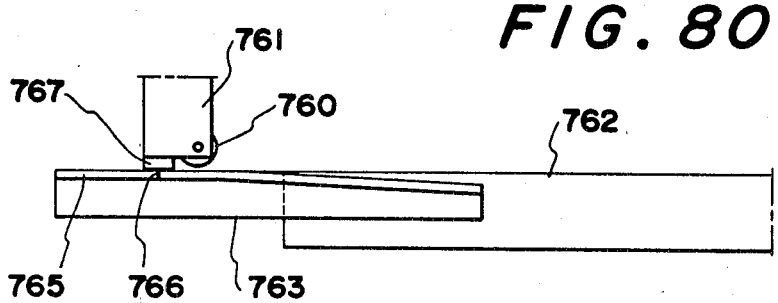

RAIL TYPE UNIVERSAL PARALLEL RULER DEVICE

This is a continuation application of application Ser. No. 104,466, filed Dec. 17, 1979, now abandoned.

DESCRIPTION OF THE PRIOR ART

In the conventional rail type universal parallel ruler device, the horizontal cursor is mounted on the horizontal rail by means of roller so as to travel freely along its longitudinal direction. Also, the vertical cursor is mounted on the vertical rail by means of roller so as to travel freely along its longitudinal direction. Furthermore, the tail portion of the vertical rail is similarly mounted on the drawing board side by means of roller so as to travel freely on the surface of the drawing board. Accordingly, when the cursor is shifted along the rail, and the tail portion of the vertical rail is shifted along the surface of the drawing board, rolling friction of the roller is derived between the roller and rail and also between the roller and the surface of the drawing board. The shifting of the cursor along the rail and of the vertical tail portion along the surface of the drawing board becomes heavy due to the frictional force which results in the inability of shifting the head by light force.

SUMMARY OF THE INVENTION

The invention relates to a rail type universal parallel ruler device, and more particularly to a rail type universal parallel ruler device wherein a magnetic member is disposed on a traveling member and a guiding member for guiding the traveling member, and magnetic force is caused to work between the magnetic members in a direction where the traveling member is floated relative to the surface of the guiding member.

It is a primary object of this invention to manipulate manually the head smoothly by a light force by decreasing the traveling load through a utilization of magnetic force of the magnetic members.

It is another object of the invention to shift the head quietly and smoothly by a light force by completely floating the traveling member relative to the guiding member for guiding the traveling member by the magnetic force of the magnetic members.

It is a further object of the invention to cause the traveling member to travel smoothly along the longitudinal direction of the rail by controlling a position of the traveling direction in right angle direction relative to the longitudinal direction of the rail for guiding the traveling member.

It is a still further object of the invention to cause the traveling of the vertical rail lightly and smoothly by arranging the magnetic floating force against the tail portion of the vertical rail not to work on the vertical rail as the rotating force centering around an axis of its longitudinal direction.

It is a particular object of the invention to form magnets disposed on the traveling member and the guiding member by a plurality of rows of magnetic pole tracks so that a gap of magnetic floating of the traveling member against the guiding member is not greatly changed by change of the load applied on the traveling member.

It is another and more particular object of the invention to obtain a fine adjustment of a position relation of both magnetic pole tracks in a direction parallel to the vertical rail so that the plural rows of magnetic pole tracks at the tail portion side of the vertical rail and the plural rows of magnetic pole tracks at the drawing board side are mutually and accurately opposed with respect to the same pole surfaces.

It is a further object of the invention to cause the vertical rail to shift by a light force by decreasing a rotary moment centering around an axis of longitudinal direction of the vertical rail by the weight of the head by repulsion magnetic force.

It is an additional object of the invention to prevent a deflection of the horizontal rail by arranging the load of lower direction by dead load of the vertical rail not to work on the horizontal rail. When the horizontal rail is bent, an error is derived in perpendicularity of the horizontal rail and as a result, an error is derived in drawing precision.

Above and other objects and effects of the invention will become more apparent as the description proceeds with reference to the drawings.

The drawings show preferred embodiments of the invention, and the description of the embodiments is provided. However, it is to be understood that various modifications are possible from the construction disclosed herein, and that the drawings and the description do not define or limit the scope of the invention.

BRIEF DESCRIPTION OF THE DRAWINGS

FIG. 1 is a general view of a rail type universal parallel ruler device.

FIG. 2 is a side view showing a magnetic floating mechanism.

FIG. 3 is a side view showing an embodiments of the magnetic floating mechanism.

FIG. 4 is a side view showing another embodiment of the magnetic floating mechanism.

FIG. 5 is an elevation showing another embodiment of the magnetic floating mechanism.

FIG. 6 is a side view showing another embodiment of the magnetic floating mechanism.

FIG. 7 is a side view of a magnetic force adjusting mechanism.

FIG. 8 is a cross section of the elevation of the magnetic force adjusting mechanism.

FIG. 12 is a plan of a vertical cursor.

FIG. 13 is a cross section taken along a line A—A of FIG. 12.

FIG. 14 is a cross section showing another embodiment of the magnetic floating mechanism.

FIG. 15 is a plan showing an embodiment of the vertical cursor.

FIG. 25 is a side view showing an embodiment of the roller pressure relieving mechanism.

FIG. 26 is a side view showing another embodiment of the magnetic floating mechanism.

FIG. 27 is a side view showing another embodiment of the magnetic floating mechanism.

FIG. 50 is a side view of the another embodiment of the magnetic floating mechanism.

FIG. 51 is a plan of the another embodiment of the magnetic floating mechanism.

FIG. 52 is an elevation showing another embodiment of the magnetic floating mechanism.

FIG. 53 is an elevation illustrating an operation of the another embodiment of the magnetic floating mechanism.

FIG. 54 is an elevation showing another embodiment of the magnetic floating mechanism.

FIG. 55 is an elevation illustrating an operation showing another embodiment of the magnetic floating mechanism.

FIG. 56 is a general plan of the rail type universal parallel ruler device.

FIG. 57 is an elevation showing a connecting mechanism of the vertical cursor and the head.

FIG. 58 is an elevation illustrating an operation of the connecting mechanism of the vertical cursor and the head.

FIG. 59 is an elevation showing another embodiment of the magnetic floating mechanism.

FIG. 77 is an elevation showing another embodiment of the guiding mechanism of tail portion of vertical rail.

FIG. 78 is an elevation illustrating an operation of the guiding mechanism of tail portion of vertical rail.

FIG. 79 is an explicable view showing another embodiment of the guiding mechanism of tail portion of vertical rail.

FIG. 80 is an explicable view showing an operation of the guiding mechanism of tail portion of vertical rail.

DETAILED DESCRIPTION OF THE INVENTION

Figure 9:
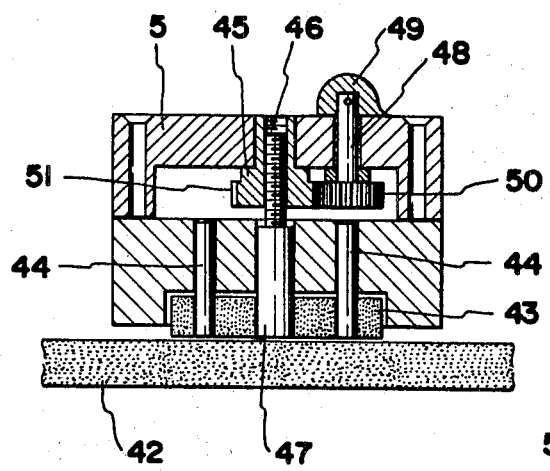
FIG. 9 is a cross section showing an embodiment of the magnetic force adjusting mechanism.

In FIG. 1, numeral 1 is a drawing board and is fixed in a given inclined angle table (not shown). Numeral 2 is a horizontal rail fixed to the drawing board 1 by means of a vice fixture 60, and a horizontal cursor 4 is connected to the horizontal rail 2 shiftably by means of a roller 3. The roller is rotatably mounted on a shaft fixed to the horizontal cursor 4, and the surface of the roller 3 is rotatably fitted to V-shaped grooves 61 and 62 which are formed over an entire length of the horizontal rail 2 in its longitudinal direction. Numeral 5 is a bracket connected to one end of a vertical rail 6, and its lower end is supported rotatably and pivotally on a rising portion of the horizontal cursor 4 centering around a shaft 7 in parallel with the horizontal rail 2. On a tail portion of the vertical cursor 6, a tail portion roller 8 is rotatably mounted. The vertical rail 6 is connected to a vertical cursor 10 shiftably by means of a roller 9 (refer to FIG. 5), and a head 12 is connected to the vertical cursor 10 by means of a hinge member 11. Straightedges 63, 64 are mounted on the head 12.

Next, a mechanism for decreasing the traveling load of the cursor is described by referring to FIG. 2.

Numeral 13 is a magnetic member, and is fixed to an entire length of the horizontal rail 2. Numeral 14 is a magnetic member fixed to the bracket 5, which derives repulsion magnetic force between the magnetic members, 13, 14. A floating force in (a) direction is caused to work on the vertical rail 6 by the repulsion magnetic force. When it is assumed that the floating force does not work on the vertical rail 6 without using the magnetic members 13, 14, and in case the drawing board is floated relative to the floor surface, a large load is applied to the roller 3 in a direction opposite to an arrow direction (a) by the weight of the vertical rail 6, and the roller 3 is urged against the V-shaped groove 61 by the load.

However, in the embodiment of this invention, the pressure contact force is decreased by the repulsion magnetic force in the (a) direction. Accordingly, the horizontal cursor 4 is allowed to shift smoothly along the horizontal rail 2.

FIG. 3, numeral 15 is a magnetic member disposed over almost an entire length of the horizontal rail 2 in parallel therewith, and both end portions of the magnetic member 15 are fixed to a mounting member 65 projected on both end portions of the horizontal rail 2. Numeral 16 is a magnetic member fixed to the bracket 5, and between the magnetic members 16 and 15, attractive magnetic force is derived. The floating magnetic force in the (a) direction is caused to work on the vertical rail 6 by the attractive magnetic force.

FIG. 2, numeral 13 is a magnetic member and is fixed over an entire length of the horizontal rail 2. Numeral 17 is a magnetic member fixed to the bracket 5, and the repulsion magnetic force is derived between the magnetic members 17 and 13. The floating magnetic force in (b) direction is caused to work on the vertical rail 6. In case it is assumed that the floating magnetic force does not work on the vertical rail 6 and the drawing board 1 is set horizontal to the floor surface, the weight of the vertical rail 6 is applied on the roller 3 in a direction opposite to the (b) direction, and the roller 3 is urged against the V-shaped grooves 61, 62 by the weight of the vertical rail 6. However, when the floating magnetic force is worked on the vertical rail 6, the pressure contact force of the roller 3 against the V-shaped grooves 61, 62 is decreased. Accordingly, the horizontal cursor 4 can be lightly and smoothly shifted along the horizontal rail 2.

In FIG. 3, numeral 18 is a magnetic member, and is disposed in almost entire length of the horizontal rail 2 in parallel therewith. Numeral 19 is a magnetic member disposed on the bracket 5, and attractive magnetic force is derived between the magnetic members 19 and 18. The floating force in the (b) direction of the vertical rail 6 is caused to work by the attractive magnetic force, and this floating force allows the horizontal cursor 4 to shift lightly along the V-shaped groove rails 61, 62.

In FIG. 2, numeral 20 is a magnetic member and is fixed over an entire length of the drawing board 1 in its horizontal direction. Numeral 21 is a magnetic member fixed to a tail portion of the vertical rail 6, and the magnetic member 21 is opposed to the magnetic member 20, and the repulsion magnetic force is caused to work between the magnetic members 20 and 21. Contact pressure of the tail portion roller 8 on the surface of the drawing board 1 is decreased, and the tail portion of the vertical rail 6 is allowed to travel lightly and smoothly along the surface of the drawing board 1.

In FIG. 3, numeral 22 is a magnetic member and is fixed over an entire length of the horizontal rail 2. Numeral 23 is a magnetic member disposed in the bracket 5, and the vertical rail 6 is energized in (d) direction by the repulsion magnetic force working between the magnetic member 23 and 22.

FIG. 3 shows a construction in which a magnetic member 24 is disposed in parallel with the horizontal rail 2, and a magnetic member 25 is provided on the bracket 5, and both are attracted, and the magnetic force in the (d) direction is caused to work on the vertical rail 6, and the load applied on the V-shaped groove rail surfaces 61, 62 is decreased by the roller 3 of the horizontal cursor 4.

FIG. 4 shows a construction in which a magnetic member 26 is provided on the horizontal rail 2, and a magnetic member 27 is provided on the horizontal cursor 4, and both are attracted, and the magnetic force in an (e) direction is caused to work on the horizontal cursor 4.

FIG. 3 shows a construction in which a magnetic member 28 is provided over almost an entire length of the horizontal rail 2 in parallel therewith, and a magnetic member 29 is provided on the horizontal cursor 5, and both are caused to repulse and the magnetic force in the (e) direction is caused to work on the horizontal cursor 4.

FIG. 6 shows a construction in which magnetic members 29, 30 are provided in parallel with the horizontal rail 2, and magnetic members 31, 32 are provided in parallel with the horizontal cursor 4, and repulsion magnetic force is derived between the magnetic members 31 and 29, and also between 30 and 32 or the attractive magnetic force is derived between the magnetic members 31 and 29 and also between 30 and 32, and the load applied on the rail surface is decreased.

FIG. 5 shows a construction in which a magnetic member 33 is provided along the vertical rail 6, and a magnetic member 34 is provided on the vertical cursor 10, and repulsive magnetic force is derived between them, and the floating force is caused to work on the cursor 10.

By the way, the floating force may be worked on the cursor 10 by utilizing the repulsion magnetic force of the magnetic members.

Also, in the constructions of the embodiments, a single construction or a combined construction may be employed. Also, it is possible to provide magnetic floating force on all of the tail portions of the horizontal cursor 4, vertical cursor 10 and vertical cursor 6, or it is possible to provide a magnetic force floating mechanism on at least one of the foregoing mechanisms, and the magnetic force may be worked on the mechanism. These embodiments fall within the scope of the invention.

Both of the opposed magnetic members may be spontaneous magnetic members or in case the attractive magnetic force of the magnetic member is utilized, one of them may be a sensitive magnetic members.

By forming such constructions, the load of the cursor applied on the surface of the rail can be decreased by the roller through the working of the magnetic force of the magnetic member, and the shifting of the horizontal cursor 4 and/or the vertical cursor 10 along the rail becomes light, and the head 12 can be manually manipulated along the surface of the drawing board 1 smoothly by light force.

Next, means for adjusting the intensity of the magnetic force of the magnetic member is described.

In FIGS. 7 and 8, numeral 35 is a magnetic member and numeral 36 is a shaft supported rotatably on the bracket 5, and a magnetic member 37 and a worm wheel 38 are fixed to the shaft 36. Numeral 39 is a worm, and numeral 40 is a knob fixed to a worm shaft 41.

In the foregoing construction, when the knob 40 is turned, the worm wheel 38 is turned, and the magnetic member 37 is shifted to the side relative to the magnetic member 35, and the intensity of the magnetic force working between the magnetic members 37 and 35 is changed. Quantity of change of the intensity of the magnetic force can be read by a graduation (not shown).

In FIG. 9, numeral 42 is a magnetic member provided on the horizontal rail, and numeral 43 is a magnetic member, and numeral 44 is a guide shaft, and numeral 45 is a nut shaft supported rotatably on the bracket 5, and a screw portion of a shaft 47 connected to the magnetic member 43 is screwed to a thread hole 46 of the nut shaft 45, numeral 48 is a shaft supported rotatably on the bracket 5, and a knob 49 is fixed to one end of the shaft, and a gear 50 is fixed to the other end. The gear 50 is meshed with a gear 51 provided on the nut shaft 45.

In the foregoing construction, when the knob 49 is turned, the nut member 45 is turned, and the shaft 47 is shifted in vertical direction on the surface of the drawing, and the magnetic member 43 is made to contact or separate relative to the magnetic member 42, and the intensity of the magnetic force working on the magnetic members 43, 43 is changed.

Figure 10:
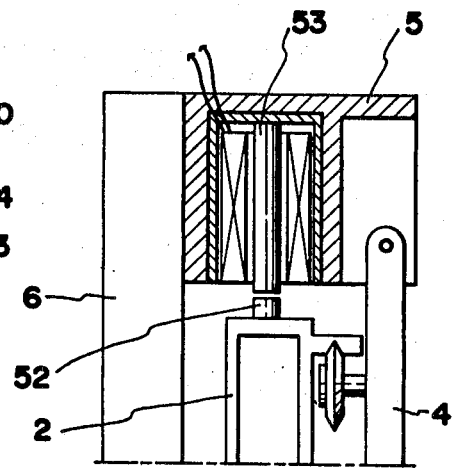
FIG. 10 is a cross section showing another embodiment of the magnetic force adjusting mechanism.

In FIG. 10, numeral 52 is a magnetic member, and numeral 53 is an electromagnet, and the magnetic force of the electromagnet 53 is arranged to be properly adjusted by the volume.

By the way, a potentiometer is provided on a reclining device of the drawing board 1, and the electromagnet 53 is controlled by the change of resistance value of the potentiometer, and the intensity of the magnetic force of the electromagnet may be arranged to be automatically changed in proportion to the inclined angle of the drawing board.

By the provision of the adjusting means, even if the load applied on the drawing board is changed due to the cahnge of the inclined angle, the magnetic force can be set to an optimum condition in correspondence to the change.

Other embodiments are described by referring to FIGS. 11 through 17.

Figure 11:
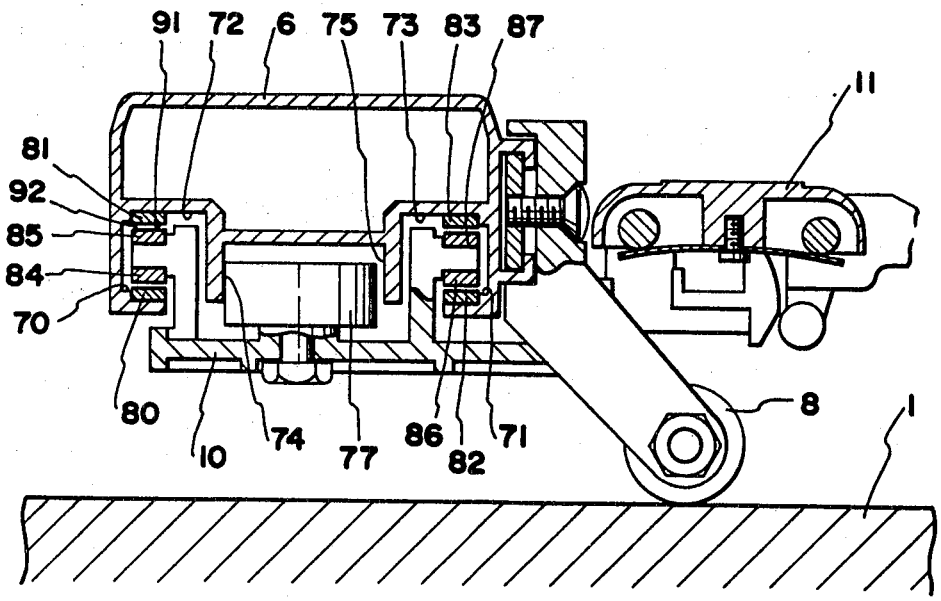
FIG. 11 is a cross section taken along a line B—B of FIG. 12.

In FIGS. 11 through 13, numeral 1 is a drawing board, which is mounted on the reclining table so that it can be fixed in a given inclined angle. Numeral 2 is a horizontal rail fixed to the drawing board 1, and a horizontal cursor 4 is shiftably connected to the horizontal rail. Numeral 6 is a vertical rail mounted on the horizontal cursor 4, and a tail portion roller 8 is mounted rotatably on the one end of the vertical rail. A vertical cursor 10 is shiftably connected to the vertical rail 6, and a head 12 is connected to the cursor 10 by a hinge member 11. Straightedges 63, 64 are mounted on the head 12.

In the logitudinal direction of the vertical rail 6, cursor traveling surfaces 70, 71, cursor upper direction control surfaces 72, 73, which are formed in parallel with the surface of the drawing board 1, and horizontal swing control surfaces 74, 75 are formed in perpendicular to the surface of the drawing board 1. The surfaces of rollers 76, 77 pivotally supported rotatably on the vertical cursor 10 contact the horizontal swing control surface 74, and the surfaces of rollers 78, 79 contact the horizontal swing control surface 75. Numerals 80, 81, 82, 83 are magnetic members of long plate type which are fixed along the surfaces 70, 72, 71, 73, and in this embodiment, manganese aluminum magnet is used for the magnetic members. Numerals 84, 85 and 86, 87 are magnetic members, namely, magnets fixed on a rising portion of the vertical cursor 10, and the magnets are opposed in a certain gap with the magnets 80, 81, 82, 83 as shown in the drawing. The polarity of the magnets which are mutually opposed is set similarly, and the vertical cursor 10 is completely floated relative to the cursor traveling surfaces 70, 71 of the vertical cursor 6 by the repulsion magnetic force of the mutually opposed magnets, and also the vertical cursor 10 retains a predetermined gap to the upper direction control surfaces 72, 73. Numerals 88, 89, 90 are auxiliary rollers mounted rotatably on the vertical cursor 10, and are opposed to the magnetic pole surfaces of the magnets 80, 81 and 82, 83. The opposed gap of the magnets 80, 81, 82, 83 and rollers 88, 89, 90 is set smaller than the opposed gap of the magnets 80, 81, 82, 83 and 84, 85, 86, 87. On the magnets 80, 81, 82, 83, Teflon 91 is coated. By the way, it is possible to apply a coating of the Teflon 92 on the surfaces of the magnets 84, 85, 86, 87 instead of providing the auxiliary rollers 88, 89, 90. The auxiliary rollers 88, 89, 90 and Teflon 91, 92 constitute the frictional force decreasing member.

In the foregoing construction, when the external stress along the vertical rail 6 is applied to the vertical cursor 10 10, the vertical cursor 10 is shifted in the complete floating condition relative to the traveling surfaces 70, 71 of the vertical rail 6. When the strong external force is applied to the vertical cursor 10 and vertical vibration occurs, the auxiliary rollers 88, 89, 90 contact the magnets 80, 81, 82, 83, and the rollers 88, 89, 90 receive the pressure of vibration by the contact. When the vertical cursor 10 is shifted, the rollers 76, 77, 78, 79 are rotated while contacting the control surfaces 74, 75. The foregoing construction is provided between the horizontal cursor 4 and the horizontal rail 2.

In FIGS. 14 and 15, numeral 95 is a roller pivotally supported rotatably on a rising portion 97 of a vertical cursor 96, and the roller 95 is mounted on a traveling surface 99 of a vertical rail 98. Numerals 100, 101 are magnets fixed to the vertical cursor 96, and numerals 102, 103 are magnets fixed to the side of the vertical rail 98, and a left member side of the vertical cursor 96 on the drawing is floated relative to a traveling surface 104 of the vertical rail 98 by the repulsion magnetic force of the magnets 100, 102, In this embodiment, if at least a part of the cursor 96 is arranged to float relative to the traveling surface of the rail 98, the cursor 96 can be smoothly shifted along the rail 98, and as a result, it shows that satisfactory effect can be obtained. By the way, an embodiment in which the cursor 96 is floated relative to the traveling surface of the rail 98 by the attractive force of the magnets is possible.

Figure 16:
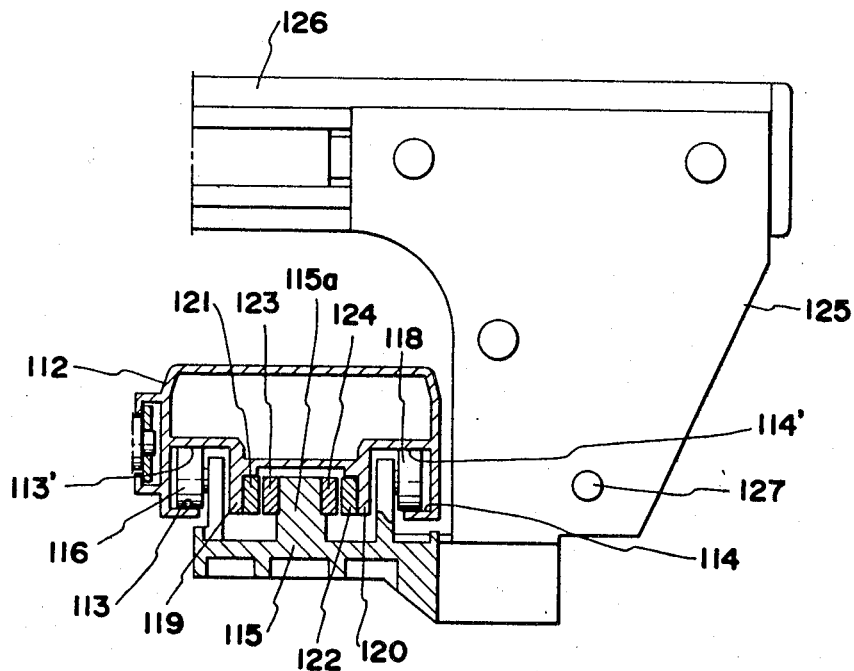
FIG. 16 is a side view of a mechanism for controlling a shifting direction of the cursor by the magnetic force.
Figure 17:
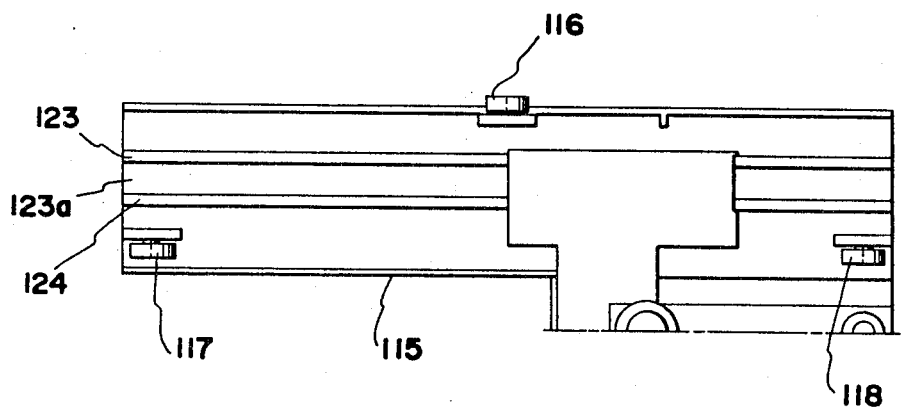
FIG. 17 is a plan of a horizontal cursor.
Figure 18:
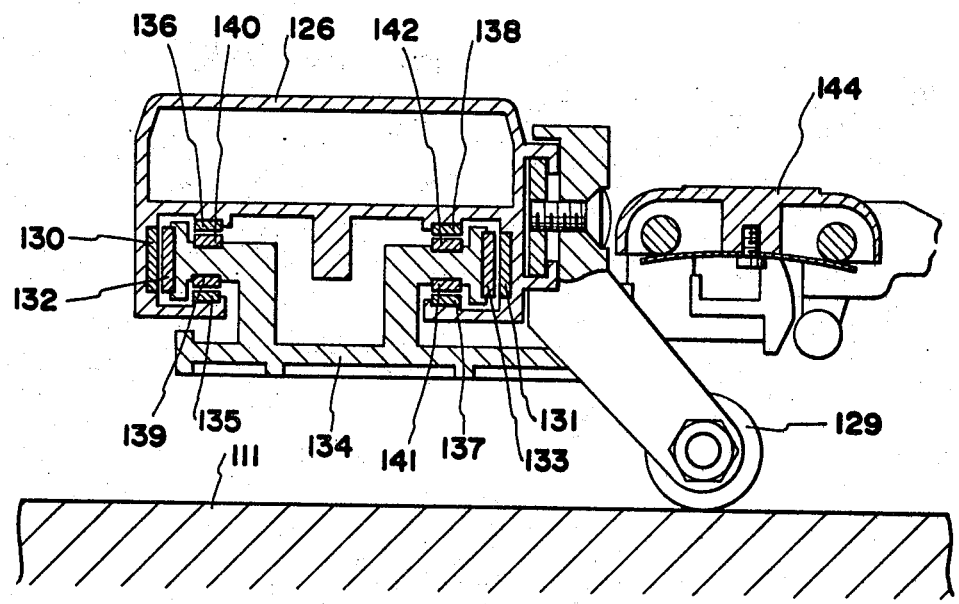
FIG. 18 is a cross section showing an embodiment of a mechanism for controlling a shifting direction of the cursor by the magnetic force.

Next, another embodiment is described by referring to FIGS. 16 through 18.

In this embodiment, a position in a right angle direction of the cursor to a longitudinal direction of the rail is controlled by the repulsion magnetic force of the magnets, and by this arrangement, the cursor can be shifted smoothly along the rail.

Numeral 112 is a horizontal rail fixed to an upper edge portion of a drawing board 111, and roller mounting surfaces 113, 114 are formed horizontally to the surface of the drawing board 111 in longitudinal direction of the rail 112. Rollers 116, 117, 118 pivotally and rotatably supported on a horizontal cursor 115 are mounted on the roller mounting surfaces 113, 114. Numerals 119, 120 are a pair of suspending members suspended in parallel along a longitudinal direction of the horizontal rail 112, and magnets 121, 122 of long plate type are fixed on the suspending members so that the magnetic pole surfaces are perpendicular to the surface of the drawing board 111. Numeral 115a is a rising portion formed on the horizontal cursor 115, and a pair of long magnets 123, 124 are fixed on the rising portion in close proximity and opposition to the magnets 121, 122. The magnets 121, 123, and 122, 124 are disposed so that their identical magnetic poles are opposed mutually. Numeral 125 is a bracket connected to an end of a vertical rail 126, and its lower end is pivotally supported on the rising portion of the horizontal cursor 115 which is rotatably centering around a shaft 127 in parallel with the rail 112. A tail portion roller 129 is rotatably mounted on the other end of the vertical rail 126. A pair of magnets 130, 131 are fixed so that the magnetic pole surfaces are perpendicular to the surface of the drawing board 111. Numerals 132, 133 are magnets fixed to a rising portion of a vertical cursor 134, and the magnets are opposed in proximity of the magnets 130, 131 in the condition where the magnetic forces are repulsed. Numerals 135, 136, 137, 138 are magnets fixed in a longitudinal direction of the vertical cursor 16. Numerals 139, 140, 141, 142 are magnets fixed to a vertical cursor 134, and the magnets are opposed in such a condition where magnetic forces of the magnets 135, 139 and 136, 140 and 137, 141 and 138, 142 are repulsed, and the vertical cursor 134 is completely floated relative to the vertical rail 126 by the magnets 135, 136, 137, 138, 139, 140, 141 and 142. A head is connected to the vertical cursor 134 by means of a hinge member 144, and a straightedge is mounted on the head. By the way, in this embodiment, commercially available manganese aluminum magnets are used for such magnets.

Next, an operation of the embodiment is described.

In FIG. 16, the magnets 121, 123 and 122, 124 are mutually strongly repulsed, and a position of right angle direction of the horizontal cursor 115 is controlled in its longitudinal direction to the horizontal rail 112. When the external stress is applied in a direction along its longitudinal direction of the horizontal rail 112 relative to the horizontal cursor 115, the horizontal cursor 115 is shifted in a condition that its vertical direction is controlled by the roller mounting surfaces 113, 114 and control surfaces 113, 114 along the longitudinal direction of the horizontal rail 112, and the horizontal direction is controlled by the magnetic pole surfaces of the magnets 121, 122.

In FIG. 18, when the external stress is applied in the longitudinal direction of the vertical rail 126 to the vertical cursor 134, a vertical direction of the vertical cursor 134 is controlled by the magnetic pole surfaces of the magnets, and is shifted along its longitudinal straight line direction of the vertical rail 126.

Figure 19:
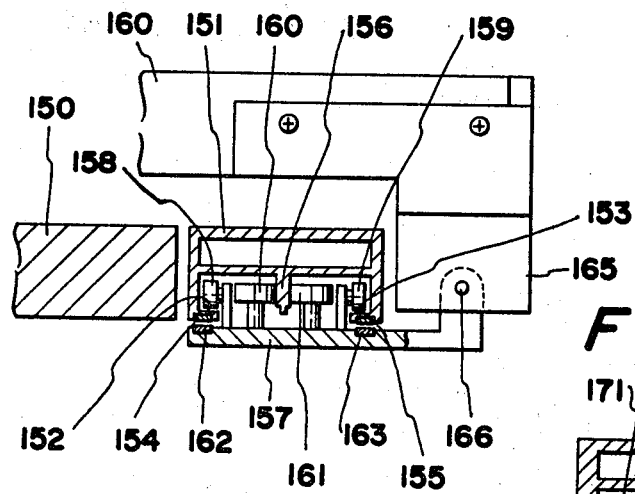
FIG. 19 is a side view showing another embodiment of the magnetic floating mechanism.

Next, another embodiment is described by referring to FIG. 19.

Numeral 150 is a drawing board, and on its upper edge portion, a horizontal rail 151 is fixed by a vice type fixture. Horizontal rail portions 152, 153 are formed on the lower portion of both side portions of the horizontal rail 151 along the longitudinal direction, and on the lower surfaces of the horizontal rail portions 152, 153, magnets 154, 155 are fixed over an entire length in the longitudinal direction. In almost a center portion of the lower portion of the horizontal rail 151, a perpendicular rail portion 156 is formed along its longitudinal direction. Numeral 157 is a horizontal cursor, and a plurality of vertical safety rollers 158, 159 are rotatably supported on the horizontal cursor 157, and the safety rollers 158, 159 are opposed by providing a proper interval on the horizontal surfaces of the horizontal rail portions 152, 153. Numeral 160 is a plurality of horizontal guide rollers pivotally and rotatably supported on the horizontal cursor 157, and are in contact with one rail surface of the perpendicular rail portion 156. Numeral 161 is one or a plurality of horizontal guide rollers which are pivotally and rotatably supported on the horizontal cursor 157, and are in contact with the other rail surface of the perpendicular rail portion 156. Numerals 162, 163 are magnets fixed to the horizontal cursor 157 opposed to immediately below the magnets 154, 155, and the same pole surfaces of the magnets 154, 162 are mutually opposed, and repulsion force is caused to work between the magnets, and the different pole surfaces of the magnets 155, 163 are mutually opposed and the attracting magnetic force is caused to work between the magnets. Numeral 164 is a vertical rail, and a bracket 165 is fixed to one end of the vertical rail, and the lower portion of the bracket 165 is rotatably and pivotally 166 supported centering around an axis parallel to the horizontal rail 151 on the rising portion of the horizontal cursor 157. A tail portion of the vertical rail 164 is floated relative to the surface of the drawing board by the repulsion magnetic force of the magnets.

Next, an operation of this embodiment is described.

When the load W caused by the dead weight of the vertical cursor 164 is applied downwardly on the connecting portion of the horizontal cursor 157 and the vertical rail 164, namely, the shaft 166, the pressure $$\frac{(L-I)W}{I}$$

is applied to the opposed portions of the magnets 154, 162 in a direction where the magnets are caused to approach. Where L is a distance between the magnet 162 and the shaft 166, and I is a distance between the magnet 162 and the magnet 163.

The pressure of $$\frac{(L-I)W}{I}$$

is offset by the repulsion magnetic force of the magnets 154, 162, and the magnet 162 is opposed to the magnet 154 at a predetermined gap.

To the opposed portion of the magnets 155, 163, the pressure of (WL/I) is applied in a direction where the magnets are opposed, but this pressure is offset by the attractive magnetic force of the magnets 155, 163, and the magnet 163 is opposed to the magnet 155 at a predetermined gap. Rotary moment working on the horizontal cursor 157 by the attractive magnetic force of the magnets 155, 163 and the repulsion magnetic force of the magnets 154, 162 is offset, and the guide rollers 160, 161 are received almost no pressure from the rail surface, and the safety rollers 158, 159 are completely floated relative to the rail surfaces 152, 153.

Figure 20:
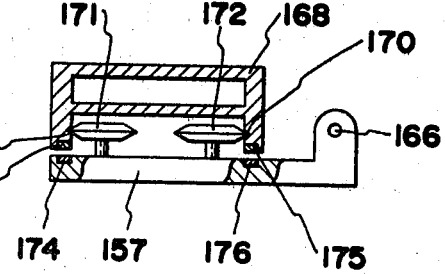
FIG. 20 is a side view showing another embodiment of the magnetic floating mechanism.

In the foregoing construction, when the force is applied in a given direction parallel to the surface of the drawing board 150 by grasping the handle of the head by the hand, the horizontal cursor 157 is shifted lightly and smoothly along the horizontal rail 151, and the vertical cursor is shifted along the vertical rail 164, and the head can be shifted to a desired position on the drawing board 150. By the way, as shown in FIG. 20, V-shaped groove rails 169, 170 are formed on the horizontal rail 168, and a convex stripe on the surface of the rollers 171, 172 rotatably and pivotally supported on the horizontal cursor 157 may be fitted to the V-shaped groove rails 169, 170.

Numerals 173, 174 are magnets disposed so that the repulsion magnetic forces are worked mutually, and numerals 175, 176 are magnets disposed so that the repulsion magnetic forces are worked mutually.

Figure 21:
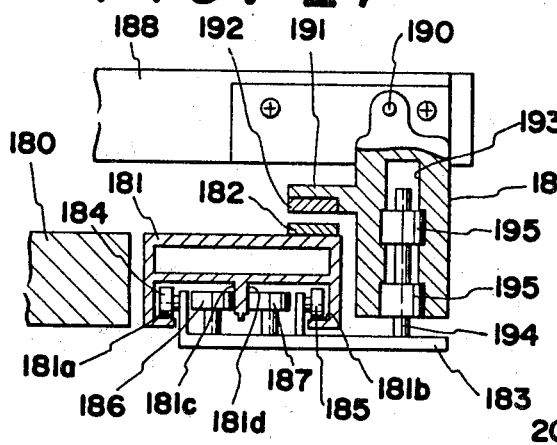
FIG. 21 is a side view showing another embodiment of the magnetic floating mechanism.

Next, another embodiment is described by referring to FIG. 21. Numeral 180 is a drawing board, and is fixed to a drawing board support frame of a drawing bench so that the drawing board can be set at a given inclined angle between the horizontal condition and the perpendicular condition relative to the floor surface. Numeral 181 is a horizontal rail fixed to an upper edge portion of the drawing 180 by means of a vice type fixture (not shown), and horizontal rail surfaces 181a, 181b and perpendicular rail surfaces 181c, 181d are formed on the horizontal rail over an entire length in the longitudinal direction, and a magnet 182 is fixed on the upper surface of the horizontal rail 181. Numeral 183 is a horizontal cursor, and a plurality of vertical rollers 184, one or a plurality of vertical rollers 185, a plurality of horizontal rollers 186, and one or a plurality of horizontal rollers 187 are rotatably supported on the horizontal cursor 183, and the vertical rollers 184, 185 are mounted on the horizontal rail surfaces 181a, 181b, and the horizontal rollers 186, 187 are in contact with the perpendicular rail surfaces 181c, 181d. Numeral 188 is a vertical rail, and an upper portion of a bracket 189 is pivotally (190) and rotatably supported on one end portion of the vertical rail 188 which centers around an axis parallel with the horizontal rail 181, and a magnet 192 is fixed to a projecting member 191 formed on the bracket 189. The same pole surface of the magnets 192, 182 are opposed, and one end portion of the vertical rail 188 is floated relative to the upper surface of the horizontal rail 181 by the repulsion magnetic force of the magnets 192, 182. The magnets 192, 182 constitute the magnetic floating mechanism. A hollow cylindrical portion 193 is formed on the bracket 189 in a direction perpendicular to the surface of the drawing board, and a shaft 194 projected on the horizontal cursor 183 is slidably fitted to the hollow portion 193 by means of a slide ball bearing 195. The shaft 194, slide ball bearing 195 and hollow portion 193 constitute the roller pressure relieving mechanism. A magnet (not shown) is fixed to the tail portion of the vertical rail 188, and the magnet is opposed to a magnet (not shown) fixed to a lower edge portion of the drawing board 180. The same pole surface of the magnet at the tail portion of the vertical rail 188 and the magnet at the lower edge portion of the drawing board 180 are opposed, and the tail portion of the vertical rail 188 is floated relative to the lower edge portion of the drawing board 180 by the repulsion magnetic force.

Next, an operation of the embodiment is described.

When the head is applied with pressure in a given direction parallel to the surface of the drawing board 180, the horizontal cursor 183 is controlled by the perpendicular rail surfaces 181c, 181d, and is shifted along the horizontal rail 181, and the vertical cursor is shifted along the vertical rail 188, and the straightedge can be shifted to a given position on the drawing board 180. When the inclined angle of the drawing board 180 is changed, or the head is raised and the under surface of the head is retained at a position floated relative to the surface of the drawing board 180, the load in perpendicular direction to the surface of the drawing board 180 which is applied to the bracket 189 is changed. In correspondence to the change of the load, an opposed gap of the magnets 192, 182 is changed, and the bracket 189 is displaced in perpendicular direction to the surface of the drawing board 180. When the bracket 189 is displaced in perpendicular direction to the surface of the drawing board 180, the bracket 189 is slid to the shaft 194, and the horizontal cursor 183 is not interlocked with displacement of the bracket 189 in perpendicular direction to the surface of the drawing board 180 by the sliding motion of the braket 189. Accordingly, no eccentric load is applied to the guide rollers 186, 187 for prevention of horizontal swing which contact the perpendicular rail surfaces 181c, 181d.

Namely, the slide bearing 195 and the shaft 194 constitute the roller pressure relieving mechanism for preventing change of the pressure of the guide rollers to the guide rail surfaces by the displacement of the magnetic floating gap of the vertical rail 188 to the surface of the drawing board.

Figure 22:
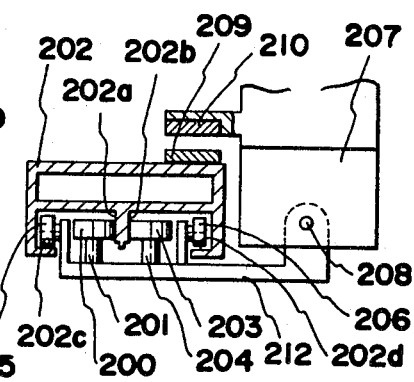
FIG. 22 is a side view showing another embodiment of the magnetic floating mechanism.

Next, another embodiment of the relieving mechanism is described by referring to FIG. 22.

Numeral 200 is a horizontal guide roller fitted rotatably on a plurality of shafts 201 projected on a horizontal cursor 212 by a gap in a radial direction, and the surface of the roller 200 is in contact with the perpendicular rail surface 202a of the horizontal rail 202. Numeral 203 is a horizontal guide roller fitted rotatably on one or a plurality of shafts 204 projected on the horizontal cursor 212 at a gap in a radial direction, and the surface of the roller 203 is in contact with the perpendicular rail surface 202b formed on the horizontal rail 202. The horizontal swing of the horizontal cursor 212 to the horizontal rail 202 is prevented by the rollers 202, 203. Numeral 205 is a plurality of vertical guide rollers rotatably and pivotally supported on the horizontal cursor 212, and the surface of the roller 205 is in light contact with the horizontal rail surface 202c formed on the horizontal rail 202. Numeral 206 is a horizontal safety roller pivotally and rotatably supported on the horizontal cursor 212, and is opposed to the horizontal rail surface 202d at a predetermined gap. Numeral 207 is a bracket fixed to one end of the vertical rail, and the lower portion of the bracket is pivotally (208) and rotatably supported on the rising portion of the horizontal cursor 212 centering around an axis parallel to the surface of the drawing board. Numerals 209, 210 are magnets disposed at the side of the horizontal rail 202 and the bracket 207, and the bracket 207 is floated relative to the horizontal rail 202 at a predetermined gap by the repulsion magnetic force of the magnets 209, 210. Other constructions are same with the foregoing embodiment, the description is omitted. When the opposed gap of the magnets 209, 210 is changed, and the bracket 207 is liftably displaced in perpendicular direction to the surface of the drawing board, the horizontal cursor 212 is interlocked with the bracket 207, and is inclined with the guide roller 205 as a fulcrum. When the horizontal cursor 212 is inclined, the shafts 201, 204 are also inclined to the perpendicular rails 202a, 202b, but the guide rollers 200, 203 are not interlocked with the inclination of the shafts 201, 204 on account of the gap present between the shafts 201, 204 and the guide rollers 200, 203 and as a result, the guide rollers 200, 203 are in contact with the perpendicular rail surfaces 202a, 202b in parallel therewith. By this arrangement, the eccentric load is prevented from being applied to the guide rollers 200, 203.

Figure 23:
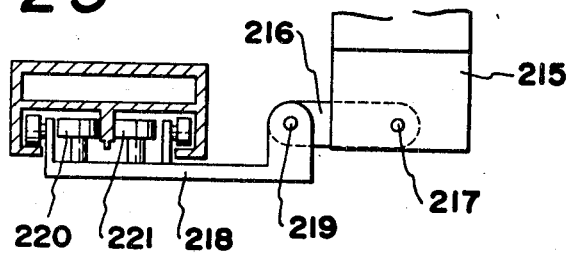
FIG. 23 is a side view showing a roller pressure relieving mechanism.

Next, another embodiment is described by referring to FIG. 23.

Numeral 215 is a bracket, and a vertical rail is fixed to the upper portion of the bracket. Numeral 216 is a hinge member, and one part of the hinge member is pivotally (217) and rotatably supported on the bracket 215 centering around an axis in parallel to the surface of the drawing board, and the other part of the hinge member 216 is pivotally (219) and rotatably supported on a rising portion of a horizontal cursor 218 centering around an axis to the above axis.

In the foregoing construction, when the bracket 215 is liftably displaced, the hinge member 216 is rotated centering around the axes 217, 219, and the lifting displacement of the bracket 215 is not transmitted to the cursor 218. Consequently, no eccentric load is applied to traverse vibration preventing guide rollers 220, 221 of the horizontal cursor 218.

Figure 24:
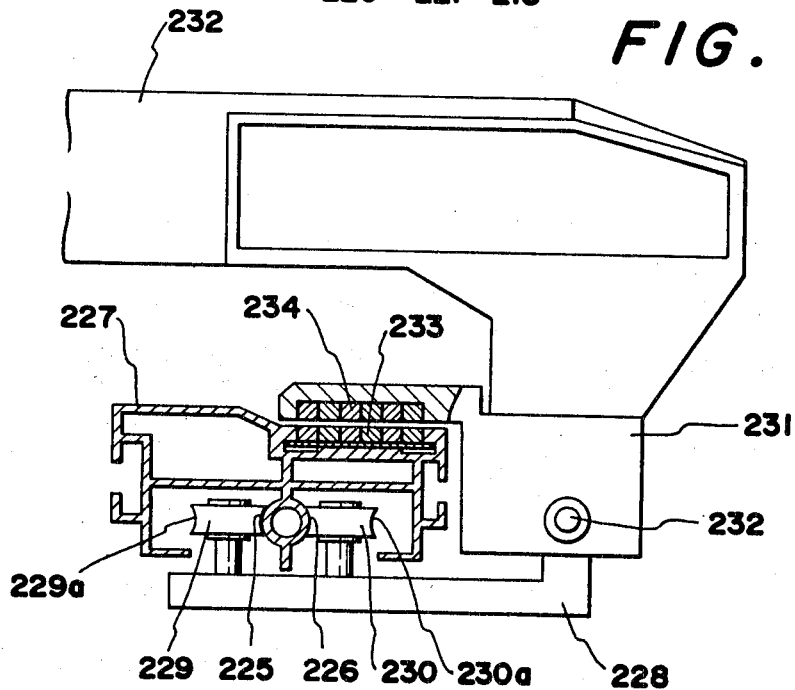
FIG. 24 is a side view showing another embodiment of the magnetic floating mechanism.

Next, another embodiment is described by referring to FIG. 24.

Numerals 225, 226 are convex curved surface rails formed over an entire length of a horizontal rail 227 in its longitudinal direction, and concave curved surfaces 229a, 230a of the horizontal guide rollers 229, 230 pivotally and rotatably supported on the horizontal cursor 228 are fitted rotatably to the convex curved surface rails. Numeral 213 is a bracket, and one end of a vertical rail 232 is fixed to the upper portion of the bracket 213, and the lower portion of the bracket 231 is rotatably and pivotally (232) supported on the rising portion of the horizontal cursor 228 in a plane perpendicular to the surface of the drawing board. Numeral 233 is a magnet fixed to the upper surface of the horizontal rail 227 over an entire length of the horizontal rail 227 in its longitudinal direction, and the magnet 233 is opposed to a magnet 234 fixed to a projecting member of the bracket 231, and the bracket 231 is energized in upper direction by the repulsion magnetic force working between the magnets 233 and 234, and is floated relative to the horizontal rail 227 at a predetermined gap.

In the foregoing construction, the opposed gap of the magnets 233, 234 is changed, when the bracket 231 is moved vertically in a direction perpendicular to the surface of the drawing board, the rising portion side of the horizontal cursor 228 is moved vertically by being interlocked with the bracket 231. When the rising portion side of the horizontal cursor 228 is moved vertically, the concave curved surfaces 229a, 230a of the guide roller 229 for prevention of horizontal swing are slid in circumferential direction along the convex curved surface rails 225, 226, and the contact fitted condition of the convex curved surface rails 225, 226 and the guide rollers 229, 230 is maintained without the eccentric load being applied to the guide rollers 229, 230. By the way, safety rollers may be provided on the horizontal cursor 228 in opposition to the horizontal rail surface of the horizontal rail 227.

Next, another embodiment is described by referring to FIG. 25.

Numeral 236 is a guide rail portion formed on the horizontal rail 237 over an entire length in its longitudinal direction, which is formed with a convex curved surface 236a and a concave curved surface 236b. Numeral 238 is a horizontal cursor, and a vertical guide roller 239, vertical safety roller 240, and horizontal guide rollers 241, 242 for prevention of traverse vibration are rotatably and pivotally supported on the horizontal cursor, and the guide roller 239 is mounted rotatably on a horizontal rail surface 243, and the safety roller 240 is opposed to the horizontal rail surface 244 at a predetermined gap. A convex curved surface is formed on the surface of the guide roller 241, and the convex curved surface is in tight contact with the concave curved surface rail 236b. A concave curved surface is formed on the surface of the guide roller 242, and the concave curved surface is in tight contact with the convex curved surface rail 236a. The curvature of the concave curved surface rail 236a and the convex curved surface rail 236b is set to be identical with the curvature of a rotary locus in vertical direction direction centering around the guide roller 239 of the horizontal cursor 238, and when the horizontal cursor 238 is rotated in the vertical direction centering around the guide roller 239, the rollers 241, 242 are arranged to slide while maintaining the tight contact condition with the rail surfaces 236a, 236b along the rail surfaces. Numeral 246 is a bracket.

In the foregoing construction, when the bracket 246 is moved vertically, the horizontal cursor 238 is moved vertically centering around the guide roller 239, and the rollers 241, 242 are slid along the rail surfaces 236a, 236b. Accordingly, there is no chance that the eccentric load is applied to the rollers 241, 242 by the vertical displacement of the horizontal cursor 238.

Next, another embodiment is described by referring to FIG. 26.

Numeral 250 is a rail member formed over an entire length of a horizontal rail 251 in its longitudinal direction, and a magnet 252 is fixed over an entire length of the rail member 250 in its longitudinal direction. Numeral 253 is a magnet disposed in opposition to the magnet 252 at the lower surface of a horizontal cursor 254, and same pole surfaces of the magnets 252, 253 are mutually opposed and repulsion magnetic force is worked between the opposed surfaces, and the horizontal cursor 254 is energized by the repulsion magnetic force in a direction of floating relative to the rail member 250, and a guide roller 255 is in contact with a horizontal rail surface 256 by almost zero pressure. Numerals 257, 258 are horizontal guide rollers for prevention of traverse vibration, and inner rings of the guide roller are rotatably fitted to shafts 259, 260 projected on the horizontal cursor 254 by a gap in a radial direction. Numeral 261 is safety roller, and numeral 262 is a bracket, and one end of a vertical rail 263 is fixed to an upper portion of the bracket 262, and the lower portion is rotatably and pivotally (265) supported on a rising portion of the horizontal cursor 254 in a plane perpendicular to the surface of a drawing board 264.

In the foregoing construction, when the load of the bracket 262 in downward direction perpendicular to the surface of the drawing board 264 is changed, an opposed gap of the magnets 252, 253 is changed, and the horizontal cursor 254 is inclined in a vertical direction with the guide roller 255 as a fulcrum. The shafts 259, 260 are inclined to the perpendicular rail surfaces 266, 267 by the inclination of the horizontal cursor 254, but the rollers 257, 258 maintain the parallel contact condition against the perpendicular rail surfaces 266, 267 by a gap between the rollers 257, 258 and the shafts 259, 260, and the eccentric load is prevented from being applied to the rollers 257, 258.

Moreover, as the magnets 252, 253 are disposed so that the magnets are positioned on an axis perpendicular to the surface of the drawing board 264 which passes a connecting portion 265 of the perpendicular rail 263 and the horizontal cursor 254, the load applied in downward direction to the horizontal cursor 254 by means of the shaft 265 by the dead load of the vertical rail 263 and the external stress applied on the vertical rail 263 is offset by the repulsion magnetic force derived from the magnets 252, 253, and there is worked no pressure between the vertical guide 255 and the horizontal rail surface 256, and the horizontal cursor 254 is shifted along the horizontal rail 251 in almost a floated condition.

In the rail type universal parallel ruler device, when the load applied on the traveling member is changed, and a magnetic floating gap of the traveling member to the guiding member is greatly changed, various inconveniences are derived. Under the circumstances, in the following embodiment, the foregoing inconveniences are eliminated by arranging a plurality of magnetic pole tracks in parallel on the opposed portion of the traveling member and the guiding member. The foregoing arrangement is made by the following reason.

Figure 29:
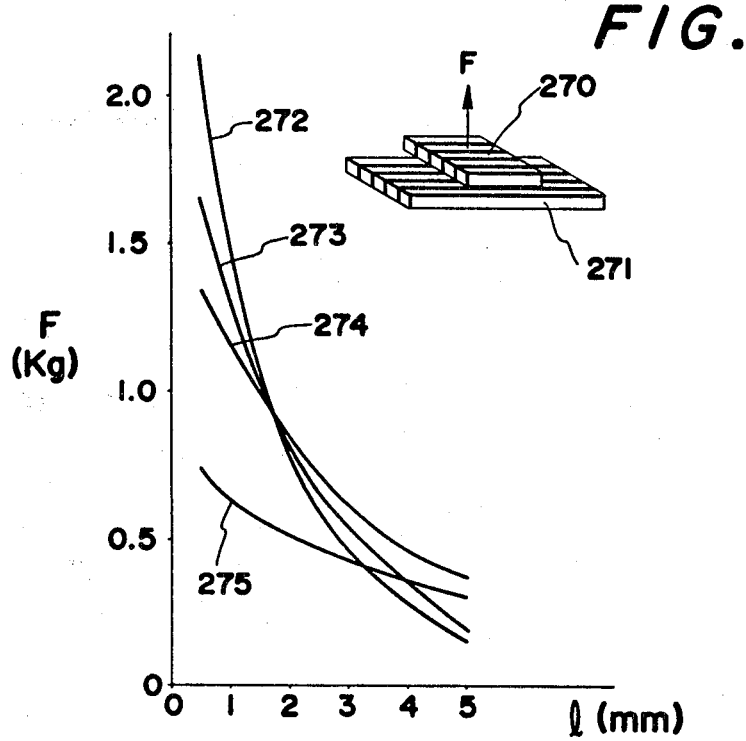
FIG. 29 is a characteristics diagram of magnet.

As shown in FIG. 29, when repulsion magnetic force of the magnet is set on the axis of coordinates and the gap of the magnets 270, 271 is set on the axis of abscissa, and magnets 270 are arranged in 8 rows in parallel so that mutually different poles are adjacent, and the magnets 271 are arranged in 8 rows in parallel so that mutually different poles are adjacent, and moreover the magnets 270, 271 having same pole are opposed, gap-repulsion magnetic force characteristics is represented by a curve 272. Numeral 273 is a characteristics curve of the case where the magnets are in 6 rows, and numeral 274 is a characteristics curve of the case where the magnets are in 4 rows, and numeral 275 is a characteristics curve of the case where the magnets are in 2 rows. As will be obvious from the foregoing characteristics curves, the curve of the characteristics curve becomes steep as the number of rows of the magnets is increased and magnetic poles are increased. Namely, although, the repulsion magnetic force becomes big, the attenuation of the repulsion magnetic force relative to the widening of the gap becomes remarkable. This phenomenon leads to a conclusion that in case a condition where a predetermined load of a degree that the magnet 270 is not in contact with the magnet 271 is applied in downward direction to the magnet 270 is changed to a condition where the load is changed in load decreasing direction, the change of the gap of the magnet 270 to the magnet 271 becomes small if the number of rows of the magnets 270, 271 is on the increase. The magnetic members are such that when they are separated farther from the opposed magnetic pole surfaces, magnetic flux density is attenuated, but if the number of rows of the magnets is bigger, the attenuation is remarkable as compared with the number of rows of the magnets is small. Accordingly, when one magnet is floated relative to the other magnet by the repulsion magnetic force, and the load applied to the one magnet toward the other magnet is changed from a maximum value to a minimum value, in order to minimize the change of the opposed gap of a pair of magnets, the rows of the magnets may be increased in parallel direction.

This embodiment is based on the foregoing concept.

The construction of the embodiment is described by referring to FIG. 27.

Numeral 276 is a drawing board and is mounted on a drawing bench so that it can be set at a given inclined angle between an almost upright condition to a horizontal condition relative to the floor surface. Numeral 277 is a horizontal rail made of drawing form aluminum which is fixed to an upper edge portion of the drawing board 276 by means of a vice type fixture 278, and a space portion 279 for insertion of magnetic member is formed over an entire length of the horizontal rail in its longitudinal direction, and an upper wall portion 279a forming the space portion 279 is formed to a thickness that allows the magnetic force to work on the outside sufficiently. Numeral 280 is a bandlike iron plate inserted and disposed in the space portion 279, and the under surface of the iron plate is in tight contact with the bottom surface of the space portion 279, and both side portions of the iron plate 280 are in tight fitting to grooves 281, 282 formed over an entire length of the space portion 279 at the lower end of the side wall forming the space portion 279.

Numeral 283 is 8 pieces of bandlike magnet rubbers which are press fitted into the space portion 279 over its entire length, and the magnet rubbers are arranged in parallel so that different poles are adjacent, and each under surface is attracted to the iron plate 280. Numeral 284 is a horizontal cursor, and a plurality of horizontal rollers 285 which are rotatably and pivotally supported on the horizontal cursor are in contact with one surface of a pair of perpendicular rail surfaces formed on the horizontal rail 277 along in its longitudinal direction, and one or a plurality of horizontal rollers 286 which are rotatably and pivotally supported on the horizontal cursor 284 are in contact with another surface of the perpendicular rail surfaces. Numeral 287 is a plurality of vertical rollers which are rotatably and pivotally supported on the horizontal cursor 284, and these surfaces are in contact with the horizontal rail surface 288 formed on the horizontal rail 277. Numeral 289 is one or a plurality of safety rollers which are rotatably and pivotally supported on the horizontal cursor 284, and being opposed to the horizontal rail surface 290 of the horizontal rail 277 at a proper gap. Numeral 291 is a vertical rail, and a vertical bracket 292 is fixed to the vertical rail 291, and the vertical bracket 292 is pivotally (293) and rotatably supported on the horizontal cursor 284 centering around an axis horizontal to the surface of the drawing board 276. Numeral 294 is a horizontal portion formed on the vertical bracket 292, and 8 pieces of magnet rubber 295 are arranged on the horizontal portion in parallel as illustrated so that mutually different poles are adjacent. A plurality of magnetic pole tracks are formed on the magnetic pole surface of the 8 pieces of magnet rubbers 283, 295. A magnet rubber group 295 at the side of the bracket 292 and a magnet rubber group 283 at the side of the horizontal rail 277 are disposed in such a way that the repulsion magnetic force is worked as the same pole surfaces are opposed mutually and the vertical bracket 292 is floated relative to the horizontal rail 277 by the repulsion magnetic force.

The vertical bracket 292 constitutes the traveling member, and the horizontal rail 277 constitutes the guiding member.

Next, an operation of this embodiment is described.

When the handle of the head is grasped by the hand and is applied with a pressure in a given direction parallel to the surface of a drawing board 276, the horizontal cursor 284 is shifted along the horizontal rail 277, and the vertical cursor is shifted along the vertical rail 291, and the head can be shifted to a desired position on the drawing board 276 by the shifting thereof. When the drawing board 276 is inclined from the horizontal condition to the rising direction, for example, to 80° relative to the floor surface, the load applied on the vertical bracket in perpendicular direction to the surface of the drawing board 276 is greatly decreased as compared with the horizontal condition of the drawing board 276. However, the opposed gap of the magnetic pole surface of the horizontal rail 277 and the magnetic pole surface of the bracket 292 side is not widely changed according to the reduction of the load, and the change is minimal quantity. This is caused by the fact that the magnetic pole surface is formed by a plurality of parallel magnet rubbers. Accordingly, the horizontal cursor 284 is merely slightly inclined in anti-clockwise direction in FIG. 27 centering around the vertical rollers 287 even if the vertical bracket 292 is changed in upper direction to the surface of the drawing board 276 so that parallelness of the surfaces of the horizontal rollers 285, 286 to the perpendicular rail surface can be maintained by the gap between the horizontal rollers 285, 286 and the shaft supporting the rollers, and the surfaces of the horizontal rollers 285, 286 are not inclined to the perpendicular rail surface. Also, a rising quantity of the safety rollers 289 to the horizontal rail surface 290 which is accompanied by the rising of the drawing board 276 is minimal quantity.

Figure 28:
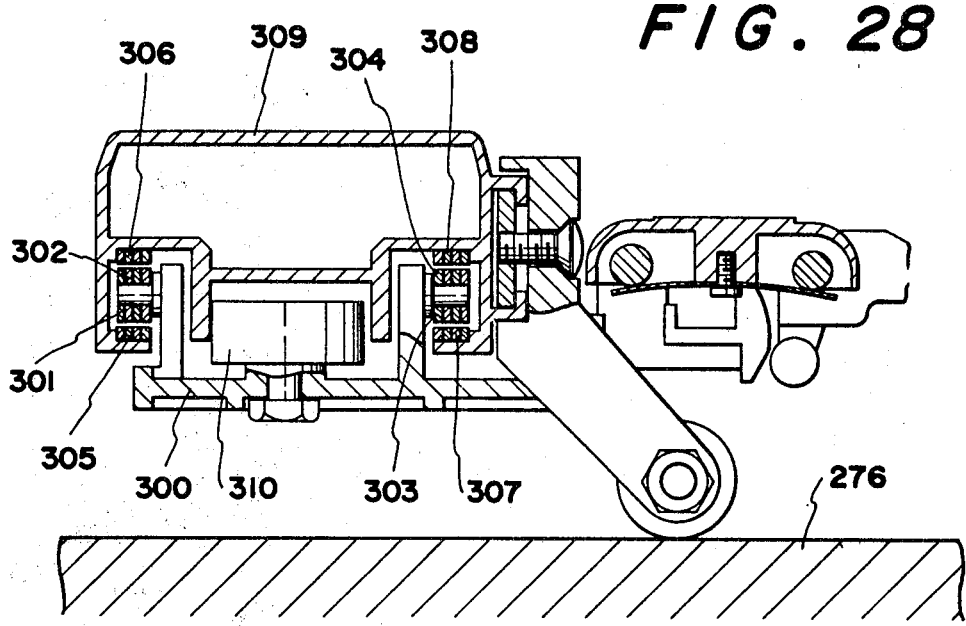
FIG. 28 is a cross section showing another embodiment of the magnetic floating mechanism.

Next, another embodiment is described by referring to FIG. 28.

Numeral 300 is a vertical cursor, and magnets 301, 302, 303 and 304 consisting of 4 pieces of magnet rubbers are disposed on top and bottom surfaces of a horizontal portion of the rising portions formed at both sides of the vertical cursor. The respective magnet rubbers of the magnets 301, 302, 303 and 304 are arranged in parallel so that mutually different poles are adjacent. A plurality of rows of magnetic pole tracks are formed on the magnetic pole surfaces of the magnets. Numerals 305, 306, 307 and 308 are magnets having a plurality of rows of magnetic pole tracks which are arranged on a vertical rail 309 to be opposed to the magnets 301, 302, 303 and 304, and each of the magnets consists of 4 pieces of magnet rubbers, and the magnet rubbers are arranged in parallel so that mutually different poles are adjacent. The magnets 301 and 305, 302 and 306, 303 and 307, and 304 and 308 are such that the same pole surfaces are opposed and the vertical cursor 300 is floated relative to the vertical rail 309 by the repulsion magnetic force working between them. Numeral 310 is a guide roller for prevention of traverse vibration.

In the foregoing construction, when the drawing board 276 is changed from the horizontal condition to the perpendicular condition, the load of the vertical cursor 300 working in the perpendicular direction to the vertical rail 309 is decreased remarkably. However, there is not much change in the floating gap between the magnets 301, 303 and the magnets 305, 307. Accordingly, there is no need for providing a bigger space in the vertical rail 309 for accommodating the magnets 301, 302, 303 and 304, and the vertical rail 309 can be made in compact form. The vertical cursor 300 constitutes the traveling member, and the vertical rail 309 constitutes the guiding member. By the way, the construction of dividing the magnetic pole surface of the magnet into a plurality of rows of magnetic pole tracks is not particularly limited to the embodiment, and a plural rows of magnetic pole structure may be employed in which the magnets which are provided in the opposed portion of the horizontal cursor (traveling member) and the horizontal rail (guiding member).

Figure 30:
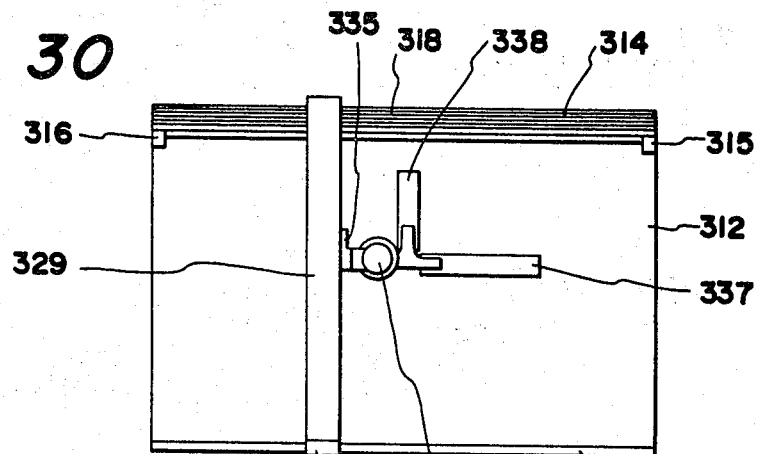
FIG. 30 is a general plan showing an embodiment of the rail type universal parallel ruler device.
Figure 31:
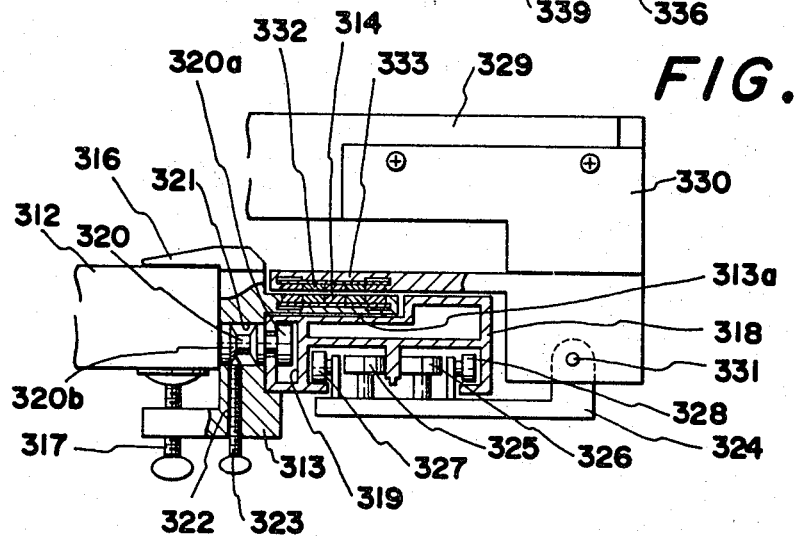
FIG. 31 is a side view showing another embodiment of the magnetic floating mechanism.
Figure 32:
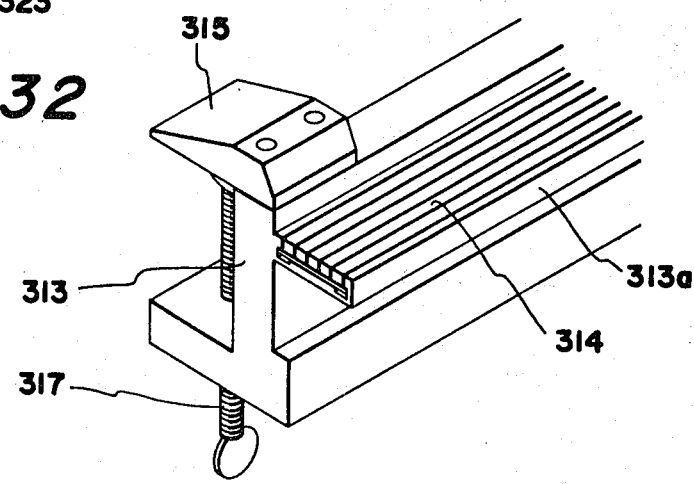
FIG. 32 is an exterior view or a vice type fixture.

Next, an embodiment of preventing the deflection of the horizontal rail is described by referring to FIGS. 30, 31 and 32.

Numeral 312 is a drawing board, and numeral 313 is a long plate member whose side is L-shape, and a long support portion 312a is integrally formed on a perpendicular portion of the long member, and a magnet consisting of 5 pieces of magnet rubbers wherein mutually different poles are adjacent is fixed to the upper surface of the support portion 313a, and the magnetic surface is formed by the magnet rubber group. Plate members 315, 316 are fixed to both ends of the perpendicular portion of the member 313, and a vice type fixture is formed at both end portions of the member 313 by the plate members 315, 316 and a horizontal portion of the member 313, and a screw bar 317 screwed to thread holes formed at both ends of the horizontal portion, and the long member 313 is fixed to both ends of the upper edge portion of the drawing board 312. Numeral 318 is a horizontal rail, and a T-shaped groove 319 is formed at side portion of the horizontal rail, and a flange portion 320a of a shaft 320 is disposed in the T-shaped groove 319. The shaft 320 is fitted and inserted into a lateral through hole 321 formed at an end portion of the long member 313, and a tapered tip of a screw lever 323 screwed to a vertical thread hole 322 formed on the member 313 is in pressure contact with an inclined surface 320b of the shaft 320, and one end portion of the horizontal rail 318 is fixed to one end portion of the member 313 by the pressure contact force. The other end portion of the horizontal rail 318 is fixed similarly to the other end portion of the member 313 by the same construction mentioned above. Numeral 324 is a horizontal cursor, and horizontal guide rollers 325, 326 pivotally and rotatably supported on the horizontal cursor are in contact rotatably with the perpendicular rail surface formed over an entire length of the horizontal rail 318 in its longitudinal direction. A vertical guide roller 327 rotatably and pivotally supported on one side portion of the horizontal cursor 324 is in contact with the horizontal rail surface formed along the horizontal rail along its longitudinal direction, and a vertical safety roller 328 rotatably and pivotally supported on the other side portion of the horizontal cursor 324 is opposed at a proper gap to the horizontal rail surface of the horizontal rail 314. Numeral 329 is a vertical rail, and a bracket 330 is fixed to an end portion of the vertical rail, and a lower portion of the bracket 330 is pivotally (331) supported on the horizontal cursor 324 so as to be rotatable centering around an axis parallel with a longitudinal direction of the horizontal rail 318. Numeral 332 is a magnet consisting of 5 pieces of magnet rubber group disposed on the lower surface of a projecting member 333 formed on the bracket 320 so that mutually different magnetic poles are adjacent, and the magnet 332 is disposed to the magnet 314 in such a way that the same polarity surfaces are opposed in parallel, and the bracket 330 is floated relative to the member 313 by the repulsion magnetic force working between the magnets 332 and 314. Numeral 325 is a vertical cursor mounted shiftably on the vertical rail 329, and a head 336 is connected to the vertical cursor by means of a hinge member, and straightedges 337, 338 are detachably fixed to a straightedge mounting plate of the head 336. Numeral 339 is a bracket fixed to a tail portion of the vertical rail 329, and a magnet is fixed to the lower surface of the bracket, and the magnet is opposed to a magnet disposed at the lower edge portion of the drawing board 312, and the tail portion of the vertical rail 329 is floated relative to the surface of the drawing board 312 by the repulsion magnetic force working between the magnet 340 and the magnet disposed at the side of the bracket 339.

In the foregoing construction, the load of downward direction by the dead weight of the vertical rail 329 at one end portion of the vertical rail 329 is applied to the support portion 313a of the long member 313 by means of the magnets 332, 314, and the load is not applied on the horizontal rail 318. When the head 336 is applied with pressure in a given direction parallel to the surface of the drawing board 312 by the hand, the horizontal cursor 324 is guided by the perpendicular surface of the horizontal rail 318 and is shifted along the horizontal rail 318, and the vertical cursor 335 is shifted along the vertical rail 329, and the head 336 and the straightedges 337, 338 can be shifted to desired positions on the drawing board 312.

Figure 33:
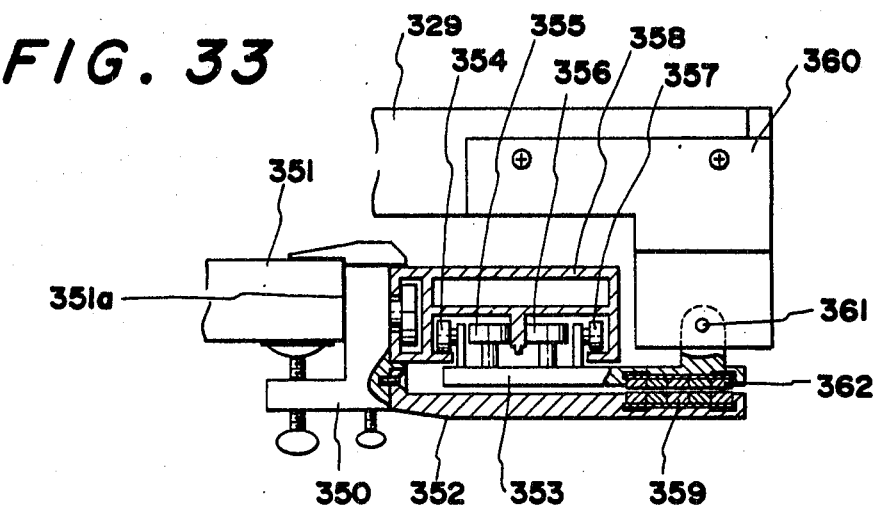
FIG. 33 is a side view showing another embodiment of the magnetic floating mechanism.

Next, another embodiment of preventing the deflection of the horizontal rail is described by referring to FIG. 33.

Numeral 350 are vice type fixtures (the other is omitted) fixed to both end portions of the upper edge of the drawing board 351, and a long member 352 having a length almost same with an entire length of the side surface 351a of the drawing board 351 is fixed to the fixture 350. Numeral 353 is a horizontal cursor, and a vertical guide roller 354 and horizontal guide rollers 355, 356 are rotatably and pivotally supported on the horizontal cursor 353, and the rollers are in contact with the opposed rail surface as shown in the drawing, and a safety roller 357 is opposed at a proper gap to the horizontal rail surafce of the horizontal rail 358. Numeral 359 is a magnet fixed to an entire length of the member 352 along a shifting line of a connecting portion of the horizontal cursor 353 and a bracket 360 on the upper surface of the member 352, and the magnet 359 is opposed to a magnet 362 fixed to the lower surface of the horizontal cursor 353 which is positioned immediately below the connecting portion 361, and the bracket 360 is floated relative to the member 352 by the repulsion magnetic force working between the magnets 362 and 359.

In the foregoing construction, the downward load by the dead weight of the vertical rail 329 and the dead weight of the horizontal cursor 353 at one end portion of the vertical rail 329 is applied to the long member 352 through the magnets 359, but it is not applied to the horizontal rail 358.

Figure 34:
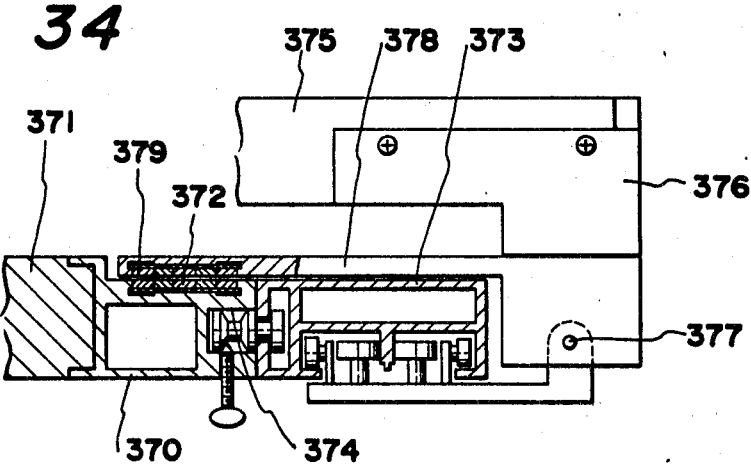
FIG. 34 is a side view showing another embodiment of the magnetic floating mechanism.

Next, another embodiment is described by referring to FIG. 34.

Numeral 370 is a rail member fixed integrally to the end surface of upper edge of the drawing board 371 over its entire length, and a magnet 372 is fixed to the upper surface of the rail member 370 over an entire length in its longitudinal direction. Numeral 373 is a horizontal rail whose both end portions are fixed to the side surface forming the T-shaped groove 374 of the rail member 370, and the lower portion of a bracket 376 fixed to one end of the vertical rail 375 is rotatably and pivotally (377) supported on the horizontal rail. Numeral 378 is a projecting member projected on the bracket 376, and a magnet 379 is fixed to the lower surface of the projecting member in opposition to the magnet 372, and the bracket 376 is floated relative to the rail member 370 by the repulsion magnetic force of the magnets 372, 379. Accordingly, the downward load by the dead weight of the vertical rail 375 is not applied to the horizontal rail 373, and is applied to the rail member 370 integral with the drawing board 371 by means of the repulsion magnetic force of the magnets 372, 379.

Figure 35:
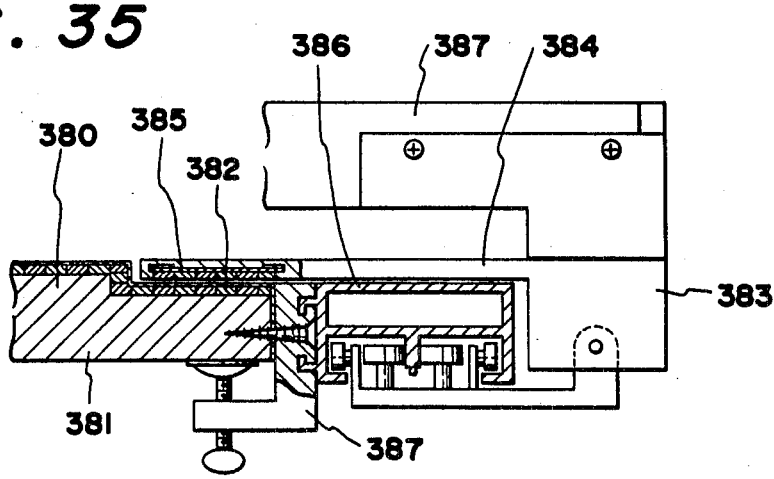
FIG. 35 is a side view showing another embodiment of the magnetic floating mechanism.
Figure 36:
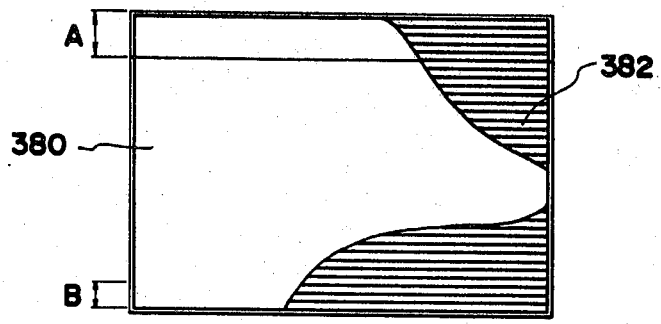
FIG. 36 is a plan of a drawing board.

Next, another embodiment of preventing the deflection of the horizontal rail is described by referring to FIGS. 35, 36.

Numeral 380 is a drawing board to which a bandlike magnet board 382 is fixed in horizontal direction over entire upper surface of a drawing board substrate 381 made of wood, or resin or paper core, and a strong magnetic force region is formed by a proper range A at the upper edge portion side of the drawing board 380 and a proper range B at the lower edge portion side of the drawing board 380. The upper surface of the drawing board 380 in the range A is set with a proper step to the other flat surface, and a magnet 385 fixed to the lower surface of a projecting member 384 of a bracket 383 is opposed to the magnet 382 of the range A, and the bracket 383 is floated relative to the drawing board 380 by the repulsion magnetic force of the magnets 382, 385. Numeral 386 is a horizontal rail and is fixed to the side of the upper edge of the drawing board 380 by means of a vice type fixture 387. In the magnetic force region in the range B of the lower edge portion of the drawing board 380, the magnet (not shown) fixed to the tail portion of the vertical rail 387 is opposed to the magnet 382 in the range B so that the magnet is repulsed in a direction of floating relative to the drawing board 380.

By the way, the foregoing embodiment shows the energization of the vertical rail in a direction of floating relative to the surface of the drawing board by utilizing the repulsion magnetic force of the magnets, but it is possible to energize the vertical rail in the floating direction by utilizing the attracting force of the magnets.

Next, another embodiment of the invention is described by referring to FIGS. 37 through 41.

Numeral 390 is a drawing board fixed to a support frame of the drawing board of a drawing bench 391, and a long stationary rail 393 is fixed to the upper edge portion of the drawing board in almost lateral width of the drawing board 390 by a vice type fixture 392, and magnets 394, 395 made of 3 pieces of magnet rubbers whose mutually different poles are adjacent along the rail in its longitudinal direction are fixed to the upper surface of the stationary rail 393. Numeral 396 is a horizontal rail of almost same length with the stationary rail 393 disposed on the stationary rail 393, and magnets 397, 398 made of 3 pieces of magnet rubbers whose mutually different poles are adjacent are fixed to the lower surface of the horizontal rail along its longitudinal direction. Numerals 399, 400 are traverse vibration control rail surfaces formed along the horizontal rail 396 in its longitudinal direction, and side shape thereof is an arched concave shape. A plurality of the convex curved surfaces of the horizontal guide rollers 401 which are rotatably and pivotally supported on the stationary rail 393 are in rotatable contact with the rail surface 399, and a plurality of the convex curved surfaces of the horizontal guide rollers which are rotatably and pivotally supported on the stationary rail 303 are in rotatable contact with the rail surface 400. The horizontal rail 396 is guided by the guide rollers 401 and is capable of shifting along the stationary rail 393 in its longitudinal straight line direction. The same pole surface of the magnet 397 is opposed to that of the magnet 394, and the same pole surfaces of the magnet 398 is opposed to that of the magnet 395. The horizontal rail 396 is floated relative to the stationary rail 393 by the repulsion magnetic force working between the magnet rubbers 394, 397 and 395, 398. Numerals 402, 403 are a plurality of vertical safety rollers which are rotatably and pivotally supported on both side portions of the horizontal rail 396, and these surfaces are opposed to the upper surface of the stationary rail 393 at a gap shorter than the floating gap of the horizontal rail 396 to the stationary rail 393. Numerals 404, 405 are magnets made of a pair of magnet rubbers fixed on the upper surface of the stationary rail 393 over an entire length in its longitudinal direction, and magnets 404 and 406 made of a pair of magnet rubbers fixed to both side portions of the lower surface of the horizontal cursor 405 are opposed to the magnets 404, 405, and the horizontal cursor 405 is floated relative to the horizontal rail 396 at a predetermined gap by the repulsion magnetic force working between the magnets 404 and 406, and 405 and 407. Numeral 408 is a horizontal guide roller which is rotatably and pivotally supported on the horizontal cursor 405, and the convex curved surface of the guide roller is in contact rotatably with the concave curved surface of the rail surface 408 of a pair of rail surfaces 408, 409 formed on the horizontal rail 396. The rail surface 409 is in contact rotatably with the convex curved surface of the horizontal guide roller (not shown) which is rotatably and pivotally supported on the horizontal cursor 405. The horizontal cursor 405 is guided by the rail surfaces 408, 409, and can be shifted along the horizontal rail 396 in a straight line direction. Numerals 410, 411 are vertical safety rollers which are rotatably and pivotally supported on both side portions of the horizontal cursor 405, and these surfaces are opposed to the upper surface of the horizontal rail 396 at a gap shorter than the magnetic floating gap of the horizontal cursor 405 to the horizontal rail 396. A plate-like stopper 412 is provided at the left end of the horizontal rail 396, and an elastic body 413 is provided at the end portion of the side of the horizontal rail 396. Numeral 414 is a pressure member fixed to the end portion of the side of the horizontal cursor 405, and the elastic body 413 is set so as to be positioned on a shifting line at the inside surface of the pressure member 414. Numeral 415 is a pair of mounting plates which are set at a proper gap at the left side of the horizontal cursor 405, and a bracket 417 fixed to one end of the vertical rail 416 is supported on a shaft 418 rotatably. The vertical rail 416 is set at right angles to the horizontal rail 396, and the horizontal rail 416 can be rotated in a perpendicular direction to the surface of the drawing board 390. A vertical cursor 419 is slidably mounted on the vertical cursor 416, and a head 420 is mounted on the vertical cursor 419 by means of a hinge member, and straightedges 421, 422 are detachably mounted on the straightedge mounting plate of the head 420. Numeral 423 is a lateral lever mounted at the side of the head 420 by projecting in right angle direction, and a tail portion roller 424 is rotatably mounted on the vertical rail 416 centering around an axis parallel to the vertical rail 416, and the tail portion roller 424 is mounted on a guide rail 425 fixed to the side of the lower edge of the drawing board 390 so as to be rotatable.

Next, an operation of the embodiment is described.

Figure 37:
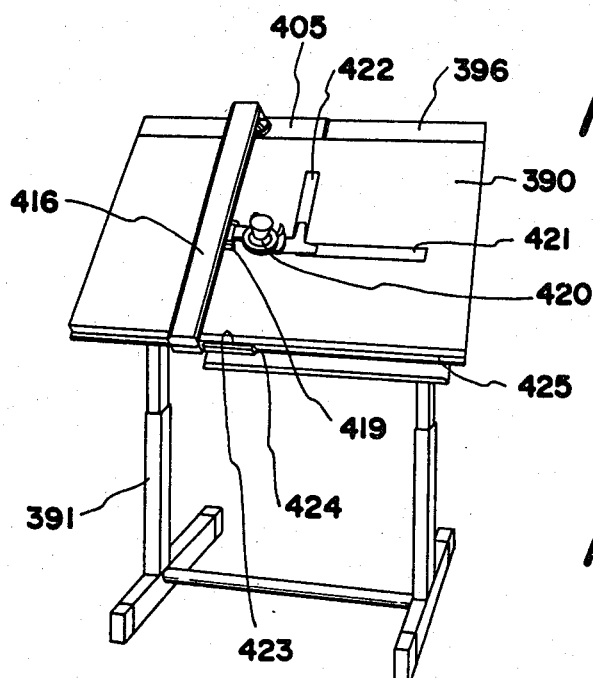
FIG. 37 is an exterior view of the rail type universal parallel ruler device.
Figure 38:
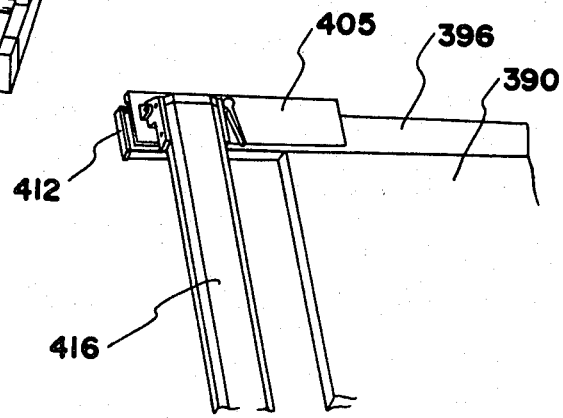
FIG. 38 is an exterior view of a part of the rail type universal parallel ruler device.
Figure 39:
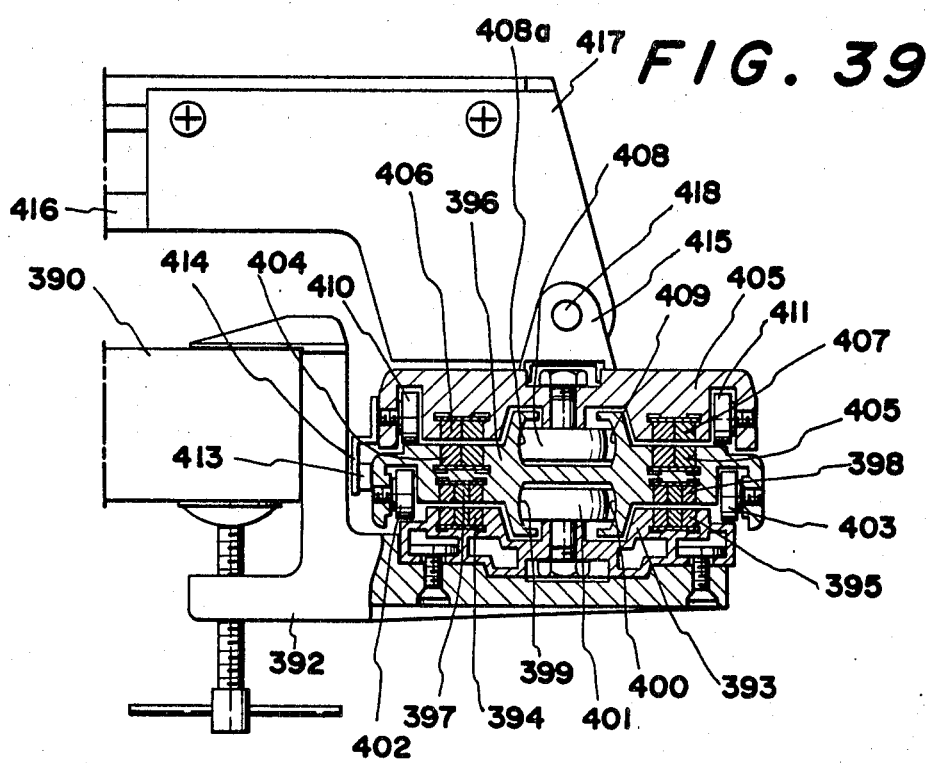
FIG. 39 is a side view showing another embodiment of the magnetic floating mechanism.

When the vertical rail 416 is shifted in left direction on FIG. 37, the horizontal rail 396 is shifted in left direction in a condition where the horizontal cursor 405 is floated relative to the horizontal rail along thereof, and the tail portion roller 424 is rotatably travelled in left direction on the surface of the guide rail. When the vertical rail 416 reaches an almost left end of the drawing board 390, the pressure member 414 contacts the elastic body 413, and the horizontal rail 396 is interlocked in left direction with the horizontal cursor 405 by the frictional force of the elastic body 413 and the pressure member 414 in floating condition relative to the stationary rail 393, and is pushed out in left direction along the stationary rail 393. When the horizontal rail 396 is shifted in a predetermined distance in left direction, the shifting in left direction is engaged by a stopper mechanism (not shown). Even if the horizontal rail 396 is engaged, when the horizontal cursor 405 is shifted in left direction, the pressure member 414 is shifted in left direction while resisting to the resilience of the elastic body 413 and applying the pressure to the elastic body 413, and an end portion of the horizontal cursor 405 contacts the stopper 412 of the horizontal rail 396. At this time, the elastic body 413 is in pressure contact with the side surface of the pressure member 414. As described above, when the horizontal cursor 405 is shifted to the end of the drawing board 390 in left direction until the horizontal cursor 405 is engaged with the stopper 412 of the horizontal rail 396, the vertical rail 416 is brought to the side of the drawing board 390, and the straightedge 422 can be shifted to the left end of the drawing board 390, thereby eliminating the dead space of the drawing board 390. When the horizontal cursor 405 is shifted in right direction, the horizontal rail 396 is interlocked with the horizontal cursor 405 by the resilient frictional force of the elastic body 413 against the inside surface of the pressure member 414, and is shifted in right direction, and the stopper 412 contacts the end portion of the stationary rail 393. If the horizontal cursor 405 is further shifted in right direction, the pressure member 414 is slid in right direction along the elastic body 413 by resisting to the resilient frictional force with the elastic body 413, and the resilient contact condition of the elastic body 413 and the pressure member 414 is released. During the traveling of the horizontal rail 396 along the stationary rail 393, the large load is applied downwardly to the horizontal rail 396, and the horizontal rail 396 is descended by resisting to the repulsion magnetic force, and as a result, the surfaces of the safety rollers 402, 403 contact the upper surface of the stationary rail 393, and the magnets 397, 398 and 394, 395 are prevented from coming into contact. Also, during the traveling of the horizontal cursor 405 along the horizontal rail 396, the large downward load is applied to the horizontal cursor 405, and the horizontal cursor 405 is descended by resisting to the repulsion magnetic force, and as a result, the surfaces of the safety rollers 410, 411 come into contact with the upper surface of the horizontal rail 396, and the magnets 406, 407 and magnets 404, 405 are prevented from coming into contact.

When the inclined angle of the drawing board 390 is changed, the load applied from one end portion of the vertical rail 416 to the horizontal cursor 405 in downward perpendicular direction to the surface of the drawing board 390, and the opposed gaps of the magnets 406, 407 and magnets 404, 405 are changed by the change of load, and the horizontal cursor 405 is inclined to the horizontal rail 396 centering around an axis parallel to the longitudinal direction of the horizontal rail 396. The guide roller 408 is displaced along the concave curved surface of the rail surface 408 by being interlocked with the inclination of the horizontal cursor 405, and the tight contacting condition of the rail surface 408 and the guide roller 408 is retained. Accordingly, there is no apprehension that the eccentric load is applied to the guide roller 408 by the inclination of the horizontal cursor 405. The case of the horizontal rail 396 and the stationary rail 393 is similar, and the opposed gaps of the magnets 397, 398 and magnets 394, 395 are changed, and even if the horizontal rail 396 is inclined to the stationary rail 393 centering around an axis in its longitudinal direction, the tight contacting condition of the guide roller 401 and the rail surface 399 is retained.

Figure 40:
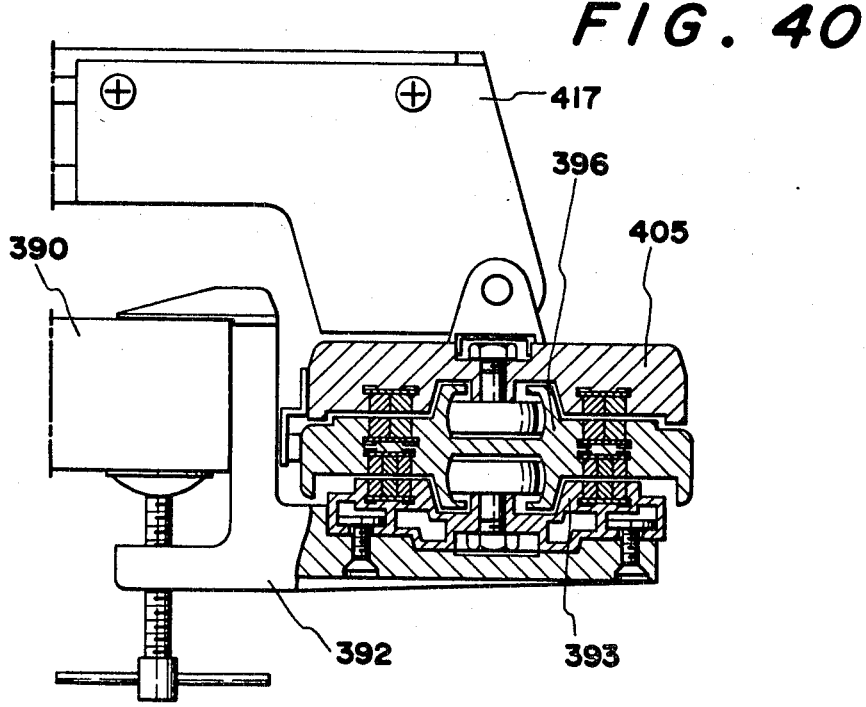
FIG. 40 is a side view showing another embodiment of the magnetic floating mechanism.
Figure 41:
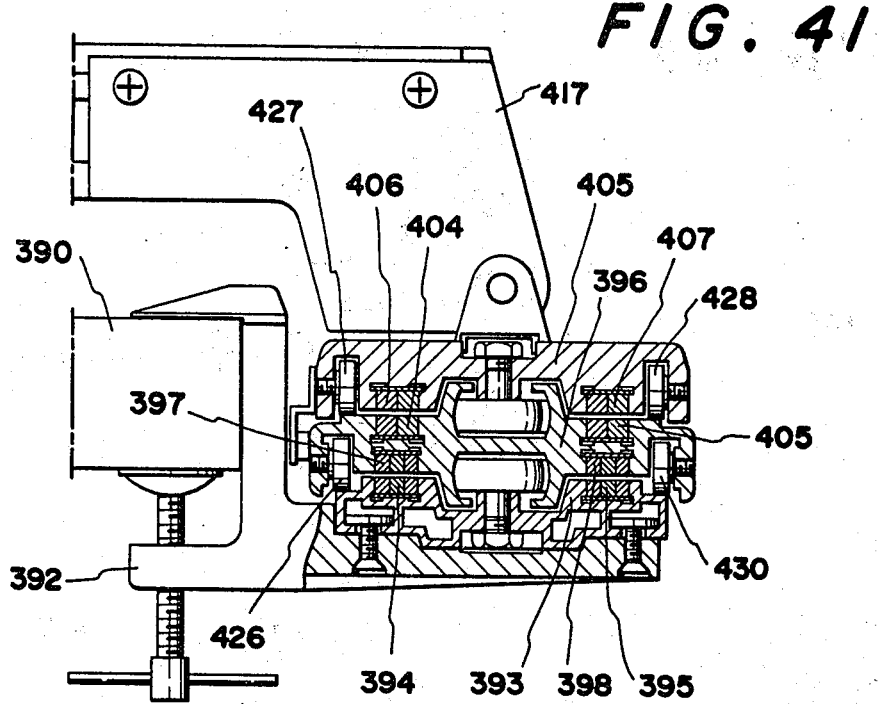
FIG. 41 is a side view showing another embodiment of the magnetic floating mechanism.

When the invention is put to work, a mechanism of supporting the tail portion of the vertical rail 416 on the drawing board 390 and outside position of the drawing board is not limited particularly to the construction of the lateral lever 423 and the tail portion roller 424 shown in the drawing. Also, when both the horizontal rail 396 and the vertical cursor 405 are completely floated, the movement of the vertical rail 416 becomes light which is most desirable one but either of the rail or cursor may be completely floated. When only the horizontal cursor 405 is completely floated, the movement of the horizontal rail 396 becomes heavy so that an advantageous point is derived that the horizontal rail 396 is not easily moved during the shifting of the horizontal cursor 405. Also, when only the horizontal rail 396 is completely floated, the movement of the horizontal cursor 405 becomes heavy but as the movement of the horizontal rail 396 becomes light, a difference between the force required for shifting only the horizontal cursor 405 and the force required for interlocking the horizontal cursor 405 with the horizontal rail 396 becomes small, and as a result, these forces are just balanced, thereby deriving an advantageous point of easy manipulation for shifting of the head. Also, as shown in FIG. 40, the safety rollers are not required to be provided, and furthermore, as shown in FIG. 41, horizontal guide rollers 427, 428 are provided on the horizontal cursor 405, and the vertical guide rollers are mounted and contacted on the upper surface of the horizontal rail 396, and there may be provided a construction in which the pressure applied on vertical guide rollers 427, 428 is decreased by the repulsion magnetic force of the magnets 404, 406, and magnets 405, 407, and also vertical guide rollers 429, 430 are provided on the horizontal rail 396, and the vertical guide rollers 429, 430 are mounted and contacted on the upper surface of the stationary rail 393, and there may be provided a construction in which the pressure applied on the vertical guide rollers 429, 430 is decreased by the repulsion magnetic force of the magnets 394, 397, and magnets 395, 398.

Figure 42:
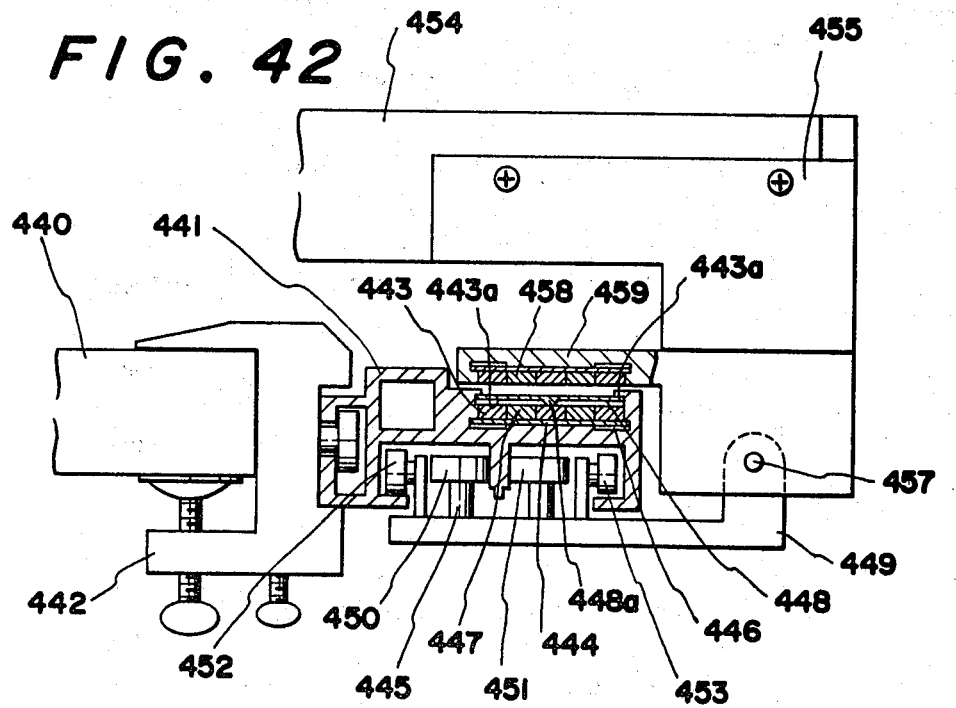
FIG. 42 is a side view showing another embodiment of the magnetic floating mechanism.

Next, another embodiment is described by referring to FIG. 42.

Numeral 404 is a horizontal rail made of aluminum drawn material fixed to the upper edge portion of the drawing board 440 by means of a vice type fixture 442, and a concave fitting portion 443 for insertion of magnet is formed over an entire length of the horizontal rail 441 in its longitudinal direction. Numeral 444 is a bandlike iron plate inserted and disposed in the concave fitting portion 443, and the lower surface of the iron plate is in tight contact with the bottom surface of the concave fitting portion 443, and both side protions of the iron plate 444 are tightly fitted to grooves 445, 446 formed on the lower end of the side wall forming the concave fitting portion 443 over an entire length of the concave fitting portion 443. Numeral 447 is a magnet consisting of 5 pieces of bandlike magnet rubbers which is press fitted into the concave fitting portion 443 over its entire length, and different poles thereof are disposed in parallel so as to be adjacent to each other and each lower surface is attracted to the iron plate 444. Both side portions of the magnet 447 are fitted to the grooves formed in the concave fitting portion 443. Numeral 448 is a cover plate disposed over an entire length of the concave fitting portion 443, and a projecting portion 448a of the cover plate 448 is in contact resiliently with the upper surface of the magnet 447, and its both side portions are in contact resiliently with horizontal surfaces 443a, 443a of the concave fitting portion 443. Numeral 449 is a horizontal cursor, and horizontal guide rollers 450, 451 which are rotatably and pivotally supported on the horizontal cursor 449 are in contact with the perpendicular rail surface formed along the horizontal rail 441 in its longitudinal direction. Numeral 452 is a vertical guide roller which is rotatably and pivotally supported on the horizontal cursor 449, and its surface is in contact with the horizontal rail surface formed on the horizontal rail 441 in its longitudinal direction. Numeral 453 is a safty roller and is opposed at a proper gap to the horizontal rail surface formed over an entire length of the horizontal rail 441 in its longitudinal direction. Numeral 454 is a vertical rail, and its one end is fixed to a bracket 455, and the lower portion of the bracket 455 is pivotally supported 457 on the rising portion of the horizontal cursor 449 so as to be rotatable centering around an axis parallel to the horizontal rail 441. Numeral 458 is a magnet made of 5 pieces of bandlike magnet rubbers fixed to the lower surface of a projecting member 459 formed on the bracket 455, and the magnet rubbers are disposed so that mutually different poles are adjacent, and also the same pole surfaces of the magnet 458 and the magnet 447 are arranged to be opposed. The bracket 455 is energized in a floating direction relative to the horizontal rail 441 by the repulsion magnetic force working between the magnets 447 and 458. This embodiment is formed in such a way that all the load applied to the bracket 455 is received by the repulsion magnetic force working between the magnets 447 and 458 but it may be constructed in such a way that a part of this load is received between the vertical guide roller 452 at the side of the horizontal cursor 449 and the horizontal rail surface.

By the way, it may be constructed in such a way that the magnet is press fitted to the vertical rail 454 in a similar construction with the horizontal rail 441 shown in FIG. 42 and the vertical cursor, namely, the traveling member is floated relative to the vertical rail 454 by the magnetic force. When the dusts are adhered to the surface of the magnet 447, the cover plate 448 is pulled out from the concave fitting portion 443 along the concave fitting portion 443 in its longitudinal direction, and thereafter the surface of the magnet 447 is cleaned.

Figure 43:
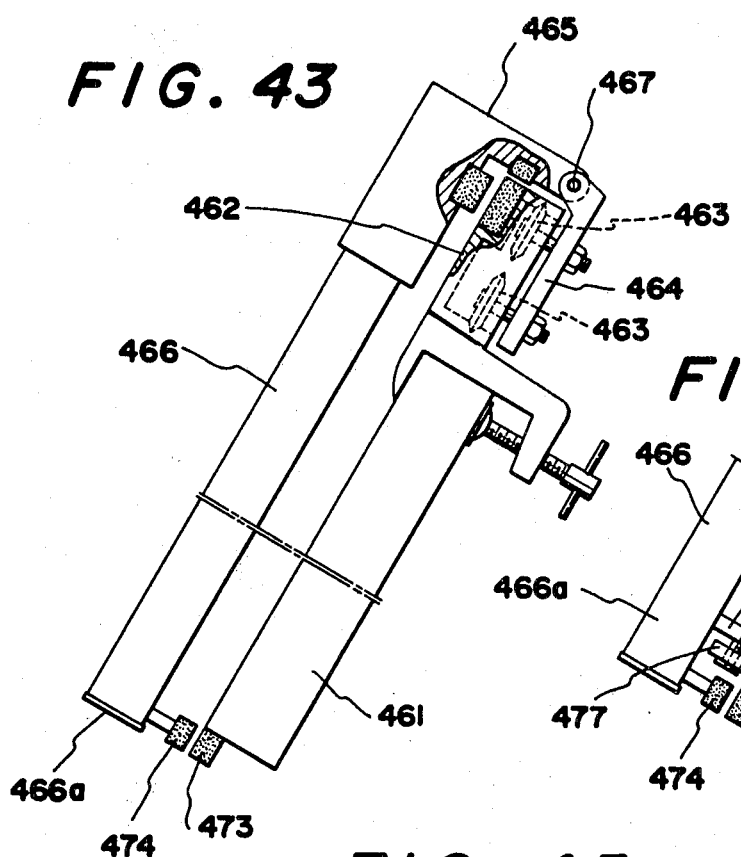
FIG. 43 is a side view showing another embodiment of the magnetic floating mechanism.
Figure 44:
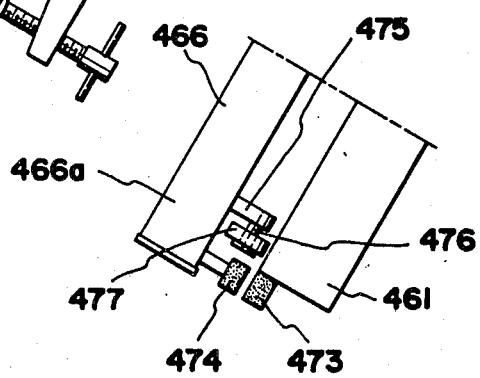
FIG. 44 is a side view showing another embodiment of the magnetic floating mechanism.

Next, an embodiment in which the tail portion of the vertical rail is floated relative to the surface of the drawing board is described by referring to FIGS. 43, 44.

In FIGS. 43 and 44, numeral 461 is a drawing board, and is supported on the reclining bench (not shown) so that it can be set at a given inclined angle. Numeral 462 is a horizontal rail fixed to the drawing board 461 by a vice type fixture, and the horizontal cursor 464 is connected shiftably to the horizontal rail 462 by means of the guide roller 463. Numeral 465 is a bracket connected to one end of the vertical rail 466, and its lower end is pivotally supported on the rising portion of the horizontal cursor 464 so as to be rotatable centering around an axis 467 parallel to the horizontal rail 462. The vertical rail 466 is connected shiftably to the vertical cursor, and the vertical cursor is connected to the head by means of the hinge member. A straightedge is detachably mounted on the mounting plate of the head. Numeral 473 is a magnetic member, namely, the magnet and is disposed on the drawing board 461 along the traveling route of the tail portion 466a of the vertical rail 466 parallel to the horizontal rail 462. Numeral 474 is a magnetic member, namely, magnet fixed to the tail portion 466a of the vertical rail 466, and the same pole surfaces of the magnet 473 and the magnet 474 are opposed at a proper gap. The tail portion side of the vertical rail 466 is completely floated relative to the drawing board 461 by the repulsion magnetic force of the magnets 473, 474. In the foregoing construction, when the handle of the head is grasped by the hand, and the force is applied to the head in a given direction parallel to the surface of the drawing board 461, the horizontal cursor 466 is shifted along the horizontal rail 462, and the vertical rail 466 is shifted along the drawing board 461 while holding right angles to the horizontal rail 462 in the condition where its tail portion side is completely floated relative to the drawing board 461 by the repulsion magnetic force of the magnets 473, 474. By the way, in this embodiment, the tail portion of the vertical rail 466 is energized in the floating direction by the repulsion magnetic force of the magnets 473, 474, but the tail portion may be energized in the floating direction by utilizing the attractive force of the magnets.

Next, another embodiment is described by referring to FIG. 44.

Numeral 475 is an arm mounted on the tail portion 466a of the vertical rail 466, and a shaft 476 is fixed to the arm in a direction parallel to the surface of the drawing board 461 and the vertical rail 466 in its longitudinal direction, and an auxiliary roller 477 is rotatably mounted on the shaft 476 centering around the shaft 476. The opposed gap of the surface of the auxiliary roller 477 and the surface of the drawing board 461 is set to be shorter than the opposed gap of the magnet 474 to the magnet 473 which is caused by the repulsion magnetic force.

In the foregoing construction, during the shifting of the vertical rail 466 along the surface of the drawing board 461, the large load is applied to the vertical rail 466 in a direction of the surface of the drawing board 461, and the vertical rail 466 is swung in a descending direction centering around an axis 467, before the magnet 474 comes into contact with the magnet 473, the auxiliary roller 477 is in contact with the surface of the drawing board 461. By this operation, the vertical rail 466 becomes in a condition where both end portions are supported by the auxiliary roller 477 and the horizontal cursor 464, and the shifting of the vertical rail 466 is continued. When the large load applied to the vertical rail 466 in the descending direction is released, the tail portion side of the vertical rail 466 is elevated again to the drawing board 461 by the repulsion magnetic force of the magnets 473, 474 and the surface of the auxiliary roller 477 is separated from the surface of the drawing board 461. By the way, when the auxiliary roller 477 is not present, during the shifting of the vertical rail 466, the magnet 473 is in contact with the magnet 474, the frictional force is derived between the magnets, and this frictional force makes the shifting of the vertical rail 466 heavy. Also, the auxiliary roller 477 may be applied to the rail surface parallel to the surface of the drawing board 416.

Next, another embodiment is described.

In FIGS. 45 through 48, numeral 482 is a drawing board, and numeral 484 is a horizontal rail fixed to the upper edge portion of the drawing board 482, and the left end of the horizontal rail 484 is projected in a predetermined length in left direction from the left side surface of the drawing board 482. Numeral 486 is a horizontal cursor mounted on the horizontal rail 484 by means of the roller so as to travel, and the upper end of the vertical rail 488 is rotatably and pivotally supported on the horizontal cursor 486 only in the plane perpendicular to the surface of the drawing board 482. Numeral 490 is a vertical cursor mounted on the vertical rail 488 by means of the roller so as to travel, and the head 492 is mounted on the vertical cursor 490 by means of a hinge connecting member. On the mounting plate of the head 492, straightedges 494, 496 are detachably fixed. Numeral 498 is an arm member fixed to the tail portion of the vertical rail 488 and is projected in a predetermined length toward right side direction in the longitudinal direction of the vertical rail 488. A tail portion 500 is rotatably and pivotally supported on the end portion of the arm member 498. Numeral 502 is a stationary rail disposed on the lower edge of the drawing board 482 over its entire length, and a magnet 504 is fixed on the upper surface of the stationary rail 502 over its entire length, and the upper surface of the magnet 504 and the upper surface of the drawing board 482 are positioned on the same plane. The tail portion roller 500 is positioned immediately above the upper surface of the magnet 504. Numeral 506 is a magnet fixed to the arm member 498, and the magnet 506 is disposed in parallel to the magnet 504 which is immediately below the tail portion 488a of the vertical rail 488, and a length of the maget 504 is set to a length identical with a width of the vertical rail 488. The magnets 504, 506 are disposed so that the same magnetic pole surfaces are opposed, and the magnet 506 and the tail portion roller 500 are completely floated relative to the upper surface of the magnet 504 by the repulsion magnetic force of the magnets 504, 506. In the floating condition, the opposed gap of the tail portion roller 500 and the surface of the magnet 504 is set slightly shorter than the opposed gap of the magnets 504, 506.

Next, an operation of the embodiment is described.

Figure 45:
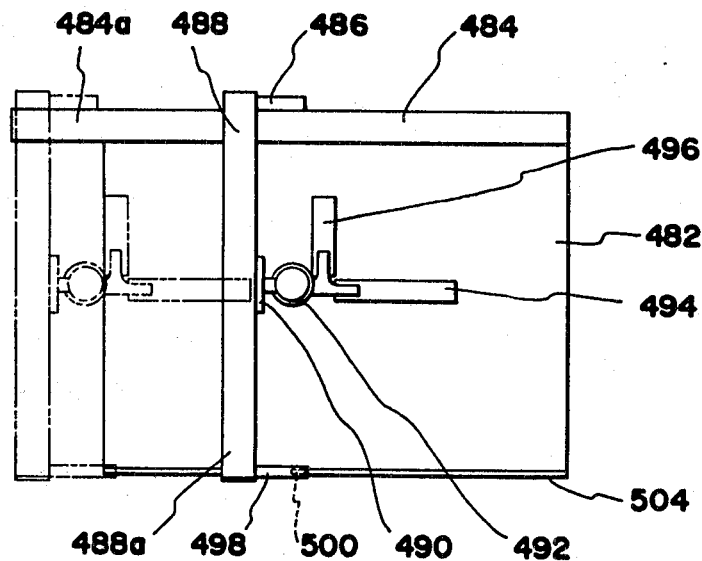
FIG. 45 is a general plan of the rail type universal parallel ruler device.
Figure 46:
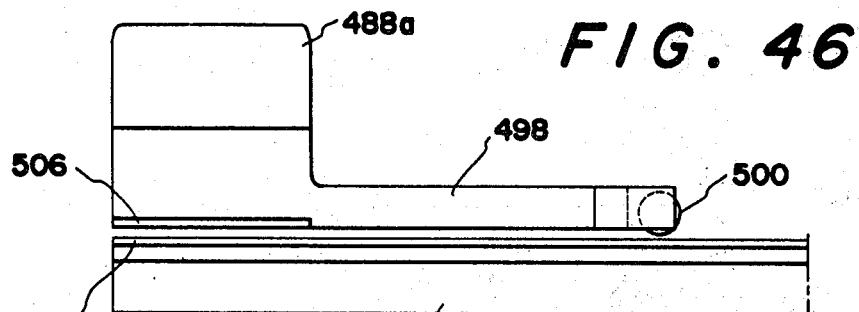
FIG. 46 is an elevation showing another embodiment of the magnetic floating mechanism.
Figure 47:
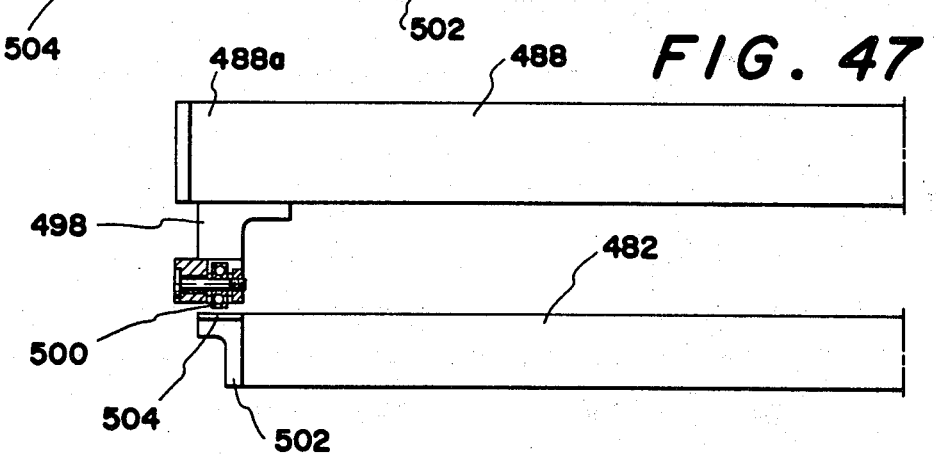
FIG. 47 is a side view of the another embodiment of the magnetic floating mechanism.
Figure 48:
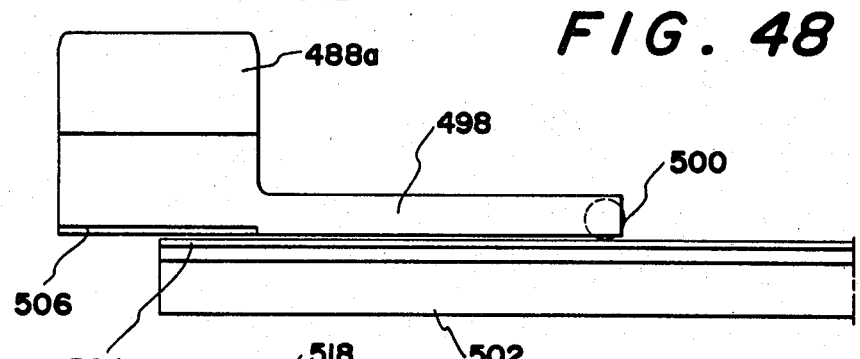
FIG. 48 is a side view illustrating an operation of the another embodiment of the magnetic floating mechanism.

When the head 492 is grasped by the hand, and the pressure in a given direction parallel to the surface of the drawing board 482 is applied, the horizontal cursor 486 is shifted along the horizontal rail 484, and the vertical rail 490 is shifted along the vertical rail 488, and the head 492 can be shifted to a given position on the drawing board 482. When the vertical rail 488 is shifted on the drawing board 482 in right and left directions by interlocking with the shifting of the horizontal cursor 486, the tail portion 488a side of the vertical rail 488 is in the completely floated condition by the repulsion magnetic force of the magnets 504, 506. Accordingly, as contact friction is not derived between the tail portion 488a side of the vertical rail 488 and the surface side of the drawing board 482 so that the vertical rail 488 can be shifted smoothly by light force. When the horizontal cursor 486 is shifted to the left side projecting portion 484a of the horizontal rail 484, the vertical rail 488 is shifted to the outside of the drawing board 482. The magnet 506 is separated from the surface of the upper surface of the magnet 504 as shown in FIG. 48 followed by the shifting in the outside direction of the drawing board 482, and the repulsion magnetic force working between the magnets 504 and 506 is decreased. When the repulsion magnetic force between the magnets 504 and 506 is decreased. The tail portion 488a of the verital rail 488 is descended in the direction of the surface of the drawing board 482 slightly, and in the condition where the magnet 506 is not in contact with the upper surface of the magnet 504, the surface of the tail portion roller 500 comes into contact with the upper surface of the magnet 504. When the vertical rail 488 is further shifted in the left direction, the tail portion roller 500 is rotatably travelled in the left direction along the upper surface of the magnet 504, and the magnet 506 is shifted to a position which is completely out of the condition where the magnet 506 is superposed on the magnet 504 completely. A construction is provided so that when a straightedge 496 is positioned at the left end of the drawing board 482, the shifting of the horizontal cursor 486 along the horizontal rail 484 is engaged, and no further shifting in the left direction is possible. As shown in FIG. 45, in the condition where the vertical rail 488 is shifted to a limit position toward the outside of the drawing board 482, a shifting impossible range of the straightedge 496 at the left side of the drawing board 482, namely, the dead space can be completely eliminated. When the head 492 is pressurized in the right direction and the vertical rail 488 is shifted from the outside position of the drawing board 482 to the right direction, as the magnet 506 is superposed on the magnet 504 completely, the repulsion magnetic force between the magnets 504 and 506 is increased, and when the vertical rail 488 is positioned in an almost width range of the drawing board 482, the tail portion roller 500 is floated relative to the upper surface of the magnet 504, namely, the support surface.

As will be apparent from the foregoing description, in the shifting movement of the vertical rail 488 between the inside position of the drawing board 482 and the outside position of the drawing board 482, the grounding and floating operations of the tail portion roller 500 to the upper surface of the magnet 504 are performed extremely smoothly without being accompanied by any kind of shocks.

By the way, in this embodiment, in order that the floating force of the magnet 506 is not worked on the vertical rail 488 in the rotating direction centering around an axis in its longitudinal direction, the position of the magnet 506 is set immediately below the tail portion 488a of the vertical rail. Accordingly, the repulsion magnetic force of the magnets 504, 506 is not worked in either direction, and the eccentric load is not applied to the horizontal cursor 486 connected to the vertical rail 488.

Figure 49:
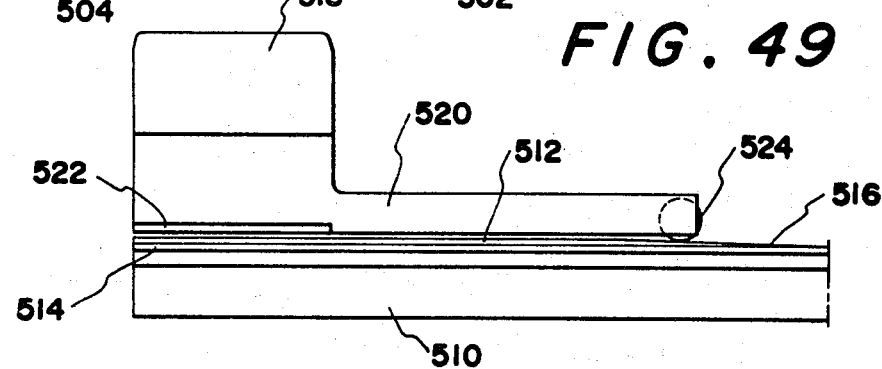
FIG. 49 is an elevation showing another embodiment of the magnetic floating mechanism.
Figure 60:
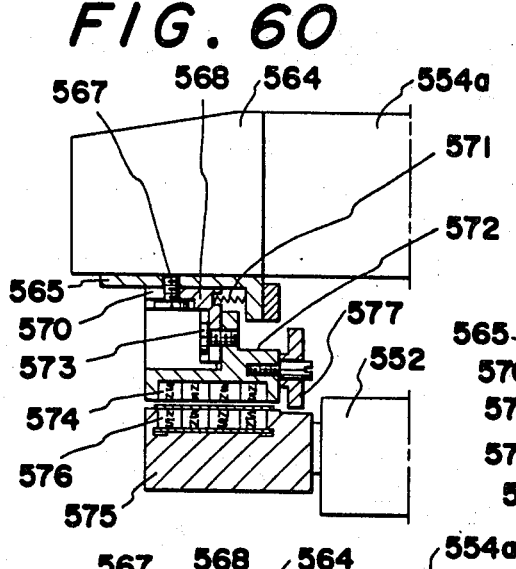
FIG. 60 is a side view showing another embodiment of the magnetic floating mechanism.
Figure 61:
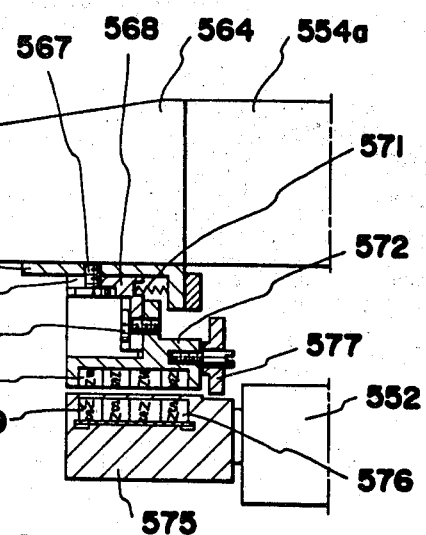
FIG. 61 is a cross section of a stationary rail.

Next, another embodiment is described by referring to FIGS. 49 through 51.

Numeral 510 is a rail member disposed over an entire width of the lower edge portion of the drawing board 482, and a roller traveling surface 512 parallel to the surface of the drawing board 482 is formed on the upper surface of the rail member 510. Numeral 514 is a magnet fixed to the rail member 510 and is disposed over an entire length of the rail member 510. At the right end of the roller traveling surface 512, an inclined surface 516 which is gradually lowered toward the right direction is formed. The position of the inclined surface 516 is set to a proper position in the vicinity of the left end of the drawing board 482. Numeral 518 is a vertical rail, and numeral 520 is an arm member, and numeral 522 is a magnet opposed to the upper surface of the magnet 514, and numeral 524 is a tail portion roller rotatably and pivotally (526) supported on the arm member 520, and is positioned immediately above the roller traveling surface 512.

Next, an operation of this embodiment is described.

When the vertical rail 518 is positioned in the width of the drawing board 482, the tail portion 518a of the vertical rail 518 and the tail portion roller 524 are completely floated relative to the upper surface of the magnet 514 and the rail member 510 by the repulsion magnetic force of the magnets 514, 522. When the vertical rail 518 approaches the left end of the drawing board 482, the tail portion roller 524 is brought to the inclined surface 516, and, as shown in FIG. 49, it contacts the inclined surface 516. When the vertical rail 518 is further shifted in the left direction, the magnet 522 is separated from the magnet 514, but before the repulsion magnetic force working on the vertical rail 518 is decreased, the tail portion roller 524 rides over the roller traveling surface 512, and the tail portion 518a of the vertical rail 518 which is unable to support by the repulsion magnetic force is supported by the tail portion roller 522 and the roller traveling surface 512. The opposed area of the magnet 522 to the magnet 514 is decreased, and as a result, the repulsion magnetic force is decreased, and before the tail portion 518a of the vertical rail 518 is no longer supported by the repulsion magnetic force, the tail portion roller 514 rides over the roller traveling surface 512 so that as the embodiment shows, with the reduction of the repulsion magnetic force, the opposed gap between the magnets 514 and 522 is not decreased. When the vertical rail 518 is shifted from the outside position of the drawing board 482 to the right direction and the tail portion 518a of the vertical rail 518 is sufficiently floated by the repulsion magnetic force of the magnets 514, 522, the tail portion roller 524 is released from the roller traveling surface 512 and is floated relative to the upper surface of the rail member 510.

Next, another embodiment is described by referring to FIGS. 52, 53.

Numeral 521 is a magnet fixed to the arm member so as to be opposed to the magnet 524, and the position of the magnet 521 is separated to the vertical rail 526 in the right direction in a predetermined length. Numeral 528 is a tail portion roller, and numeral 530 is a rail member.

In the foregoing construction, when a large portion of the magnetic pole surface of the magnet 521 is superposed on the magnet 524, the tail portion roller 528 is floated relative to the upper surface of the rail member 530 by the repulsion magnetic force of the magnets 521, 524. When the vertical rail 526 is shifted in the left direction from the range of width of the drawing board and the magnetic pole surface of the magnet 521 is released from the magnet 524, the tail portion roller 528 is mounted on the upper surface of the rail member 530, and the tail portion of the vertical rail 526 is supported at the outside position of the drawing board. In the case of this embodiment, since the magnet 521 is fixed to the right end portion of the arm member 522, the contact shifting distance of the tail portion roller 528 to the upper surface of the rail member 530 can be set at a distance shorter than that of the embodiment, and an influence of friction between the rail member 530 and the tail portion roller 528 accompanied by the shifting of the vertical rail 526 outside of the drawing board can be minimized.

By the way, when the vertical rail 532 is positioned in the drawing board 534, the tail portion roller 536 is not completely floated relative to the surface of the drawing board or to the rail surface 538 parallel with the surface of the drawing board, the tail portion roller 536 may be arranged to contact the rail surface 538 lightly by the repulsion magnetic force of the magnets 540, 542 as shown in FIG. 5. Also, as shown in FIG. 55, without providing the tail portion roller, the arm member 548 is completely floated relative to the drawing board side by the repulsion magnetic force of the magnets 544, 546, and the complete floating condition may be arranged to maintain even if the vertical rail 550 is positioned at the outside of the drawing board.

Next, another embodiment is described by referring to FIGS. 56 through 60.

Numeral 552 is a drawing board, and numeral 553 is a horizontal rail, and numeral 554 is a horizontal cursor, and its one end is rotatably and pivotally supported on the horizontal cursor in the plane perpendicular to the surface of the drawing board as shown in FIG. 43. Numeral 555 is a vertical cursor mounted to freely travel on the vertical rail 554 by means of rollers 556, 557, 558, and 559, and a head 561 is connected to the vertical cursor 555 by means of a known head floating mechanism 560. On the mounting plate of the head 561, straightedges 562, 563 are detachably fixed. Numeral 564 is a cover fixed to the tail portion of the vertical rail 554, and a frame 565 is fixed to the cover, and long holes 569, 570 of an adjusting plate 568 are slidably fitted to shaft portions of screws 566, 567 that are screwed to thread holes formed on the frame 565. Numeral 571 is a spring. Numeral 572 is a support frame fixed to the adjusting plate 568 by a screw 573 so as to be finely adjustable in a perpendicular direction to the surface of the drawing board 552, and a right end portion, in FIG. 59, of a horizontal portion 572a of the support frame is projected in right angle direction toward the head mounting side. Numeral 574 is a magnet consisting of a plurality of flexible magnet rubbers whose cross section is square and is fitted and disposed in a groove formed on the horizontal portion 572a, and is disposed in parallel to the horizontal rail 553, and a left end, in FIG. 59, of the magnet 574 is positioned immediately below the left side surface of the magnet 574, and a right end of the magnet 574 is separated in the right direction by a predetermined distance from the right side surface of the vertical rail 554. Numeral 575 is a stationary rail fixed to the lower edge of the drawing board 552 parallel to the horizontal rail 553, and a magnet 576 consisting of a plurality of elongate magnet rubbers whose cross section is square is fitted and disposed in a groove formed on the upper surface of the stationary rail. The same pole surfaces of the magnets 574, 576 are opposed, and the repulsion magnetic force is worked between the magnets 574, 576. A plurality of magnetic pole tracks are formed in parallel on the surface of the magnet 576 and mutually different poles are adjacent. A plurality of magnetic pole tracks are similarly formed in parallel on the surface of the magnet 574. Numeral 577 is a safety roller and is rotatably and pivotally supported on the support frame 572, and the surface of the roller 577 in slightly floated relative to the surface of the rail 575 by the repulsion magnetic force of the magnets 574, 576.

By the way, the adjusting plate 568 is slid along the vertical rail 554 in its longitudinal direction by loosening the screws 566, 567, and the magnetic pole track of the magnet 574 can be finely adjusted to the magnetic pole track of the magnet 576 accurately at a position where the same poles are opposed. After the fine adjustment, the screws 566, 567 are clamped, and the adjusting plate 568 is fixed to the frame 565. By the way, when the present invention is put to work, the head floating mechanism 560 should not be limited particularly to the structure shown in the drawing.

Next, an operation of the embodiment is described.

When the handle of the head 561 is grasped by the hand, and the force is applied to the handle in a given direction parallel to the surface of the drawing board 552, the horizontal cursor is shifted along the horizontal rail 553, and the vertical cursor 555 is shifted along the vertical rail 554, and the head 561 can be shifted in a desired direction. When the vertical rail 554 is shifted in the left and right directions in FIG. 56 along the surface of the drawing board 552, the tail portion 554a of the vertical rail 544 is completely floated relative to the surface of the drawing board 552 by the repulsion magnetic force of the magnets 574, 576 and is shifted without undergoing any contact friction. The head 561 is maintained in the floating condition from the surface of the drawing board 552 by operating the floating mechanism 560 as shown in FIG. 58, the weight of the head 561 is applied on the vertical rail 554, and a rotary moment in clockwise direction in FIG. 57 is worked on the vertical rail 554 centering around an axis in its longitudinal direction, and on the other hand, the magnetic force of the magnetic 576 is worked in the floating direction of the magnet 574, and the floating force of the magnet 574 is worked on the vertical rail 554 as a rotary moment in the anticlockwise direction centering around an axis in its longitudinal direction. The rotary moment in the anticlockwise direction is worked in a direction of offsetting the rotary moment in the clockwise direction. When both rotary moments are completely offset, rotary moment working on the vertical rail 554 becomes zero at the time of floating of the head 561, deriving no torsion force on the roller of the horizontal cursor. As shown in FIG. 58, when the head is mounted on the surface of the drawing board 552, the weight of the head is not worked as the rotary force on the vertical rail 554. In this case, the vertical rail 554 is energized in the anticlockwise direction in FIG. 59 centering around an axis in its longitudinal direction parallel with the vertical rail 554, and this energizing force is worked as a torsion force on the roller of the horizontal cursor. In this case, the movement of the horizontal cursor along the horizontal rail 553 becomes heavy by the torsion force.

In the case of the embodiment, the eccentric quantity of the magnet 574 to the center of the vertical rail 554 is set so that the magnitude of the rotary force in the anticlockwise direction in FIG. 59 which works on the vertical rail 554 by the repulsion magnetic force of the magnets 574, 576 becomes a strength which is almost 50% of the strength just balanced with the strength of the rotary force working on the vertical rail 554 in the clockwise direction by the weight of the head 561. Of course, an eccentric degree of the center of the repulsion magnetic force by the magnets 574, 576 to the center of the vertical rail 554 may be the condition where the vertical rail 554 is completely balanced at the floating time of the head 561.

Furthermore, since the magnetic pole surfaces of the magnets 574, 576 are made as a plurality of rows of parallel magnetic pole tracks, in case an inclination of the drawing board 552 is changed, and even if the load in perpendicular direction to the surface of the drawing board 552 applied to the vertical rail 554 is changed, the change of the floating gap of the magnet 574 to the magnet 576 is small and as a result, there is not a big change in parallelness of the vertical rail 554 to the drawing board 552.

By the way, over an entire length of the stationary rail 575, namely, the guiding member, a space for insertion of a magnetic member is formed and the magnetic member 576 may be press fitted to the space portion 579. By this construction, the magnetic member 576 is protected, and an effect of decorating the stationary rail 575 is present.

Figure 62:
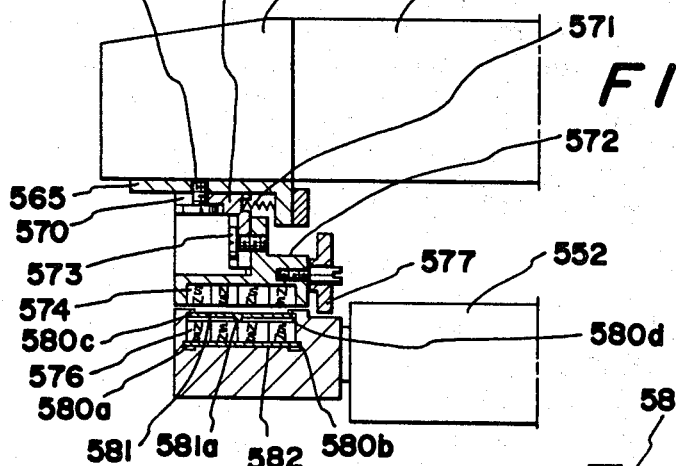
FIG. 62 is a cross section showing an embodiment of the stationary rail.

Next, another embodiment is described by referring to FIG. 62.

Numeral 580 is a concave fitting portion for insertion of magnetic member formed over an entire length of the stationary rail 575, and a bandlike iron plate 582 is disposed in the concave fitting portion. The lower surface of the iron plate 582 is in tight contact with the bottom surface of the concave fitting portion 580, and both side portions of the iron plate 582 are in tight contact with the bottom surface of the concave fitting portion 580, and both side portions of the iron plate 582 are in tight contact with the grooves 580a, 580b formed over an entire length of the concave fitting portion 580 at the lower end of the side walls forming the concave fitting portion 580. The magnetic member consisting of magnet rubbers is disposed in the concave fitting portion 580, and the lower surface of the magnetic member 576 is attracted to the iron plate 582. Numeral 581 is a cover plate inserted and disposed over an entire length of the concave fitting portion 580, and its projecting portion 581a is in contact resiliently with the upper surface of the magnet 576, and both side portions are in contact resiliently with the horizontal surfaces 580c, 580d of the concave fitting portion 580. In the foregoing construction, when dusts are adhered to the magnetic member 576, the cover plate 581 is pulled out along the longitudinal direction from the concave fitting portion 580, and the surface of the magnetic member 576 can be cleaned. Moreover, as the magnetic member is not exposed to the outside on account of presence of the cover plate 581, the surface of the magnetic member 576 can be protected, and moreover decorating effect for the stationary rail 575 is derived by the cover plate 581.

Figure 63:
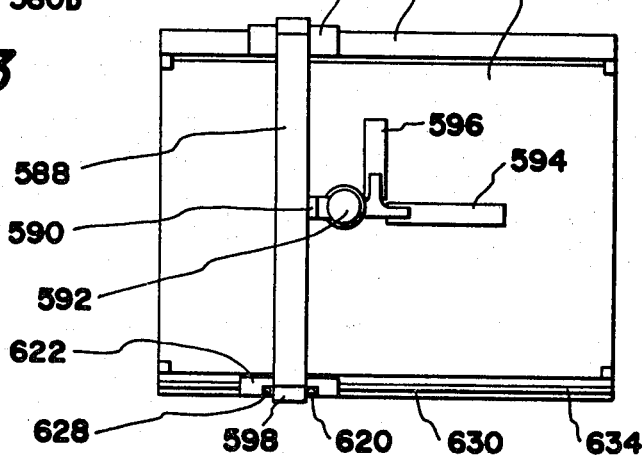
FIG. 63 is a general plan of the rail type universal type parallel ruler device.
Figure 64:
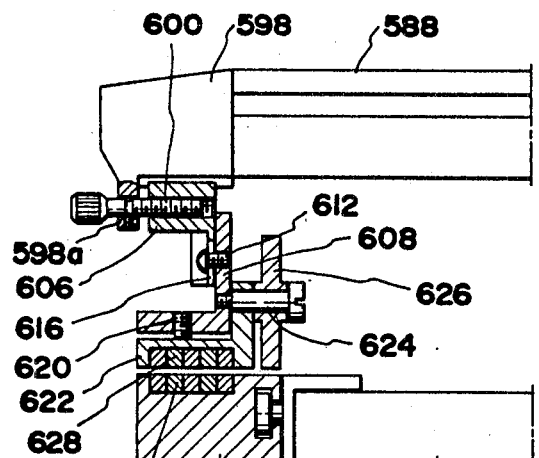
FIG. 64 is a side view showing another embodiment of the magnetic floating mechanism.
Figure 65:
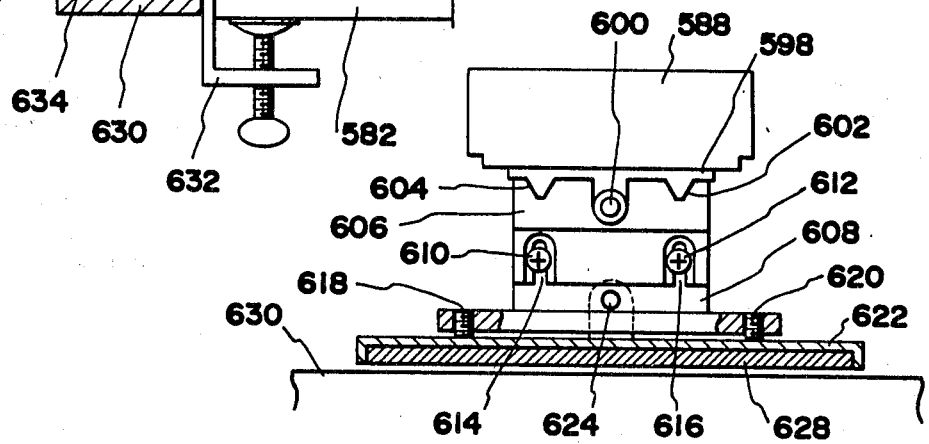
FIG. 65 is an elevation of the another embodiment of the magnetic floating mechanism.
Figure 66:
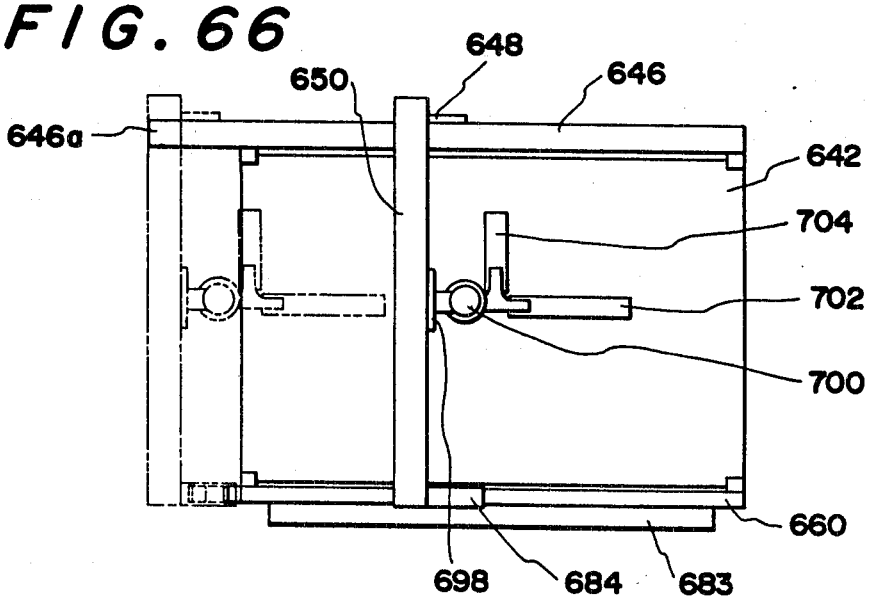
FIG. 66 is a general plan of the rail type universal parallel ruler device.
Figure 67:
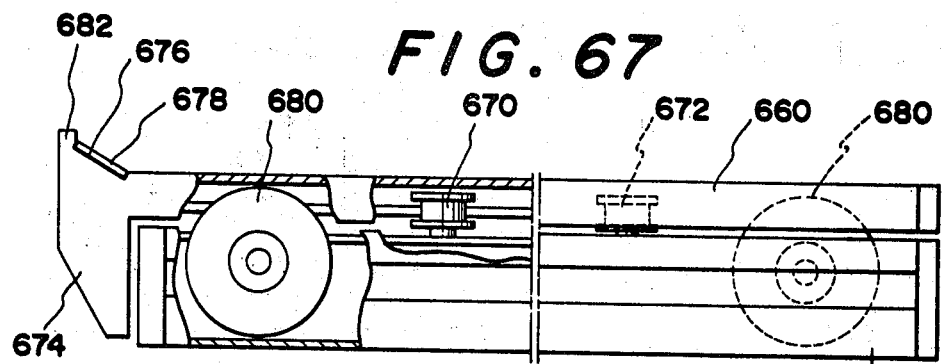
FIG. 67 is an elevation of a guiding mechanism of tail portion of vertical rail.
Figure 68:
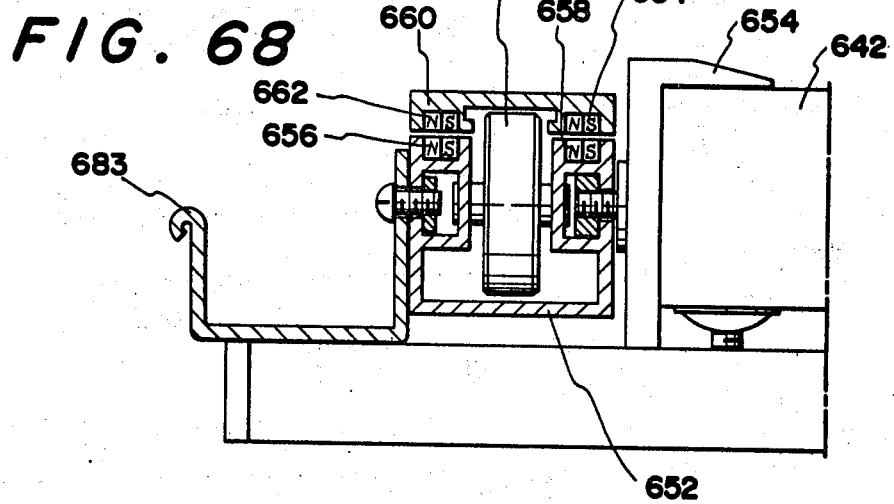
FIG. 68 is a side view of the guiding mechanism of tail portion of vertical rail.
Figure 69:
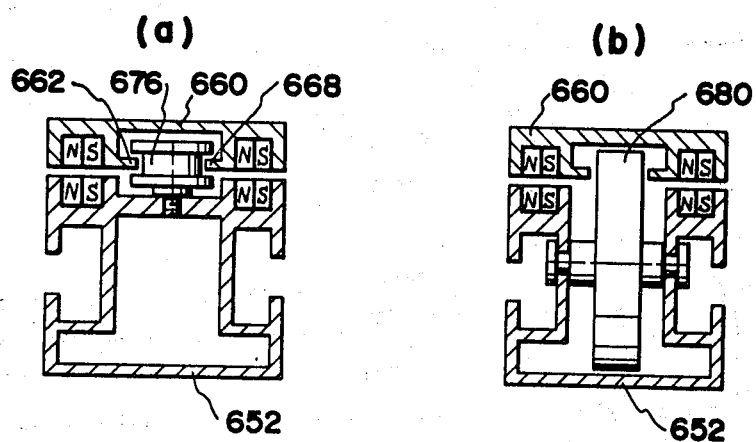
FIG. 69 is a cross section of the guiding mechanism of tail portion of vertical rail.
Figure 70:
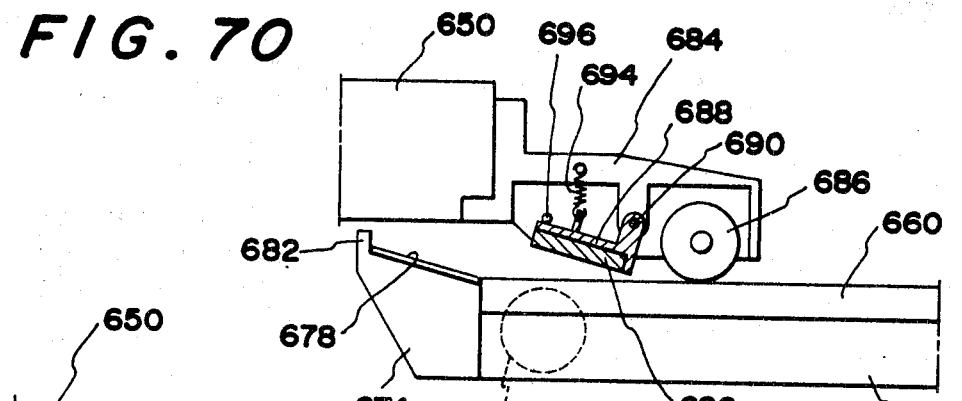
FIG. 70 is an elevation of the guiding mechanism of tail portion of vertical rail.
Figure 71:
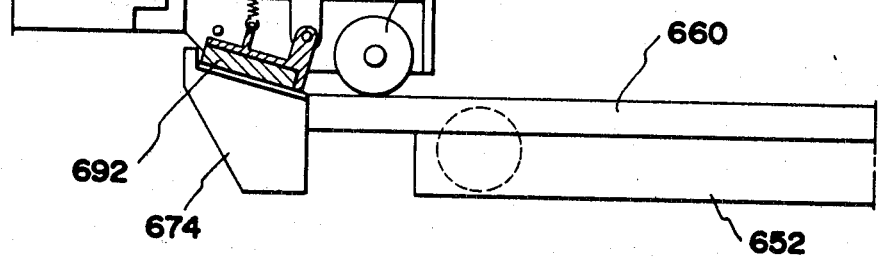
FIG. 71 is an elevation illustrating an operation of the guiding mechanism of tail portion of vertical rail.

Next, another embodiment is described by referring to FIGS. 63 through 65.

Numeral 582 is a drawing board, and a horizontal rail 584 is fixed to the upper edge portion of the drawing board 582 by a vice type fixture. Numeral 586 is a horizontal cursor mounted shiftably on the horizontal rail 584, and one end of the vertical rail 588 is rotatably and pivotally supported on the horizontal cursor centering around an axis parallel to the horizontal rail 584. Numeral 590 is a vertical cursor mounted shiftably on the vertical rail 588, and a head 592 is mounted on the vertical cursor by means of a hinge member, and straightedges 594, 596 are detachably fixed to the ruler mounting member of the head 592. Numeral 598 is a bracket fixed to the tail portion of the vertical rail 588, and a screw lever 600 is rotatably engaged at a fixed position to a hole formed on the suspending member 598a. Numeral 606 is a lateral direction adjusting member wherein V-shaped grooves 602, 604 formed on the upper portion is fitted to a projection formed on the bracket 598, and the screw lever 600 is screwed to the thread hole formed on the lateral direction adjusting member. Numeral 608 is a vertical direction adjusting member, and cap screws 610, 612 are fixed to the perpendicular plate portion, and the shaft portions of the cap screws 610, 612 are slidably fitted to long holes 614, 616 formed on the surface of the drawing board 582 in perpendicular direction to the drawing board 582. Adjusting screws 618, 620 (angle setting means) are screwed to the thread holes formed at both end portions of the horizontal portion of the vertical direction adjusting member 608. Numeral 622 is an inclination adjusting member, and a rising portion is formed on an almost center portion of the inclination adjusting member, and the rising portion is mounted on an almost center of a perpendicular plate portion of the vertical adjusting member 608 so that the rising portion is rotatable centering around an axis parallel to a longitudinal direction of the vertical rail 588, and a safety roller 626 is rotatably mounted on the shaft 624. A groove is formed on the lower surface of the inclination adjusting member 622, and a magnet 628 consisting of 5 pieces of magnet rubbers whose mutually different poles are adjacent is disposed in the groove in a direction parallel to the horizontal rail 584. Numeral 630 is a guide rail fixed to the lower edge portion of the drawing plate 582 by a vice type fixture 632, and a magnet 634 consisting of 5 pieces of magnet rubbers whose poles are mutually different is disposed in the groove formed on the upper surface of the guide rail in a direction parallel to the horizontal rail 584. The same pole surfaces of the magnets 628, 634 are mutually opposed.

The magnet 628 is floated relative to the magnet 634 in a predetermined distance by the repulsion magnetic force, and the surface of the safety roller 626 is opposed to the upper surface of the guide rail 630 at a shorter gap than the distance.

Next, an operation of the embodiment is described.

The screw lever 600 is turned, and the lateral adjusting member 606 is shifted in a longitudinal direction of the vertical rail 588, and the magnet 628 is set accurately and directly on the magnet 634.

A primary object of the lateral adjusting member 606 is to obtain a large repulsion magnetic force by causing a plurality of rows of magnetic pole tracks of lower level to coincide with the same pole surfaces of a plurality of rows of magnetic pole tracks of upper level accurately, but particularly, its use is not limited to only the construction of using a plurality rows of magnetic pole tracks and there is an effect that even in the case of the construction of using the magnets of unipolar construction in the upper and lower levels, sufficient magnetic force can be obtained without loss by the use of the adjusting member 606.

Next, the screws 610, 612 are loosened, and the vertical adjusting member 608 is moved vertically to the tail portion of the vertical rail 588, and adjustment is applied to set the opposed interval of the tail portion of the vertical rail 588 and the surface of the drawing board to a proper value, and then the screws 610, 612 are turned in clamping direction, and the vertical adjusting member 608 is fixed to the lateral adjusting member 606. Next, the screws 618, 620 are rotatably manipulated, and a parallelness of the inclination adjusting member 622 to the guide rail 630 is adjusted, and the rotary angle of the inclination adjusting member 622 centering around the axis is set to a condition where the repulsion magnetic force between the magnets 634 and 628 is not worked on the vertical rail 588 as the rotary force centering around the axis in its longitudinal direction.

In the foregoing condition, when the head 592 is pressed in a given direction parallel to the surface of the drawing board 562, the horizontal cursor 586 is shifted along the horizontal rail 584, and the tail portion of the vertical rail 588 is travelled along the guide rail 630 in the condition where the tail portion is floated relative to the guide rail 630 at a predetermined gap. Moreover, the vertical cursor 590 is shifted along the vertical rail 588, and the head 592 and straightedges 594, 596 can be shifted to a given position on the drawing board 582.

By the way, even if the adjusting screws 618, 620 are not provided, and the inclination adjusting member 622 is set in rotatable condition centering around the shaft 624, operation and effect same with the foregoing embodiment can be obtained. Also, the inclination adjusting member 622 is made reclinable in a plane including an axis parallel to the longitudinal direction of the guide rail 630 which is perpendicular to the surface of the drawing board 562, and a parallelness or opposed angle of the inclination adjusting member 622 to the guide rail 630 is adjusted so that the repulsion magnetic force is not worked on the vertical rail 588 as a rotary force centering around an axis in the longitudinal direction, and then the inclination adjusting member may be fixed to the vertical rail. By the way, the fixing may be a construction of blocking the shifting of the inclination adjusting member in the upper direction, and even if it is free in the lower direction, the inclination adjusting member receives the working of the repulsion magnetic force to be energized in the upper direction, and there is no apprehension that the adjusted angle is changed.

The embodiment has the foregoing construction and the magnetic floating force to the tail portion of the vertical rail is not worked on the vertical rail as the rotary force centering around the axis in its longitudinal direction so that the vertical rail can be lightly and smoothly shifted.

Next, another embodiment is described by referring to FIGS. 66 through 73.

Numeral 642 is a drawing board fixed to a support frame 644 of the drawing bench, and a horizontal rail 646 is fixed by a vice type fixture to the upper edge portion of the drawing board. The left end portion of the horizontal rail 646 is projected in a predetermined length in the left side of the drawing board 642. Numeral 648 is a horizontal cursor mounted shiftably on the horizontal rail 646, and one end of the vertical rail 650 is rotatably and pivotally supported on the horizontal cursor in a plane perpendicular to the drawing board 642 by means of a bracket. Numeral 652 is a stationary rail disposed at the end surface of the lower edge portion of the drawing board 642 over an entire length of a width of the drawing board 642, and the stationary rail 652 is fixed to the end surface 642a of the lower edge of the drawing board 642 by the vice type fixture 654. Magnets 656, 658 consisting of a pair of magnet rubbers are fixed to the upper surface of the stationary rail 652 over an entire length in its longitudinal direction. Numeral 660 is a slide guide rail made of aluminum, and magnets 662, 664 consisting of a pair of magnet rubbers are fixed to both sides of the lower surface of the slide guide rail over an entire length. The mutually same pole surfaces of the magnets 656, 662, and 658, 664 are opposed, and the slide rail 660 is floated relative to the upper surface of the stationary rail 652 at a predetermined gap by the repulsion magnetic force between the magnets. Numeral 666, 668 are a pair of mutually parallel rail surfaces formed in longitudinal direction of the guide rail 660 to prevent traverse vibration of the guide rail 660, and surfaces of two pieces of horizontalrollers 670, 672 rotatably and pivotally supported on the upper surface of the stationary rail 652 contact one surface of the rail surfaces, and the surface of the horizontal roller (not shown) rotatably and pivotally supported on the upper surface of the stationary rail 652 contacts the other surface 668. Numeral 674 is an engaging portion formed integrally on the left end of the slide guide rail 660, and an inclined surface 676 which is sloped upward in left direction is formed on the upper surface of the engaging portion, and a steel plate 678 is mounted on the inclined surface 676. Numeral 680 is a vertical safety roller rotatably and pivotally supported on the left end of the stationary rail 652 in the drawing, and the surface of the safety roller 680 is opposed to the lower surface of the guide rail 660 at a predetermined gap, and the gap is set shorter than the opposed gap of the magnets 662, 656. Numeral 682 is a stopper formed on the end portion of the inclined surface 676, and numeral 683 is a lead pencil receiver fixed to the side of the stationary rail 652, and numeral 684 is a bracket fixed to the tail portion of the vertical rail 650, and a tail portion 686 is rotatably and pivotally supported on the bracket, and the tail portion 686 is rotatably mounted on the upper surface of the guide rail 660. Numeral 688 is a vibrating member supported rotatably and pivotally 690 on the bracket 684, and a magnet 692 is fixed to the lower surface of the vibrating member, and the magnet 692 is opposed to the upper surface of the guide rail 660 at a proper gap. The vibrating member 688 is energized in clockwise direction in FIG. 68 by the tensile resilience of a coil spring 694, and contacts a stopper shaft 696. Numeral 698 is a vertical cursor mounted shiftably on the vertical rail 650, and a head 700 is connected to the vertical cursor 698 by means of a double hinge mechanism, and straightedges 702, 704 are detachably fixed to the ruler mounting plate of the head 700.

Next, an operation of the embodiment is described.

Figure 72:
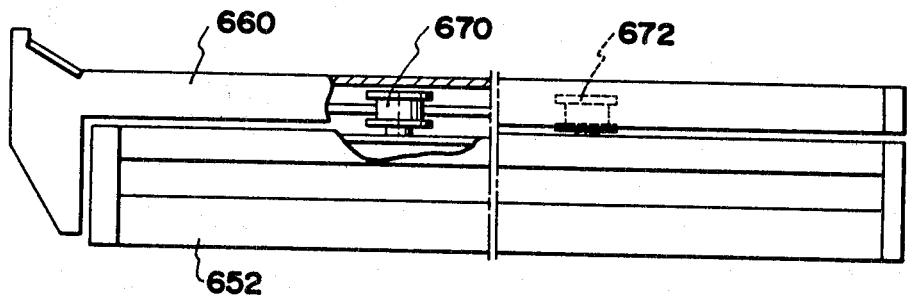
FIG. 72 is an elevation showing an embodiment of the guiding mechanism of tail portion of vertical rail.
Figure 73:
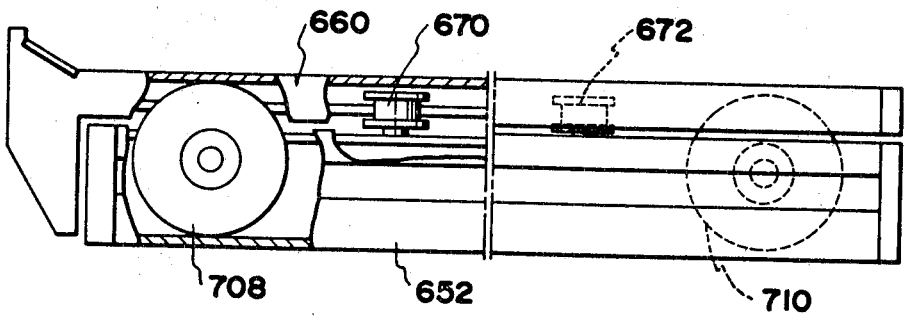
FIG. 73 is an elevation showing another embodiment of the guiding mechanism of tail portion of vertical rail.

When the head 700 is shifted to the left side on the surface of the drawing board 642 by the manual manipulation, the horizontal cursor 648 is shifted along the horizontal rail 646, and the tail portion roller 686 is rotatably travelled on the upper surface of the slide guide rail 660. When the head is brought to the vicinity of the left end of the drawing board 642, the magnet 692 is shifted to the upper part of the steel plate 678, and the vibrating member 688 is turned in the anticlockwise direction centering around the axis 690 by resisting to the resilience of the coil spring 694 by the attracting force of the magnet 692 to the steel plate 678, and the magnet 692 is attracted to the steel plate 678. When the head 700 is further shifted in the left direction and is shifted to the outside of the drawing board 642, the horizontal cursor 648 is shifted to the left end projecting portion 646a of the horizontal rail 646, and the guide rail 660 is shifted by interlocking with the vertical rail 650 along the stationary rail 652, and the tail portion roller 686 is supported at the outside position of the drawing board 642 by the upper surface of the guide rail 660. When the straightedges 702, 704 are shifted to the left end of the drawing board 642, the shifting in left direction along the horizontal rail 646 of the horizontal cursor 648 is blocked by a stopper device (not shown). When the head is shifted in right direction of the drawing board 642 from the condition, the horizontal cursor 648 is shifted in right direction along the horizontal rail 646 by interlocking with the shifting of right direction of the vertical rail 650, and the slide guide rail 660 is shifted in right direction, and the engaging portion 674 is abutted to the end surface of the stationary rail 652. When the vertical rail 650 is further shifted in right direction, the attraction of the magnet 692 and steel plate 678 is released. When the vertical rail 650 is further shifted in right direction, the tail portion roller 686 is rotatably travelled in right direction along the upper surface of the guide rail 660. The shifting of the slide guide rail 660 along the stationary rail 652 is performed in the condition where the slide guide rail 660 is floated relative to the stationary rail 652 by the repulsion magnetic force of the magnets 656, 662 and 658, 664, so that the shifting is taken place extremely light and smooth. When the external stress is applied downwardly to the vertical rail 650, and the large load is applied to the guide rail 660 downwardly from the tail portion roller 686, the guide rail 660 is descended by resisting to the repulsion magnetic force of the magnets 650, 662 and 658, 664, and before the magnets 662, 664 contact the magnets 656, 658, the lower surface of the guide rail 660 contacts the surface of the safety roller 680, and is engaged by the safety roller 680. As the safety roller, other frictional force reducing member can be used, and also as shown in FIG. 72, the safety roller may not be needed to be installed, and as shown in FIG. 73, vertical guide rollers 708, 710 are rotatably provided at both end portions of the stationary rail 652, and the surfaces of the guide rollers 708, 710 are caused to contact the lower surface of the guide rail 660, and the contact pressure of the guide rollers 708, 710 with the lower surface of the guide rail 660 may be decreased by the repulsion magnetic force of the magnets.

Next, another embodiment in which the end portion of the vertical rail is guided to an extended position outside of the drawing board smoothly by utilizing the magnetic force of the magnet is described by referring to FIGS. 74 through 78.

Figure 74:
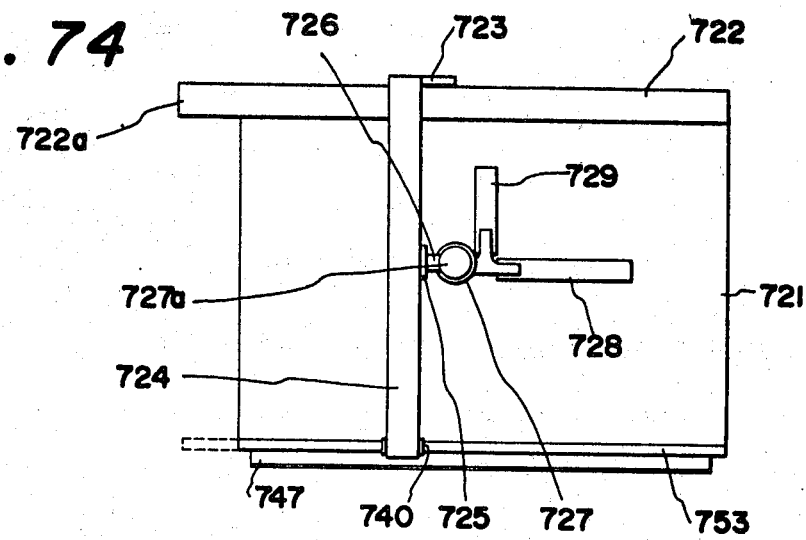
FIG. 74 is a general plan of the rail type universal parallel ruler device.
Figure 75:
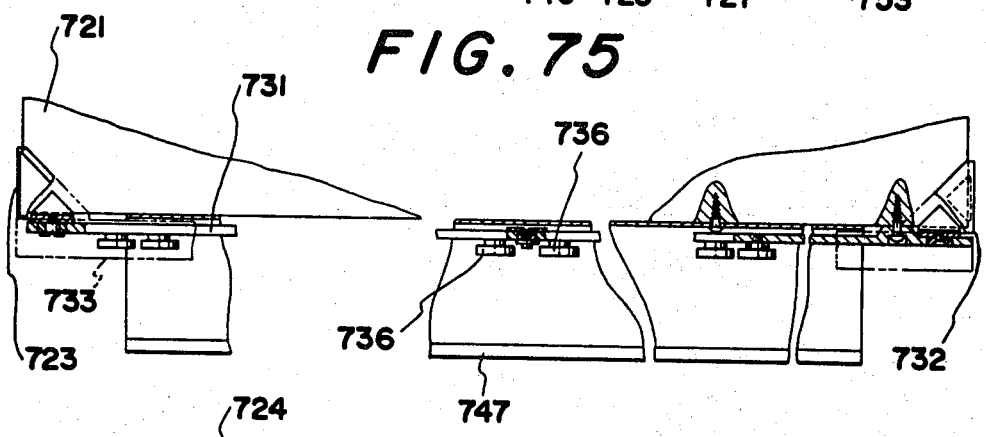
FIG. 75 is a plan of the guiding mechanism of tail portion of vertical rail.
Figure 76:
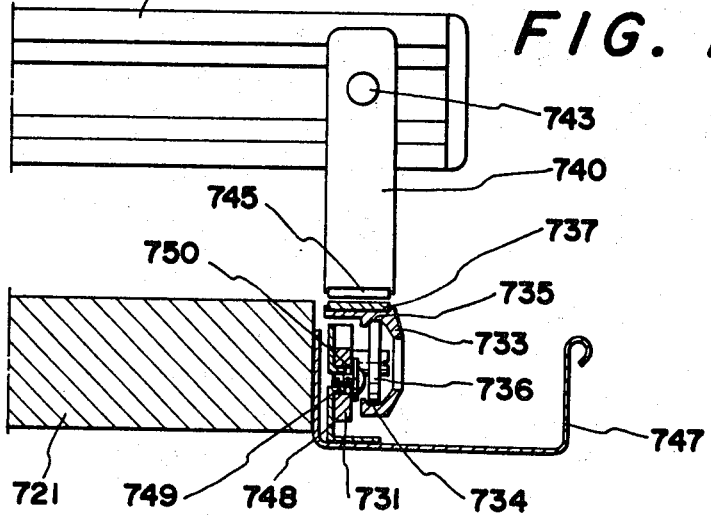
FIG. 76 is a side view of the guiding mechanism of tail portion of vertical rail.

Numeral 721 is a drawing board, and numeral 722 is a horizontal rail fixed to the upper edge portion of the drawing board 721, and the left end portion is projected in the extended direction outside of the drawing board 721. Numeral 723 is a horizontal cursor mounted slidably on the horizontal rail, and one end of the vertical rail 724 is rotatably and pivotally supported on the horizontal cursor only in a plane perpendicular to the surface of the drawing board 721. Numeral 725 is a vertical cursor slidably connected to the vertical rail 724, and a head 727 is connected to the vertical cursor by means of a connecting member 726, and straight edges 728, 729 are detachably fixed to the ruler mounting plate of the head 727. Numeral 730 is a fixture fixed to the left end of the lower edge portion of the drawing board 721, and one end of the stationary rail 731 is fixed to the fixture. Numeral 732 is a fixture fixed to the right end of the lower edge portion of the drawing board 721, and the other end of the stationary rail 731 is fixed to the fixture 732. Numeral 733 is a guide rail, and rail grooves 734, 735 are formed on the inner wall surface of the guide rail 733, and a plurality of rollers 736 rotatably and pivotally supported on the stationary rail 731 is rotatably fitted to the rail grooves 734, 735. A long magnet 737 is fixed to the upper surface of the guide rail 732. Numeral 738 is a T-shaped groove formed at both side portions of the vertical rail 724, and a plate nut 739 is disposed slidably in the T-shaped groove 738. Numeral 740 is a frame and through holes 741, 742 are formed at both side portions of the frame 740, and cap screws 743, 744 are slidably fitted to the through holes 741, 742, and cap screws 743, 744 are screwed to the thread holes of the plate nut 739. When the cap screws are rotated in clamping direction, the frame 740 is fixed to the tail portion of the vertical rail 724 so that the position can be adjusted. Numeral 745 is a magnet fixed to the horizontal portion of the frame 740, and the magnetic pole surface of the magnet is opposed to the magnetic pole surface of the magnet 277. The polarity of the magnetic pole is set to N pole. The magnet 737 is set in such a manner as shown in FIG. 74 that a right side in the drawing is an N pole, namely, a repulsion area, and left side is S pole, namely, an attracting area with a border 746 set at a position closer to the left end of the magnet 737. Numeral 747 is a ⌐-shaped cross section pocket member for accommodating small miscellaneous items, and its one end portion is fixed to the side of the lower portion of the drawing board 721. Numeral 748 is a support member, and a tubular portion 749 projected on the support member 748 is fitted to a long through hole 750 formed at an almost middle of the stationary rail 731. The support member 748 is fixed to the stationary rail 731 by a screw screwed to a female thread formed on an inner peripheral surface of the tubular portion 749. By the way, the frame 740 may be fixed directly to the vertical rail 724.

Next, an operation of the embodiment is described.

A mounting position of the frame 740 to the vertical rail 742 is set so that the position is adjusted by manipulating the cap screws 743, 744 and the magnet 745 is positioned immediately above the magnet 737. The magnet 745 is floated relative to the magnet 737 at a predetermined gap by the repulsion magnetic force on the same pole surface of the magnet 737, namely, the repulsion area. In the floating condition, the vertical rail 724 is formed so as to be in parallel to the surface of the drawing board 721. When the handle 727a of the head 727 is grasped by the hand, and the head 727 is shifted in left direction along the surface of the drawing board 721, the horizontal cursor 723 is shifted along the horizontal cursor 722. At this time, the magnet 745 is travelled in the condition where the magnet 745 is floated relative to the repulsion are of the magnet 737. When the horizontal cursor 723 is shifted in a direction of projected extended portion 722a of the left end of the horizontal rail 722, the magnet 745 reaches the border 746 of the magnet 737. In this condition, the repulsion magnetic force and attractive force by N pole and S pole of the magnet 737 are worked simultaneously. In this condition, the horizontal cursor 723 is further shifted in left direction, the guide rail 733 is guided by the roller 736 by interlocking with the vertical rail 724 and is slid in left direction by the mutual attracting action of the N pole of the magnet 745 and the S pole of the magnet 737, and the end portion of the tail portion direction of the vertical rail 724 is supported by the guide rail 733. (Refer to FIG. 78.) Accordingly, the vertical rail 724 is supported by the projected extended portion 722a of the horizontal rail 722 and the guide rail 733 at the outside position of the drawing board 721, and a range where drawing is possible on the drawing board 721 by the straight edges 728, 729 is extended. When the head 727 is positioned to the left end of the drawing board 721, the shifting in the left direction of the guide rail 733 is blocked by a stopper device (not shown) provided separately. Next, when the head 727 is shifted in right direction, the guide rail 733 is shifted in the right direction by interlocking with the vertical rail 724 by the attractive operation of the N pole of the magnet 745 and the S pole of the magnet 737 in the border 746, and the end surface of the guide rail 733 abuts the stopper surface (not shown) of the left end of the stationary rail 731, and the guide rail 733 is returned to the original position, and the shifting in the right direction of the guide rail 733 is blocked. When the head 727 is further shifted in the right direction, the magnet 745 is shifted from the border 746 of the magnet 737 to the right direction in the drawing, and the magnet 745 is floated relative to the magnet 737.

Next, another embodiment is described in FIGS. 79, 80.

Numeral 760 is a tail portion roller provided rotatably on the tail portion of the vertical rail 761, and is mounted on the drawing board 762. Numeral 763 is a guide rail mounted on the drawing board 762 slidably in the right and left directions by the stationary rail (not shown), and an inclined surface 764 is formed on the upper surface of the guide rail 763. A magnet 765 is fixed on the upper surface of the guide rail 763, and the upper surface of the magnet 765 is gradually elevated from the position lower than the surface of the drawing board 762 toward the left direction, and is set at a same height with the surface of the drawing board 762. A border 766 is set on the portion of same height with the surface of the drawing board 762 of the magnet 765, and the upper surface of the right side in the drawing is set N pole (repulsion area) and the upper surface of the left side is set S pole (attractive area) by the border 766. Numeral 767 is a magnet fixed to the tail portion of the vertical rail 768, and its lower surface is set N pole. The magnet 765 is disposed in a shifting route of the magnet 767.

In the foregoing construction, when the vertical rail 768 is shifted on the drawing board 762, the tail portion roller 760 is rotated by abutting the surface of the drawing board 762. When the vertical rail 761 is shifted in left direction in the drawing, and the magnet 767 is positioned in the upper part of the repulsion area of the magnet 765, the tail portion roller 760 is gradually floated from the surface of the drawing board 762 accompanied by the shifting in the left direction of the vertical rail 761 by the repulsion magnetic force of the magnets 765, 767. When the vertical rail 761 is further shifted in the left direction, and the magnet 767 is positioned immediately above the border 766, the magnet 767 is attracted to the S pole of the magnet 765, and is repulsed by the N pole. When the vertical rail 761 is further shifted in the left direction as shown in FIG. 78, the guide rail 763 is drawn out in the left direction by the action of the attractive force of the magnets 765, 767, and the guide rail 763 supports the tail portion side of the vertical rail 761 at the outside position of the drawing board 762. When the vertical rail 761 is shifted in the right direction, the guide rail 763 is shifted until it reaches the original position in the right direction by interlocking with the vertical rail 761 by the magnetic force of the magnets 765, 767. After the guide rail 763 returns to the original position, and when the vertical rail 761 is shifted in the right direction, the magnet 767 is separated from the border 766 of the magnet 765, and the magnet 767 is repulsed in the floating direction by the repulsion area of the magnet 765, and the tail portion roller 760 approaches the surface of the drawing board 762 gradually accompanied by the shifting in the right direction of the vertical rail 761, and abuts the surface of the drawing board 762.

What is claimed is:

1. A rail type universal parallel ruler device for mounting on a drawing board, comprising: a horizontal rail means for mounting on the top edge of the drawing board which is horizontal during use of the drawing board and having a pair of roller bearing surfaces disposed along the entire length of said horizontal rail means, a horizontal cursor means mounted on the horizontal rail means for shifting movement along the horizontal rail means, roller means disposed in pressure contact with said pair of roller bearing surfaces and said roller bearing surfaces guiding the horizontal cursor means for shifting movement along the horizontal rail means and preventing the horizontal swing shifting of the horizontal cursor means in a direction parallel to the surface of the drawing board and perpendicular to the longitudinal direction of the horizontal rail means, a vertical rail means pivotally connected to the horizontal cursor means at a point laterally offset from the centerline of said horizontal rail means in a direction remote from the drawing board when the horizontal rail means is mounted on the edge of the drawing board, said vertical rail means extending downwardly along the inclined board and having a further pair of bearing surfaces disposed along the entire length of said vertical rail means, a vertical cursor means mounted on the vertical rail means for shifting movement, a further roller means disposed in pressure contact with said further pair of roller bearing surfaces and said further bearing surfaces guiding said vertical cursor means along said vertical rail means and preventing the horizontal swing shifting of said vertical cursor means in a direction parallel to the surface of said drawing board and perpendicular to the longitudinal direction of said vertical rail means, a head connected to said vertical cursor means, a first magnetic member disposed along the surface of said horizontal rail means along substantially the entire length thereof and parallel to the surface of the drawing board, and a second magnetic member on the upper part of said vertical rail means and opposed to said first magnetic member with a like polarity surface opposed to said first magnetic member for exerting a repulsive force therebetween in a direction opposite the direction in which the force due to the weight of said vertical rail means and said vertical cursor means is exerted on the pivotal connection of said vertical rail means and said horizontal cursor means when the drawing board is inclined or is horizontal. .

2. A device as claimed in claim 1 further comprising a further magnetic member disposed on at least one of said rail means along substantially the entire length thereof, and a still further magnetic member disposed on at least one of said cursor means or a member interlocked therewith for exerting a magnetic force on said cursor means in a direction for causing said cursor means to float relative to the one rail means.

3. A device as claimed in claim 2 in which the still further magnetic member on the cursor means and the further magnetic member on the rail have like poles opposed whereby a repulsion magnetic force is exerted between the magnetic members.

4. A device as claimed in claim 2 in which the still further magnetic member on the cursor means and the further magnetic member on the rail means have opposite poles opposed, whereby an attractive magnetic force is exerted between the magnetic members.

5. A device as claimed in claim 2 in which the cursor means has a pair of rollers mounted thereon spaced transversely of the rail means along which the cursor means is movable, and said rail means have a pair of spaced opposed grooves in which said rollers run in frictional engagement therewith for supporting said cursor means on said rail means, said further and still further magnet members being positioned for causing the magnetic force therebetween to act in a direction to move at least one of said rollers away from at least one surface of the groove in which it is running.

6. A device as claimed in claim 5 in which said one rail means is the horizontal rail means, and one of said grooves being on the lower side of said horizontal rail means when the drawing board is in the upright position, said further and still further magnet members being positioned for causing the magnetic force therebetween to be exerted in a direction for reducing the frictional force between the lower horizontal groove and the roller rolling therein.

7. A device as claimed in claim 5 in which said one rail means is the vertical rail means, and said grooves are V-shaped grooves and said rollers have a pointed profile portion around the peripheries thereof substantially complementary to the shape of said grooves, said rollers having one surface on the V-shaped profile at the periphery thereof engaging a part of the surface of the groove in which it is engaged when the board is in other than a vertical position, and said further and still further magnet members being positioned for causing the magnetic force therebetween to be exerted in a direction for reducing the frictional force between the surface of the groove and the roller rolling therein.

* * * * *